(12) United States Patent
Akamatsu et al.

(10) Patent No.: US 9,667,159 B2
(45) Date of Patent: *May 30, 2017

(54) POWER CONVERSION APPARATUS INCLUDING A TRANSFORMER, AN INVERTOR CIRCUIT AND A PLURALITY OF SWITCHING DEVICES CONTROLLED BY A CONTROLLER

(71) Applicant: Panasonic Intellectual Property Management Co., Ltd., Osaka (JP)

(72) Inventors: Keiji Akamatsu, Hyogo (JP); Takaaki Norisada, Osaka (JP); Sohei Okamoto, Osaka (JP); Daisuke Fukuda, Hyogo (JP); Goh Yamada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 70 days.

This patent is subject to a terminal disclaimer.

(21) Appl. No.: 14/811,738

(22) Filed: Jul. 28, 2015

(65) Prior Publication Data
US 2016/0105119 A1 Apr. 14, 2016

(30) Foreign Application Priority Data

Oct. 9, 2014 (JP) ................................. 2014-208074
Nov. 13, 2014 (JP) ................................. 2014-230819
Nov. 13, 2014 (JP) ................................. 2014-230821

(51) Int. Cl.
*H02M 7/5387* (2007.01)
*H02M 3/335* (2006.01)
*H02M 7/48* (2007.01)
*H02M 1/00* (2006.01)
*H02M 5/297* (2006.01)
*H02M 5/293* (2006.01)

(52) U.S. Cl.
CPC ..... *H02M 3/33546* (2013.01); *H02M 7/4807* (2013.01); *H02M 5/297* (2013.01); *H02M 2001/0048* (2013.01); *H02M 2005/2932* (2013.01)

(58) Field of Classification Search
CPC .............. H02M 1/08; H02M 3/33507; H02M 3/33523; H02M 7/797; H02M 7/53871
USPC ............. 363/16, 17, 89, 127, 8, 10, 98, 132
See application file for complete search history.

(56) References Cited

U.S. PATENT DOCUMENTS

| 5,159,539 A | 10/1992 | Koyama | |
| 7,254,044 B2 * | 8/2007 | Perry | H02M 3/33507 323/299 |
| 8,018,749 B2 * | 9/2011 | Fitzgerald | H02M 3/33523 323/301 |
| 9,356,523 B2 * | 5/2016 | Yoshida | H02M 3/33576 |

(Continued)

FOREIGN PATENT DOCUMENTS

JP 2004-135408 4/2004

OTHER PUBLICATIONS

The Extended European Search Report dated Jan. 9, 2017 for the related European Patent Application No. 15177335.5.

*Primary Examiner* — Jeffrey Sterrett
(74) *Attorney, Agent, or Firm* — McDermott Will & Emery LLP

(57) ABSTRACT

A control unit controls the amplitude of at least either an output voltage or an output current by shifting at least either a first on time or a second on time.

33 Claims, 58 Drawing Sheets

(56) References Cited

U.S. PATENT DOCUMENTS

| | | | |
|---|---|---|---|
| 2008/0055938 A1 | 3/2008 | Kajouke et al. | |
| 2009/0213623 A1* | 8/2009 | Yang | H02M 3/33507 363/49 |
| 2014/0268959 A1* | 9/2014 | Frohman | H02M 7/797 363/98 |
| 2015/0333634 A1* | 11/2015 | Yoshida | H02M 3/33576 363/21.03 |
| 2015/0381064 A1* | 12/2015 | Matsubara | H02M 3/33584 363/17 |
| 2016/0105119 A1* | 4/2016 | Akamatsu | H02M 5/225 363/21.04 |
| 2016/0126844 A1* | 5/2016 | Tschirhart | H02M 3/33592 363/17 |
| 2016/0141972 A1* | 5/2016 | Yamada | H02M 1/32 363/37 |
| 2016/0268917 A1* | 9/2016 | Ramsay | H02M 5/458 |

* cited by examiner

P101

P102

P103

P104

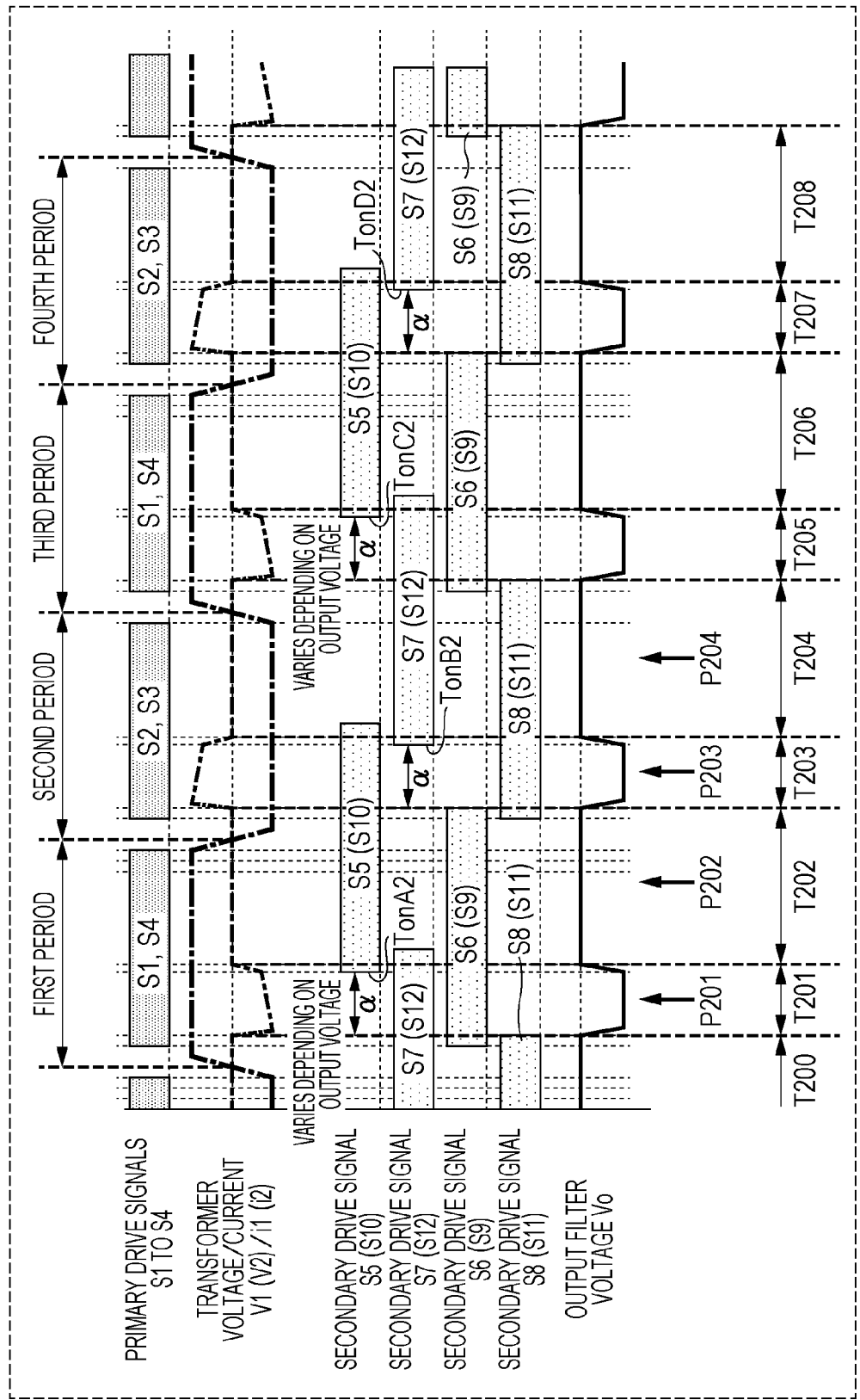

P202

P204

P201

P203

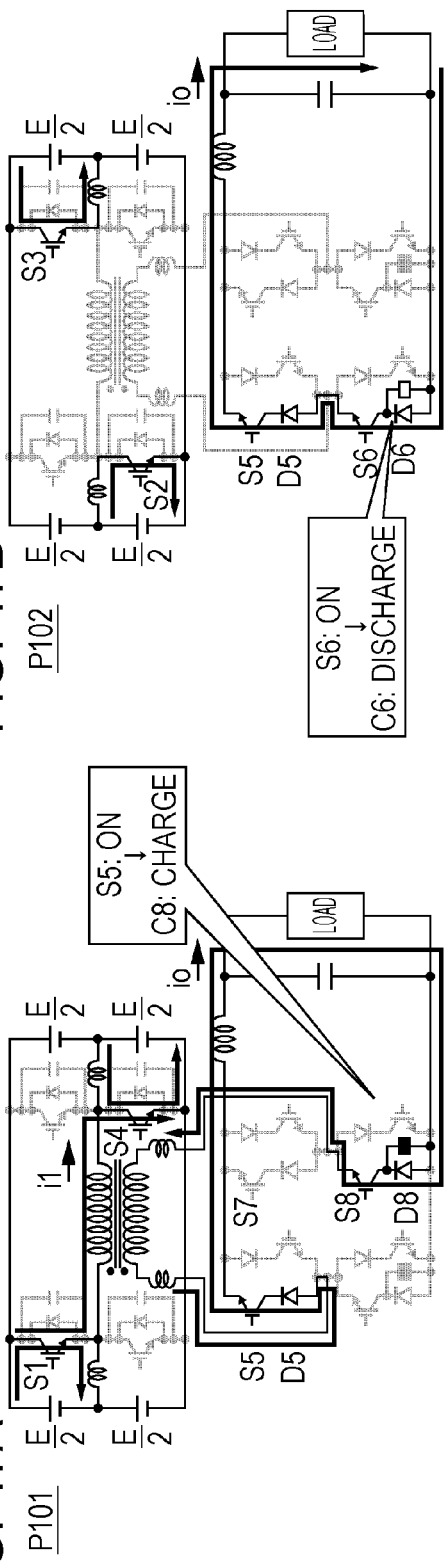
FIG. 47A
P101
FIG. 47B
P102
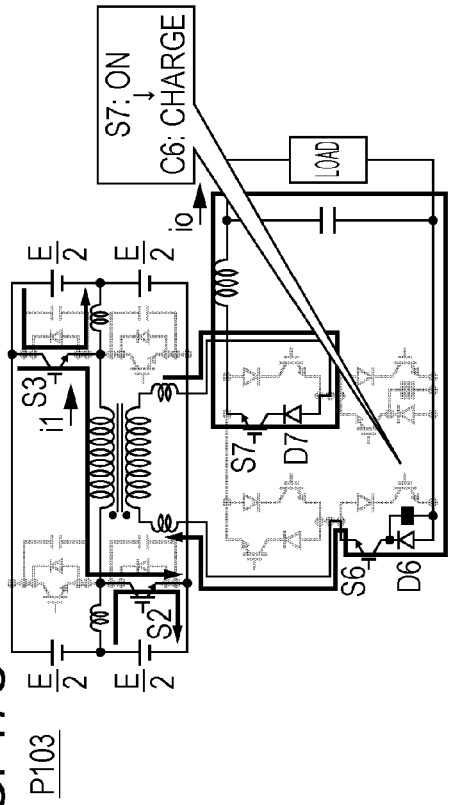
S5: ON
→
C8: CHARGE
S6: ON
→
C6: DISCHARGE
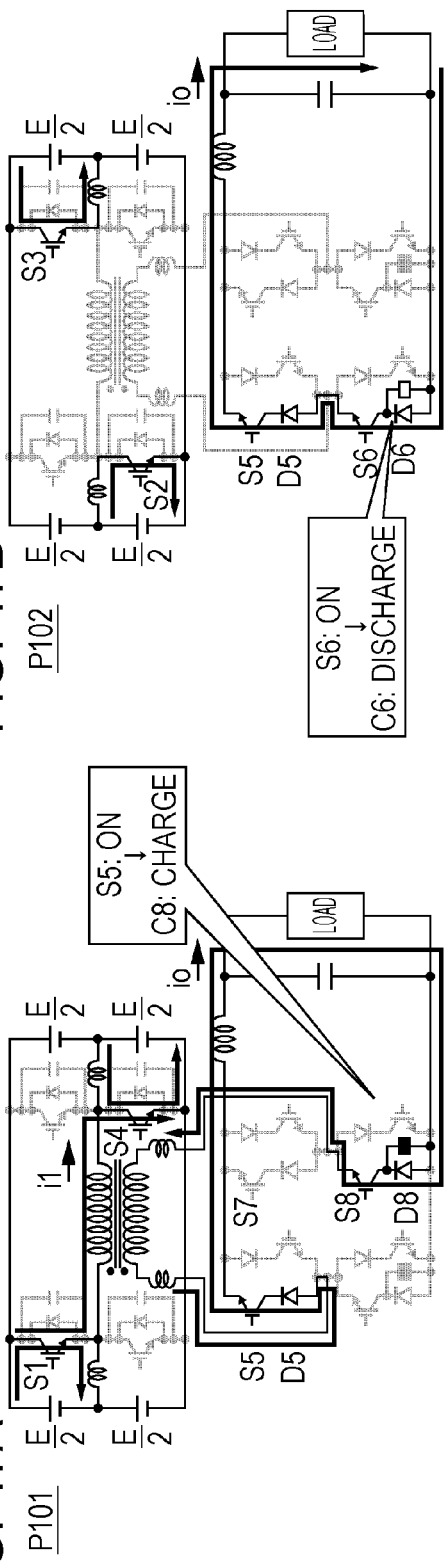
FIG. 47C
P103
FIG. 47D
P104
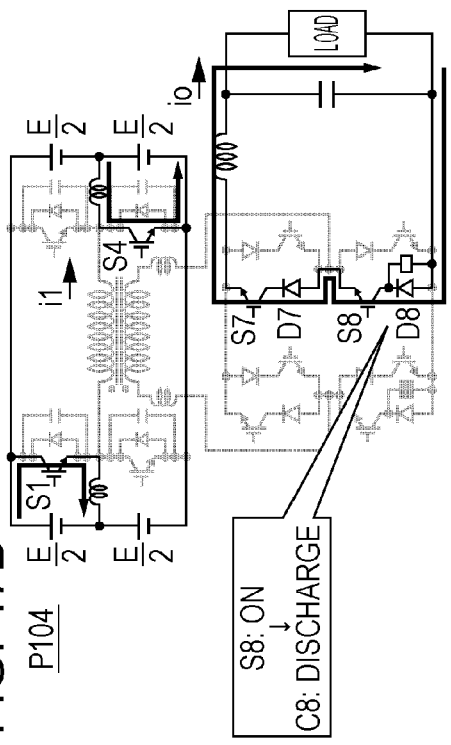
S7: ON
→
C6: CHARGE
S8: ON
→
C8: DISCHARGE

POWER CONVERSION APPARATUS INCLUDING A TRANSFORMER, AN INVERTOR CIRCUIT AND A PLURALITY OF SWITCHING DEVICES CONTROLLED BY A CONTROLLER

BACKGROUND

1. Technical Field

The present disclosure relates to a power conversion apparatus that converts direct current (DC) power into alternating current (AC) power.

2. Description of the Related Art

More and more companies and individuals are now selling power generated by distributed energy resources (for example, solar cells, fuel cells, and storage batteries) to power companies. Power can be sold through interconnection, in which the distributed energy resources and commercial power systems are connected to each other. In the interconnection, power conversion apparatuses called "power conditioners" are used for converting power generated by the distributed energy resources into power suitable for the commercial power systems.

If a distributed energy resource is a DC power supply, a power conversion apparatus that converts DC power into AC power is used in the interconnection. As this type of power conversion apparatus, for example, a grid-connected inverter apparatus has been proposed (for example, refer to Japanese Patent No. 4100125) that includes a high-frequency transformer, a first inverter that is arranged on a primary side of the high-frequency transformer and that converts DC power into high-frequency power, a current limiting reactor that is arranged on a secondary side of the high-frequency transformer and that converts the high-frequency power into commercial power, and a second inverter including a full bridge circuit in which a plurality of switching devices are bridged to one another. The switching devices of the second inverter are bidirectional switches that are turned on or off in accordance with the polarity of system voltage to convert the power of the high-frequency transformer into AC power.

SUMMARY

It is desired to reduce power losses caused in the example of the related art.

In one general aspect, the techniques disclosed here feature a power conversion apparatus including a transformer that includes a primary winding and a secondary winding, which is magnetically coupled with the primary winding, an inverter circuit that converts a direct current voltage supplied from a direct current power supply into an alternating current voltage and that supplies the alternating current voltage obtained as a result of the conversion to the primary winding, a connector that includes a first end and a second end electrically connectable to at least either a commercial power system or a load, a first switching device inserted between the first end of the connector and a first end of the secondary winding, a second switching device inserted between the second end of the connector and the first end of the secondary winding, a third switching device inserted between the first end of the connector and a second end of the secondary winding, a fourth switching device inserted between the second end of the connector and the second end of the secondary winding, and a control unit that controls amplitude of at least either an output voltage or an output current of the connector. The control unit turns on at least either the first switching device or the fourth switching device at a first on time in a first period, in which voltage of the secondary winding is positive. The control unit turns on at least either the second switching device or the third switching device at a second on time in a second period, in which the voltage of the secondary winding is negative, after the first period. The control unit controls the amplitude of at least either the output voltage or the output current by shifting at least either the first on time or the second on time.

According to the present disclosure, power losses can be reduced.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 44 is a timing chart illustrating an example of a power regeneration mode in which the polarities of the output voltage and the output current are different from each other;

FIGS. 47A to 47D are diagrams illustrating currents flowing through the power conversion apparatus including the capacitors at the timings illustrated in FIG. 42;

DETAILED DESCRIPTION

Underlying Knowledge Forming Basis of the Present Disclosure

If an inverter circuit arranged in a primary side of a power conversion apparatus is of a full-bridge type, the amplitude of a voltage output from a secondary side of the power conversion apparatus can be controlled by controlling timings at which four switching devices are turned on or off. In this case, however, a circulating current is generated in the inverter circuit while the secondary side of the power conversion apparatus is not outputting power. The circulating current causes power losses. Such a problem is not referred to in Japanese Patent No. 4100125. The present inventors have therefore established configurations in the present disclosure in order not to generate a circulating current in the inverter circuit in the primary side.

Outline of Aspect of the Present Disclosure

Figure 1:
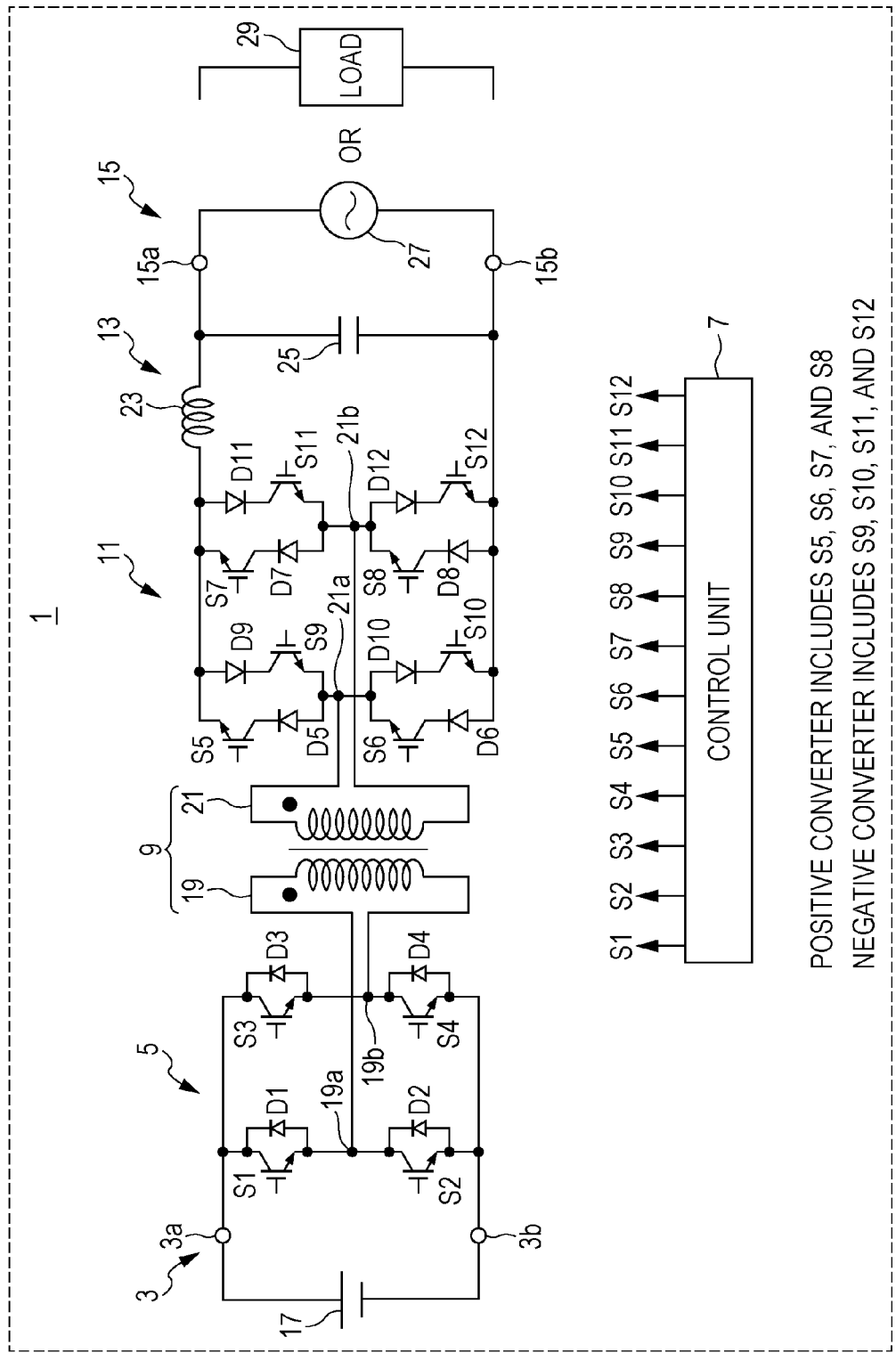
FIG. 1 is a diagram illustrating the circuitry of a power conversion apparatus according to a first embodiment.
Figure 5:
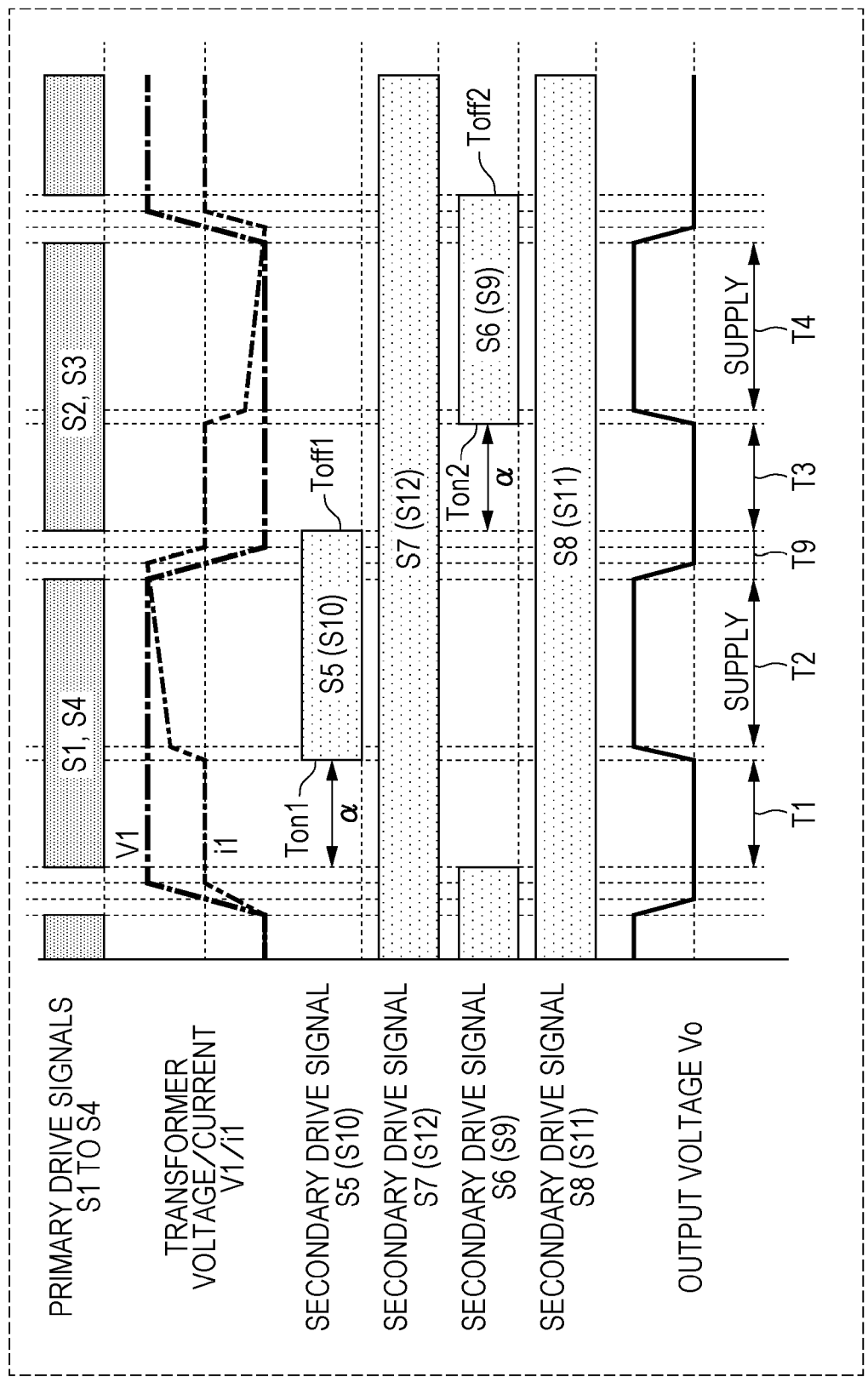
FIG. 5 is a timing chart illustrating an example of a power supply mode in a period illustrated in FIG. 3 during asymmetric control.
Figure 16:
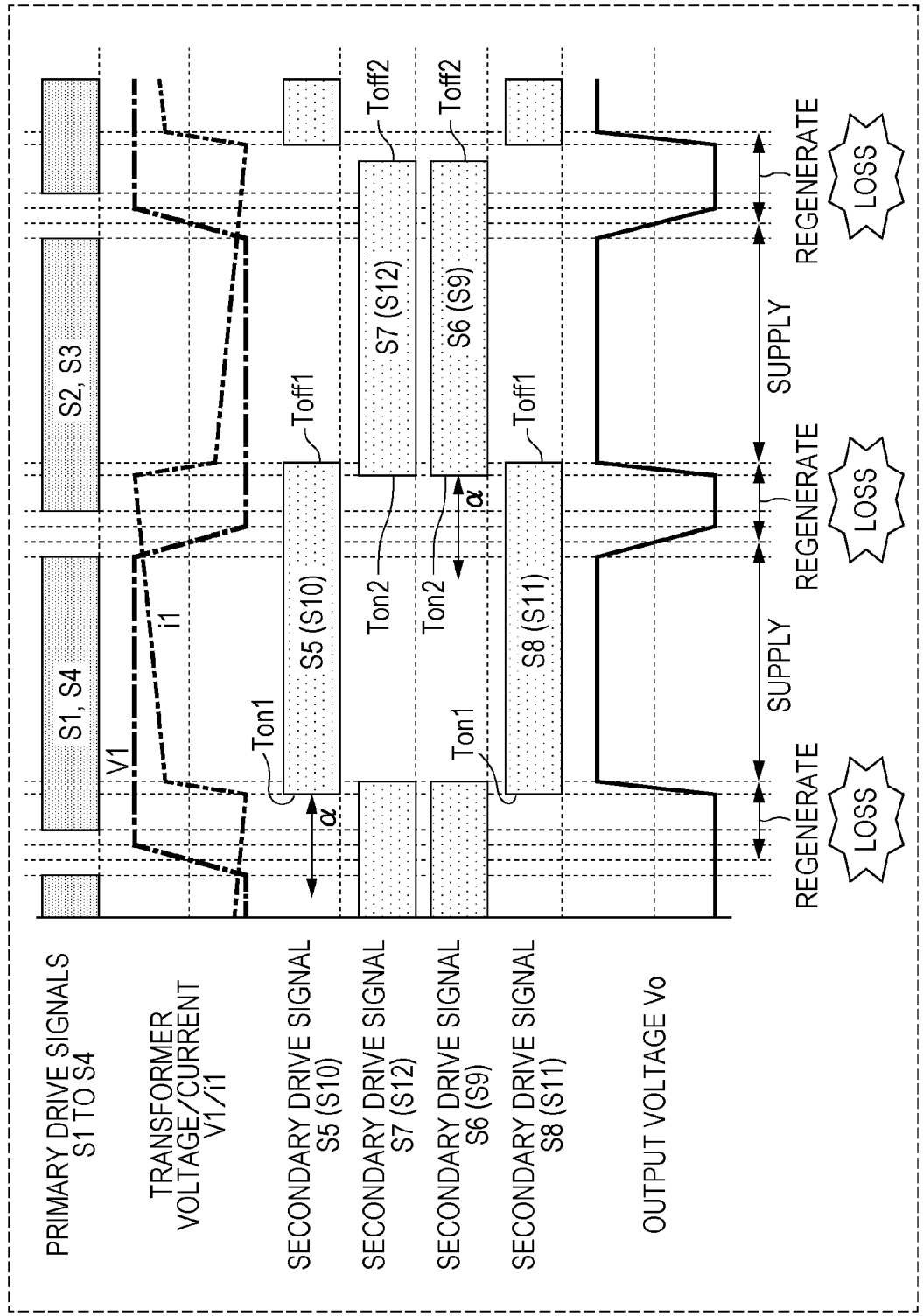
FIG. 16 is a timing chart illustrating an example of the power supply mode in the period illustrated in FIG. 3 during symmetric control.
Figure 17:
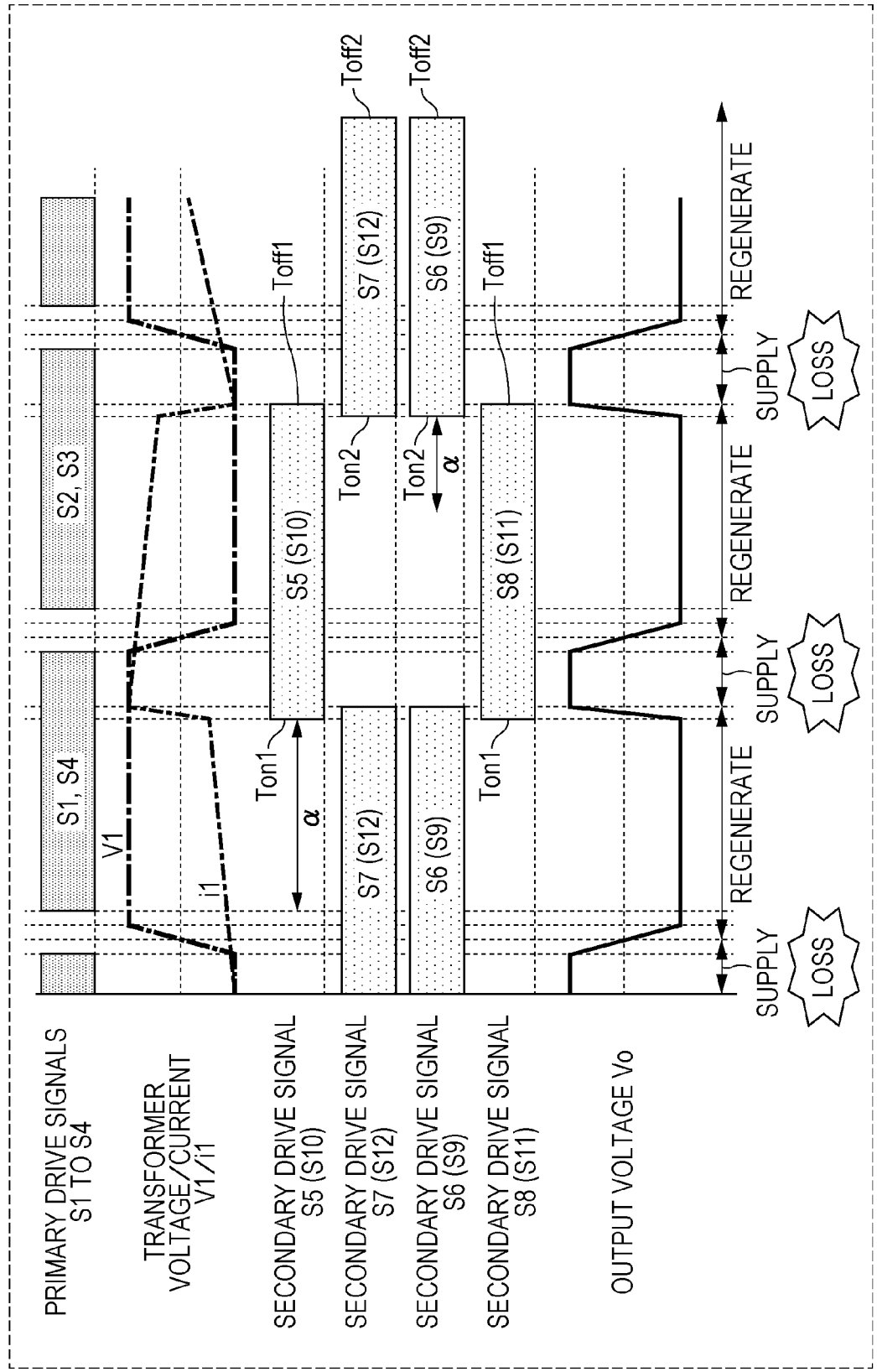
FIG. 17 is a timing chart illustrating an example of the power regeneration mode in the period illustrated in FIG. 4 during the symmetric control.

As illustrated in FIG. 1, a power conversion apparatus according to an aspect of the present disclosure includes a transformer 9 that includes a primary winding 19 and a secondary winding 21, which is magnetically coupled with the primary winding 19, an inverter circuit 5 that converts a direct current voltage supplied from a direct current power supply 17 into an alternating current voltage and that supplies the alternating current voltage obtained as a result of the conversion to the primary winding 19, a connector 15 that includes a first end 15a and a second end 15b electrically connectable to at least either a commercial power system 27 or a load 29, a first switching device S5 inserted between the first end 15a of the connector 15 and a first end 21a of the secondary winding 21, a second switching device S6 inserted between the second end 15b of the connector 15 and the first end 21a of the secondary winding 21, a third switching device S7 inserted between the first end 15a of the connector 15 and a second end 21b of the secondary winding 21, a fourth switching device S8 inserted between the second end 15b of the connector 15 and the second end 21b of the secondary winding 21, and a control unit 7 that controls an amplitude of at least either an output voltage or an output current of the connector 15. As illustrated in FIGS. 5, 16, and 17, the control unit 7 controls the amplitude of at least either the output voltage or the output current by turning on at least either the first switching device S5 or the fourth switching device S8 at a first on time Ton1 in a first period, in which voltage of the secondary winding 21 (transformer voltage V1) is positive, turning on at least either the second switching device S6 or the third switching device S7 at a second on time Ton2 in a second period, in which the voltage of the secondary winding 21 is negative, after the first period, and shifting at least either the first on time Ton1 or the second on time Ton2.

According to the power conversion apparatus 1 according to the aspect of the present disclosure, the control unit 7 controls the amplitude of at least either the output voltage or the output current by controlling the first to fourth switching devices S5 to S8 arranged in a secondary side of the power conversion apparatus 1. Since the inverter circuit 5 in a primary side need not perform a process for controlling the amplitude of at least either the output voltage or the output current (since phases of signals for driving switching devices S1 to S4 included in the inverter circuit 5 can be fixed), a circulating current is not generated in the inverter circuit 5 in the primary side.

In the above-described configuration, as illustrated in FIG. 5, the control unit 7 may control the amplitude of at least either the output voltage or the output current by keeping the first switching device S5 or the fourth switching device S8 that is not turned on at the first on time Ton1 turned on over the first period and the second period and keeping the second switching device S6 or the third switching device S7 that is not turned on at the second on time Ton2 turned on over the first period and the second period.

With this configuration, as illustrated in FIG. 5, a power supply mode can be realized in asymmetric control. In addition, because a transformer current i1 is zero in periods T1 and T3 illustrated in FIG. 5 and a circuit including the first to fourth switching devices S5 to S8 does not regenerate power to the inverter circuit 5, power losses can be reduced.

The sentence "the transformer current i1 is zero" herein means that the transformer current i1 is ideally zero. In practice, the transformer current i1 is not strictly zero due to magnetic flux leakage and other reasons. This holds in the following description.

In the above-described configuration, as illustrated in FIGS. 5, 16, and 17, the control unit 7 may control the amplitude of at least either the output voltage or the output current by turning off the first switching device S5 or the fourth switching device S8 that is turned on at the first on time Ton1 at a first off time Toff1 in the second period and turning off the second switching device S6 or the third switching device S7 that is turned on at the second on time Ton2 at a second off time Toff2 in a third period, in which the voltage of the secondary winding 21 is positive, after the second period.

This configuration adopts an example of timings at which the switching devices are turned off. If this configuration is applied to the asymmetric control illustrated in FIG. 5, power losses can be reduced.

Figure 6:
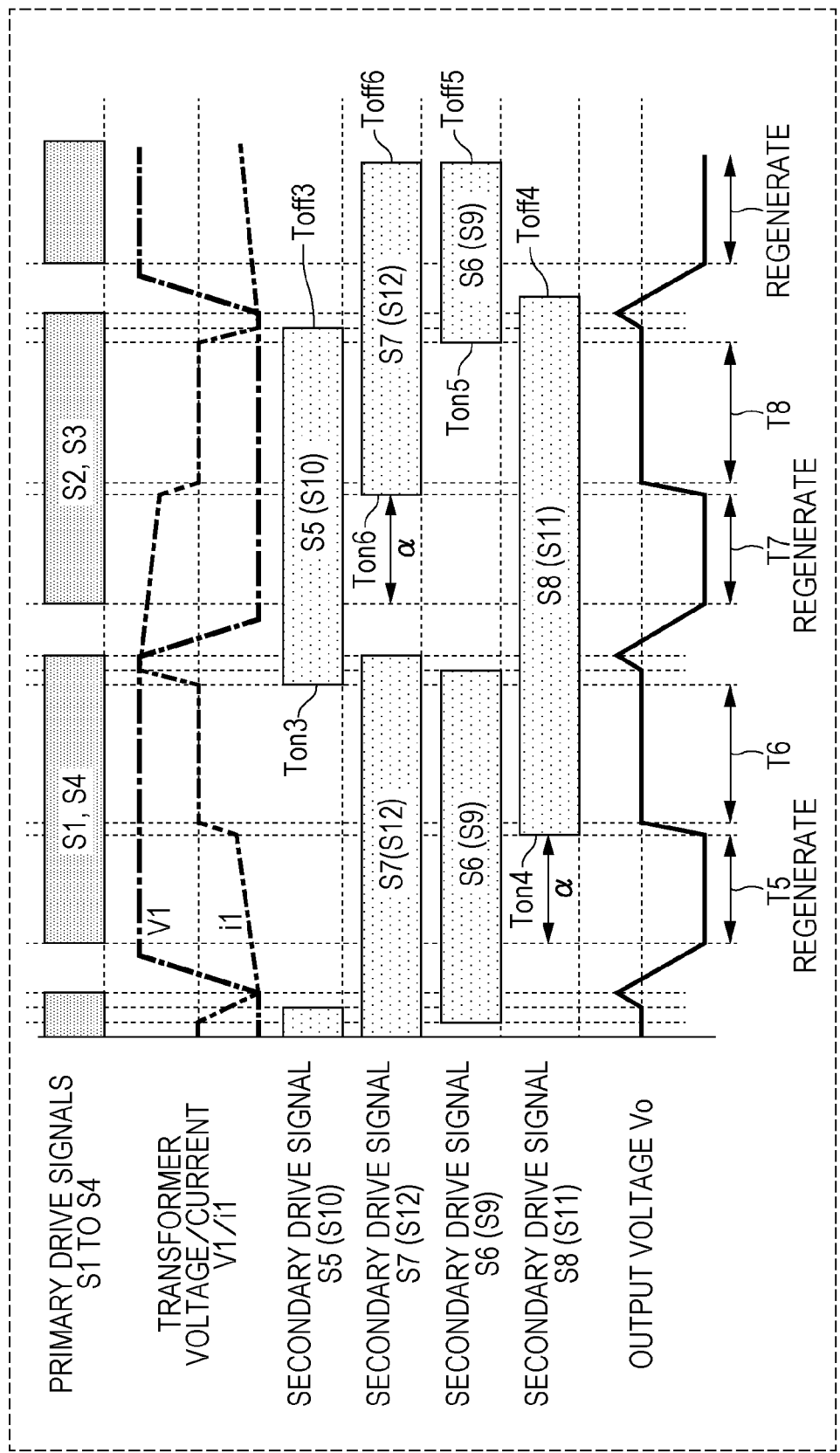
FIG. 6 is a timing chart illustrating an example of a power regeneration mode in a period illustrated in FIG. 4 during the asymmetric control.

In the above-described configuration, as illustrated in FIG. 6, the control unit 7 may control the amplitude of at least either the output voltage or the output current by turning on either the first switching device S5 or the fourth switching device S8 at a predetermined third on time Ton3, which is different from the first on time Ton1, turning on the other of the first switching device S5 and the fourth switching device S8 at a fourth on time Ton4 in the first period before the third on time Ton3, turning on either the second switching device S6 or the third switching device S7 at a predetermined fifth on time Ton5, which is different from the second on time Ton2, turning on the other of the second switching device S6 and the third switching device S7 at a sixth on time Ton6 in the second period before the fifth on time Ton5, and shifting at least either the fourth on time Ton4 or the sixth on time Ton6.

With this configuration, as illustrated in FIG. 6, a power regeneration mode can be realized in the asymmetric control. In addition, because the transformer current i1 is zero in periods T6 and T8 illustrated in FIG. 6 and the inverter circuit 5 does not supply power to the circuit including the first to fourth switching devices S5 to S8, power losses can be reduced.

In the above-described configuration, as illustrated in FIG. 6, the control unit 7 may set the third on time Ton3 in the first period and the fifth on time Ton5 in the second period.

This configuration may be applied to both when the DC power supply 17 and the load 29 are connected to each other (grid-independent operation) and when the DC power supply 17 and the commercial power system 27 are connected to each other (grid-connected operation).

In the above-described configuration, as illustrated in FIG. 6, the control unit 7 may control the amplitude of at least either the output voltage or the output current by turning off the first switching device S5 or the fourth switching device S8 that is turned on at the third on time Ton3 at a third off time Toff3 in the second period after the fifth on time Ton5, turning off the first switching device S5 or the fourth switching device S8 that is turned on at the fourth on time Ton4 at a fourth off time Toff4 after the third off time Toff3, turning off the second switching device S6 or the third switching device S7 that is turned on at the fifth on time Ton5 at a fifth off time Toff5 in a third period, in which the voltage of the secondary winding 21 is positive, after the second period, and turning off the second switching device S6 or the third switching device S7 that is turned on at the sixth on time Ton6 at a sixth off time Toff6 in the third period.

This configuration adopts an example of the timings at which the switching devices are turned off.

Figure 15:
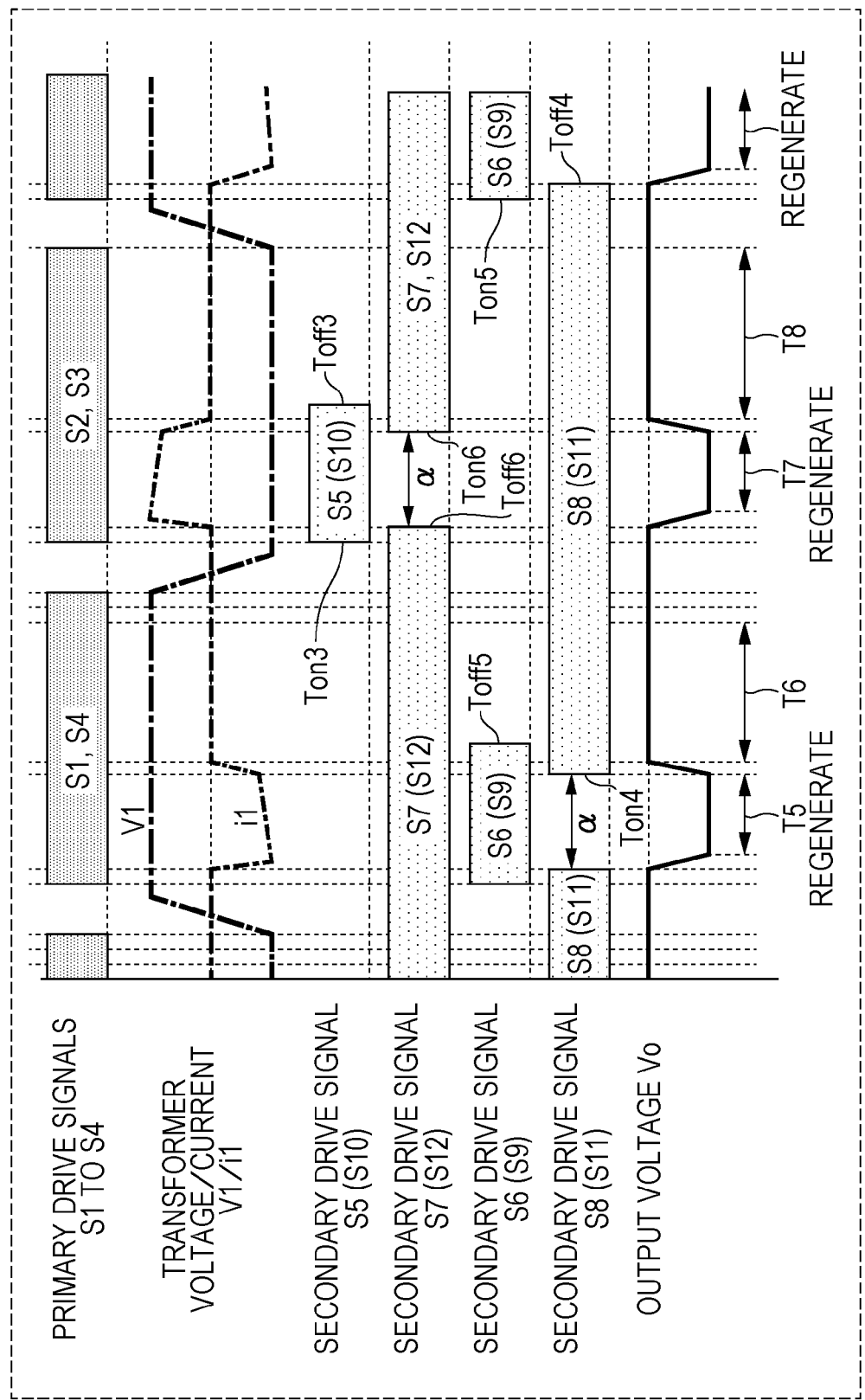
FIG. 15 is a timing chart illustrating another example of the power regeneration mode in the period illustrated in FIG. 4 during the asymmetric control.

In the above-described configuration, as illustrated in FIG. 15, the control unit 7 may control the amplitude of at least either the output voltage or the output current by turning on either the first switching device S5 or the fourth switching device S8 at a predetermined third on time Ton3, which is different from the first on time Ton1, turning off the same switching device at a third off time Toff3 in the second period after the third on time Ton3, turning on at least either the second switching device S6 or the third switching device S7 at a predetermined fifth on time Ton5, which is different from the second on time Ton2, turning off the same switching device at a fifth off time Toff5 in the first period before the fifth on time Ton5, turning on the other of the second switching device S6 and the third switching device S7 at a sixth on time Ton6 in the second period before the third off time Toff3, turning on the other of the first switching device S5 and the fourth switching device S8 at a fourth on time Ton4 in the first period before the fifth off time Toff5, and shifting at least either the fourth on time Ton4 or the sixth on time Ton6.

With this configuration, as illustrated in FIG. 15, the power regeneration mode can be realized in the asymmetric control. In addition, because the transformer current i1 is zero in periods T6 and T8 illustrated in FIG. 15 and the inverter circuit 5 does not supply power to the circuit including the first to fourth switching devices S5 to S8, power losses can be reduced.

This configuration may be applied to both when the DC power supply 17 and the load 29 are connected to each other (grid-independent operation) and when the DC power supply 17 and the commercial power system 27 are connected to each other (grid-connected operation).

In the above-described configuration, as illustrated in FIG. 15, the control unit 7 may control the amplitude of at least either the output voltage or the output current by turning off the first switching device S5 or the fourth switching device S8 that is turned on at the fourth on time Ton4 at a fourth off time Toff4 after the fifth on time Ton5 and turning off the second switching device S6 or the third switching device S7 that is turned on at the sixth on time Ton6 at a sixth off time Toff6 before the sixth on time Ton6 but after the third on time Ton3.

This configuration adopts an example of the timings at which the switching devices are turned off.

The above-described configuration may, as illustrated in FIG. 1, further include a fifth switching device S9 inserted between the first end 15a of the connector 15 and the first end 21a of the secondary winding 21 parallel to the first switching device S5, through which current flows in a direction opposite to a direction in which current flows through the first switching device S5, a sixth switching device S10 inserted between the second end 15b of the connector 15 and the first end 21a of the secondary winding 21 parallel to the second switching device S6, through which current flows in a direction opposite to a direction in which current flows through the second switching device S6, a seventh switching device S11 inserted between the first end 15a of the connector 15 and the second end 21b of the secondary winding 21 parallel to the third switching device S7, through which current flows in a direction opposite to a direction in which current flows through the third switching device S7, and an eighth switching device S12 inserted between the second end 15b of the connector 15 and the second end 21b of the secondary winding 21 parallel to the fourth switching device S8, through which current flows in a direction opposite to a direction in which current flows through the fourth switching device S8. The control unit 7 may control the amplitude of at least either the output voltage or the output current by controlling the first switching device S5, the second switching device S6, the third switching device S7, and the fourth switching device S8 in a period in which the output current of the connector 15 is positive. The control unit 7 may control the amplitude of at least either the output voltage or the output current by controlling the sixth switching device S10, the fifth switching device S9, the eighth switching device S12, and the seventh switching device S11 in a period in which the output current of the connector 15 is negative, instead of the first switching device S5, the second switching device S6, the third switching device S7, and the fourth switching device S8, respectively.

According to this configuration, the control unit 7 controls the amplitude of at least either the output voltage or the output current by changing the switching devices to be controlled in accordance with the polarity of the output current.

The sentence "the control unit 7 may control the amplitude of at least either the output voltage or the output current by controlling the sixth switching device S10, the fifth switching device S9, the eighth switching device S12, and the seventh switching device S11 in a period in which the output current of the connector 15 is negative, instead of the first switching device S5, the second switching device S6, the third switching device S7, and the fourth switching device S8, respectively" herein refers to the following (a) to (g).

(a) As illustrated in FIGS. 5, 16, and 17, the control unit 7 may control the amplitude of at least either the output voltage or the output current by turning on at least either the sixth switching device S10 or the seventh switching device S11 at the first on time Ton1 in the first period, in which the voltage of the secondary winding 21 is positive, turning on at least either the fifth switching device S9 or the eighth switching device S12 at the second on time Ton2 in the second period, in which the voltage of the secondary winding 21 is negative, after the first period, and shifting at least either the first on time Ton1 or the second on time Ton2.

(b) As illustrated in FIG. 5, the control unit 7 may control the amplitude of at least either the output voltage or the output current by keeping the sixth switching device S10 or the seventh switching device S11 that is not turned on at the first on time Ton1 turned on over the first and second periods and keeping the fifth switching device S9 or the eighth switching device S12 that is not turned on at the second on time Ton2 turned on over the first and second periods.

(c) As illustrated in FIGS. 5, 16, and 17, the control unit 7 may control the amplitude of at least either the output voltage or the output current by turning off the sixth switching device S10 or the seventh switching device S11 that is turned on at the first on time Ton1 at a first off time Toff1 in the second period and turning off the fifth switching device S9 or the eighth switching device S12 that is turned on at the second on time Ton2 at a second off time Toff2 in a third period, in which the voltage of the secondary winding 21 is positive, after the second period.

(d) As illustrated in FIG. 6, the control unit 7 may control the amplitude of at least either the output voltage or the output current by turning on either the sixth switching device S10 or the seventh switching device S11 at a predetermined third on time Ton3, which is different from the first on time Ton1, turning on the other of the sixth switching device S10 and the seventh switching device S11 at a fourth on time Ton4 in the first period before the third on time Ton3, turning on either the fifth switching device S9 or the eighth switching device S12 at a predetermined fifth on time Ton5, which is different from the second on time Ton2, turning on the other of the fifth switching device S9 and the eighth switching device S12 at a sixth on time Ton6 in the second period before the fifth on time Ton5, and shifting at least either the fourth on time Ton4 or the sixth on time Ton6.

(e) As illustrated in FIG. 6, the control unit 7 may control the amplitude of at least either the output voltage or the output current by turning off the sixth switching device S10 or the seventh switching device S11 that is turned on at the third on time Ton3 at a third off time Toff3 in the second period after the fifth on time Ton5, turning off the sixth switching device S10 or the seventh switching device S11 that is turned on at the fourth on time Ton4 at a fourth off time Toff4 after the third off time Toff3, turning off the fifth switching device S9 or the eighth switching device S12 that is turned on at the fifth on time Ton5 at a fifth off time Toff5 in the third period, in which the voltage of the secondary winding 21 is positive, after the second period, and turning off the fifth switching device S9 or the eighth switching device S12 that is turned on at the sixth on time Ton6 at a sixth off time Toff6 in the third period.

(f) As illustrated in FIG. 15, the control unit 7 may control the amplitude of at least either the output voltage or the output current by turning on either the sixth switching device S10 or the seventh switching device S11 at a predetermined third on time Ton3, which is different from the first on time Ton1, turning off the same switching device at a third off time Toff3 in the second period after the third on time Ton3, turning on either the fifth switching device S9 or the eighth switching device S12 at a predetermined fifth on time Ton5, which is different from the second on time Ton2, turning off the same switching device at a fifth off time Toff5 in the first period before the fifth on time Ton5, turning on the other of the fifth switching device S9 and the eighth switching device S12 at a sixth on time Ton6 in the second period before the third off time Toff3, turning on the other of the sixth switching device S10 and the seventh switching device S11 at a fourth on time Ton4 in the first period before the fifth off time Toff5, and shifting at least either the fourth on time Ton4 or the sixth on time Ton6.

(g) As illustrated in FIG. 15, the control unit 7 may control the amplitude of at least either the output voltage or the output current by turning off the sixth switching device S10 or the seventh switching device S11 that is turned on at the fourth on time Ton4 at a fourth off time Toff4 after the fifth on time Ton5, and turning off the fifth switching device S9 or the eighth switching device S12 that is turned on at the sixth on time Ton6 at a sixth off time Toff6 after the third on time Ton3 but before the sixth on time Ton6.

Figure 20:
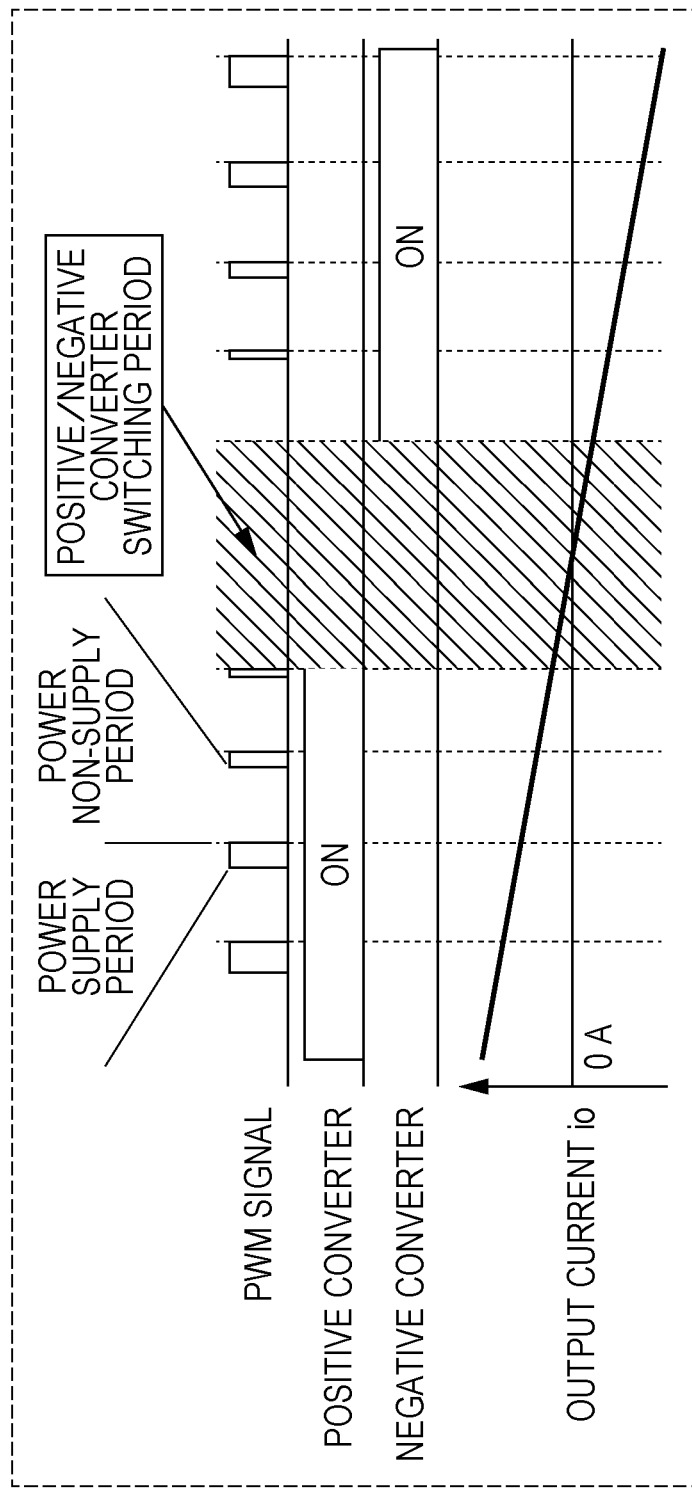
FIG. 20 is a timing chart illustrating the operation of a positive group converter and a negative group converter in the asymmetric control illustrated in FIG. 5 in another period illustrated in FIG. 3, in which the polarity of the output current reverses.

The above-described configuration may, as illustrated in FIG. 20, further include a positive group converter that includes the first switching device S5, the second switching device S6, the third switching device S7, and the fourth switching device S8, and a negative group converter that includes the fifth switching device S9, the sixth switching device S10, the seventh switching device S11, and the eighth switching device S12. The control unit 7 may set a timing at which polarity of the output current reverses in a period in which the DC power supply 17 does not supply power to the commercial power system 27 or the load 29 and performs a predetermined type of control on the positive group converter and the negative group converter so that a short circuit does not occur in a secondary side of the power conversion apparatus 1.

According to this configuration, since a short circuit does not occur in the secondary side of the power conversion apparatus 1, the polarity of the output current can be smoothly reversed.

Figure 22:
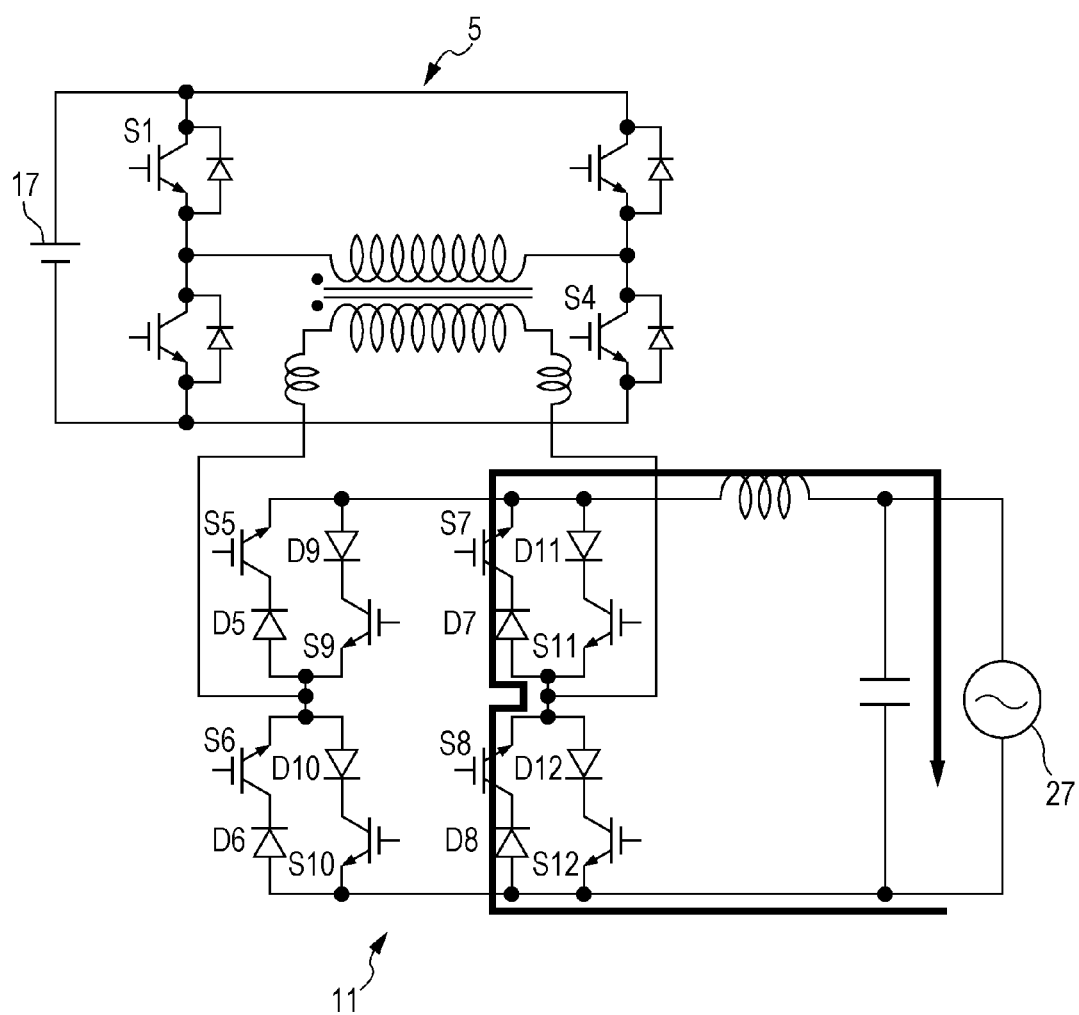
FIG. 22 is a circuit diagram illustrating a current flowing through the circuitry of the power conversion apparatus immediately before the control unit switches from the positive group converter to the negative group converter in a power non-supply period.
Figure 23:
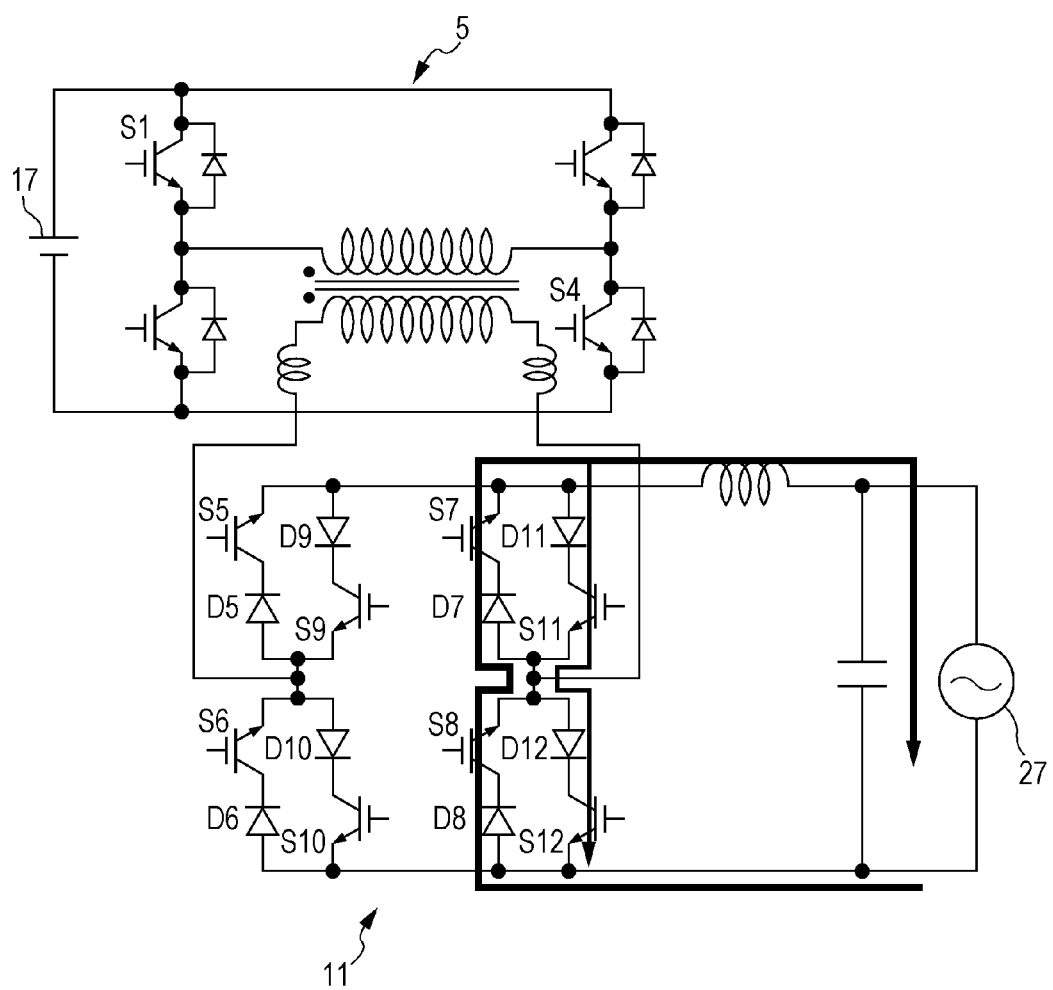
FIG. 23 is a circuit diagram illustrating currents flowing through the circuitry of the power conversion apparatus while the control unit is switching from the positive group converter to the negative group converter in the power non-supply period.
Figure 24:
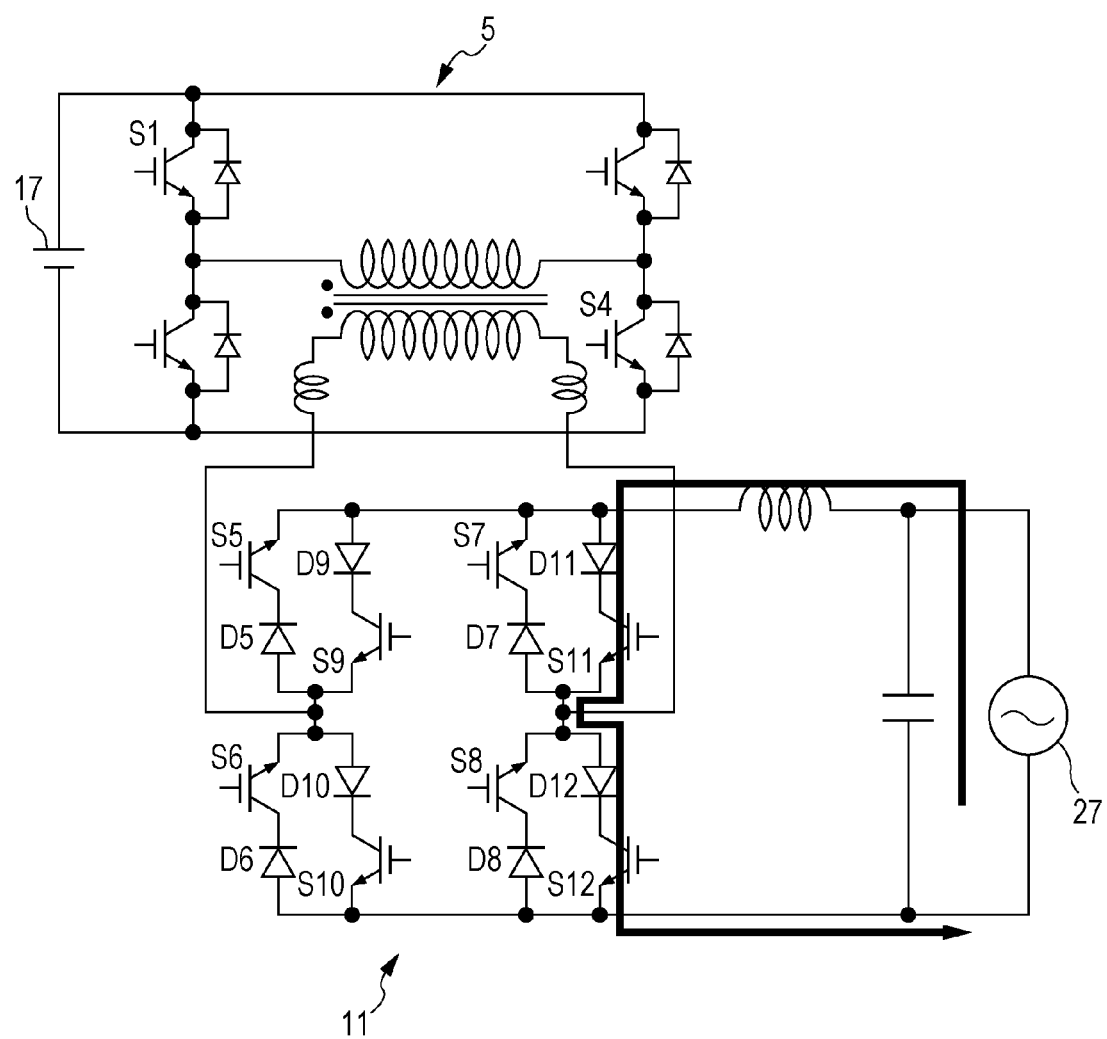
FIG. 24 is a circuit diagram illustrating a current flowing through the circuitry of the power conversion apparatus immediately after the control unit switches from the positive group converter to the negative group converter in the power non-supply period.

In the above-described configuration, as illustrated in FIGS. 22 to 24, the control unit 7 may turn off the first switching device S5, the second switching device S6, the fifth switching device S9, and the sixth switching device S10 as the predetermined type of control.

This configuration adopts an example of the predetermined type of control.

In the above-described configuration, the control unit 7 may turn on at least one of the first to eighth switching devices S5 to S12 in a period in which the output current is positive, a period in which the output current is negative, and a period in which the polarity of the output current reverses.

According to this configuration, not all the first to eighth switching devices S5 to S12 are off in the period in which the output current is positive, the period in which the output current is negative, and the period in which the polarity of the output current reverses.

Figure 26:
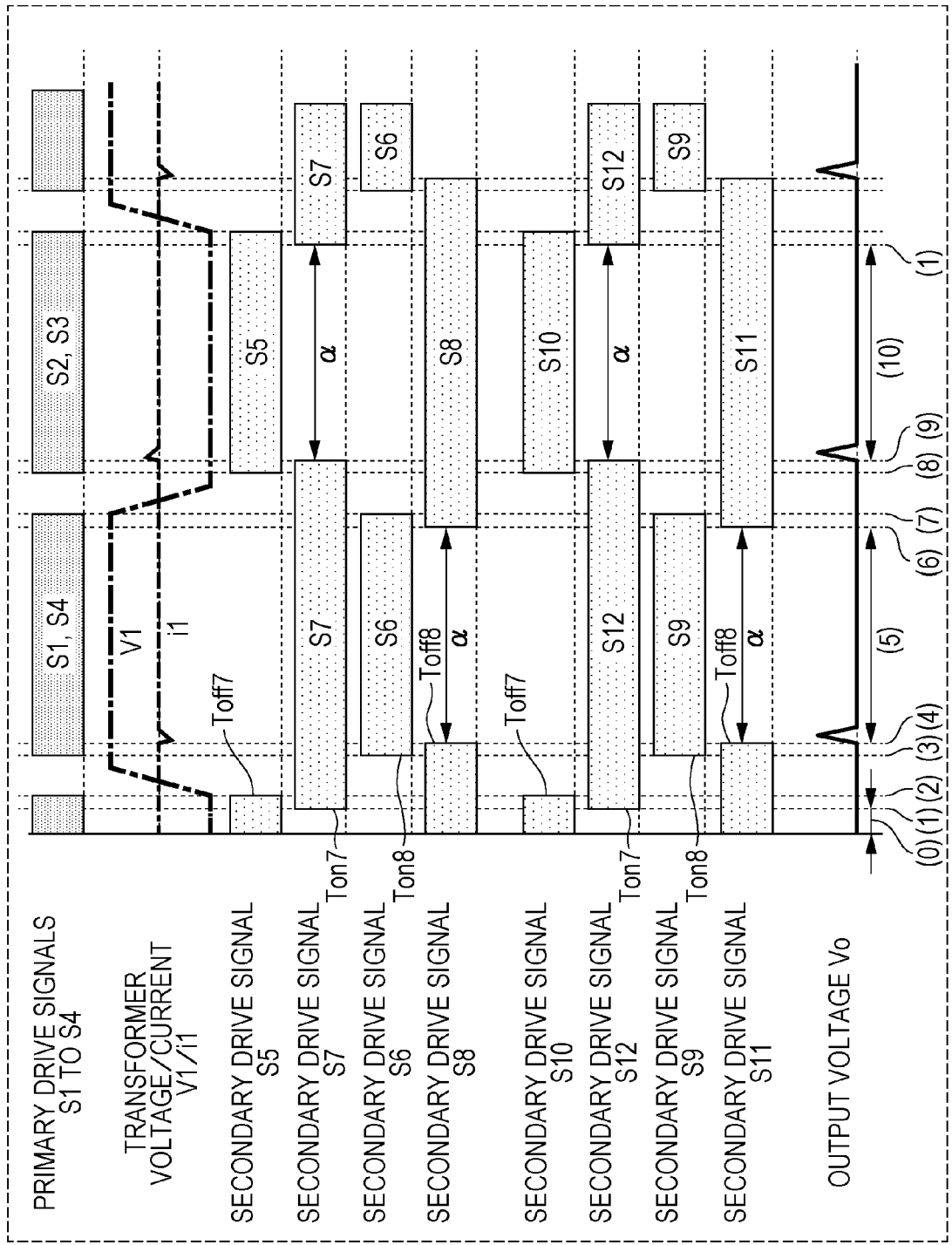
FIG. 26 is a timing chart illustrating a control mode in a period in the second example of the switching control.

The above-described configuration may, as illustrated in FIGS. 1 and 26, further include an alternating current reactor (coil 23) inserted between the connector 15 and the positive and negative group converters. As the predetermined type of control, the control unit 7 may keep the first switching device S5, the fourth switching device S8, the sixth switching device S10, and the seventh switching device S11 turned on and keep the second switching device S6, the third switching device S7, the fifth switching device S9, and the eighth switching device S12 turned off in a fourth period, in which the voltage of the secondary winding 21 is negative, turn on the third switching device S7 and the eighth switching device S12 at a seventh on time Ton7 in the fourth period to begin to charge the alternating current reactor, turn off the first switching device S5 and the sixth switching device S10 at a seventh off time Toff7 after the seventh on time Ton7 but before a fifth period, which comes after the fourth period and in which the voltage of the secondary winding 21 is positive, turn on the second switching device S6 and the fifth switching device S9 at an eighth on time Ton8 in the fifth period, and turn off the fourth switching device S8 and the seventh switching device S11 at an eighth off time Toff8 in the fifth period after the eighth on time Ton8 to discharge energy accumulated in the alternating current reactor.

This configuration adopts another example of the predetermined type of control.

Figure 2:
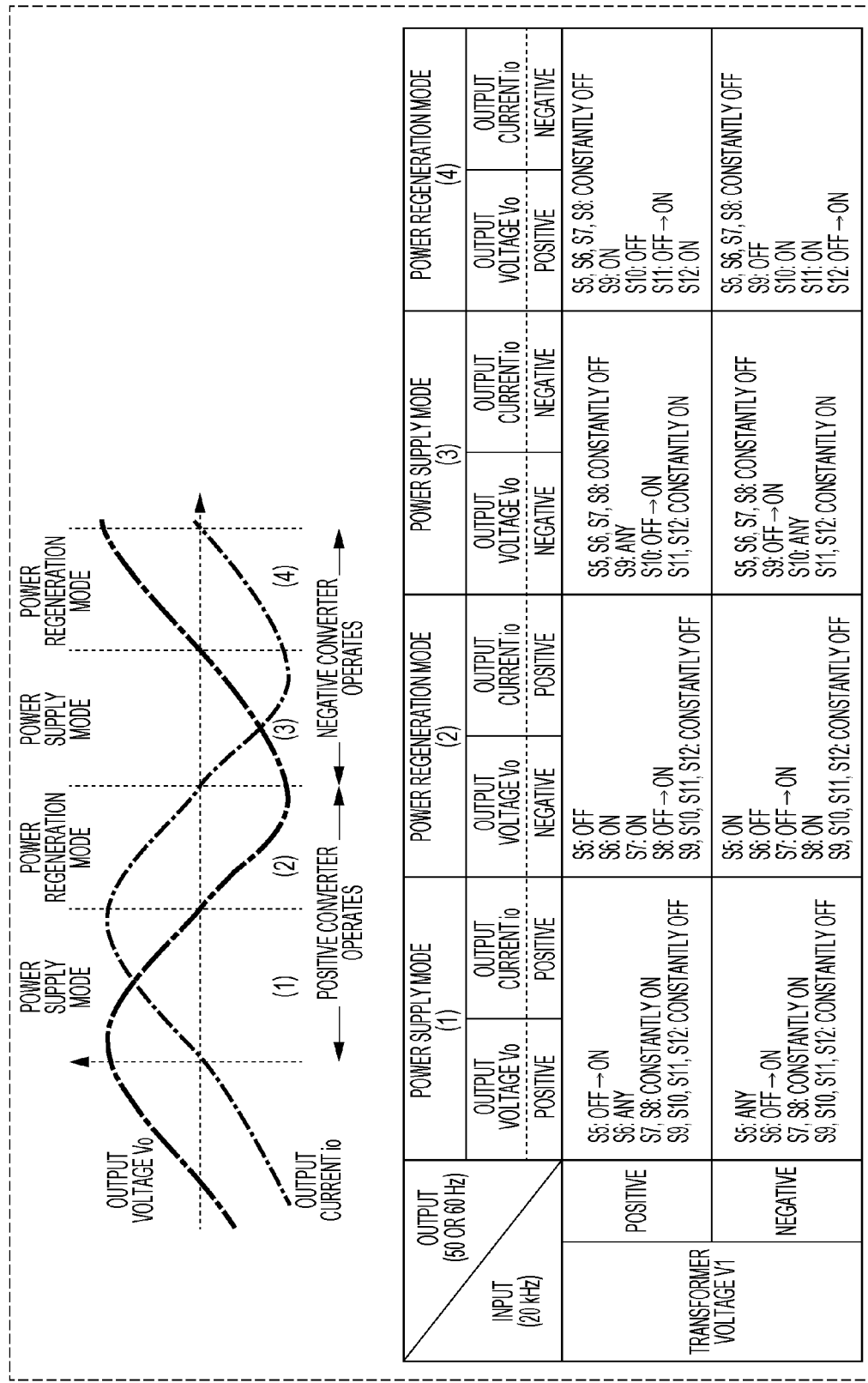
FIG. 2 is a diagram illustrating an outline of the operation of the power conversion apparatus according to the first embodiment.

In the above-described configuration, as illustrated in FIG. 2, if polarities of the output voltage and the output current are the same, the control unit 7 may establish a power supply mode, in which the DC power supply 17 supplies power to the commercial power system 27 or the load 29, and, if the polarities of the output voltage and the output current are different from each other, the control unit 7 may establish a power regeneration mode, in which the commercial power system 27 or the load 29 regenerates power to the direct current power supply 17.

According to this configuration, power supply and power regeneration can be performed.

Figure 40:
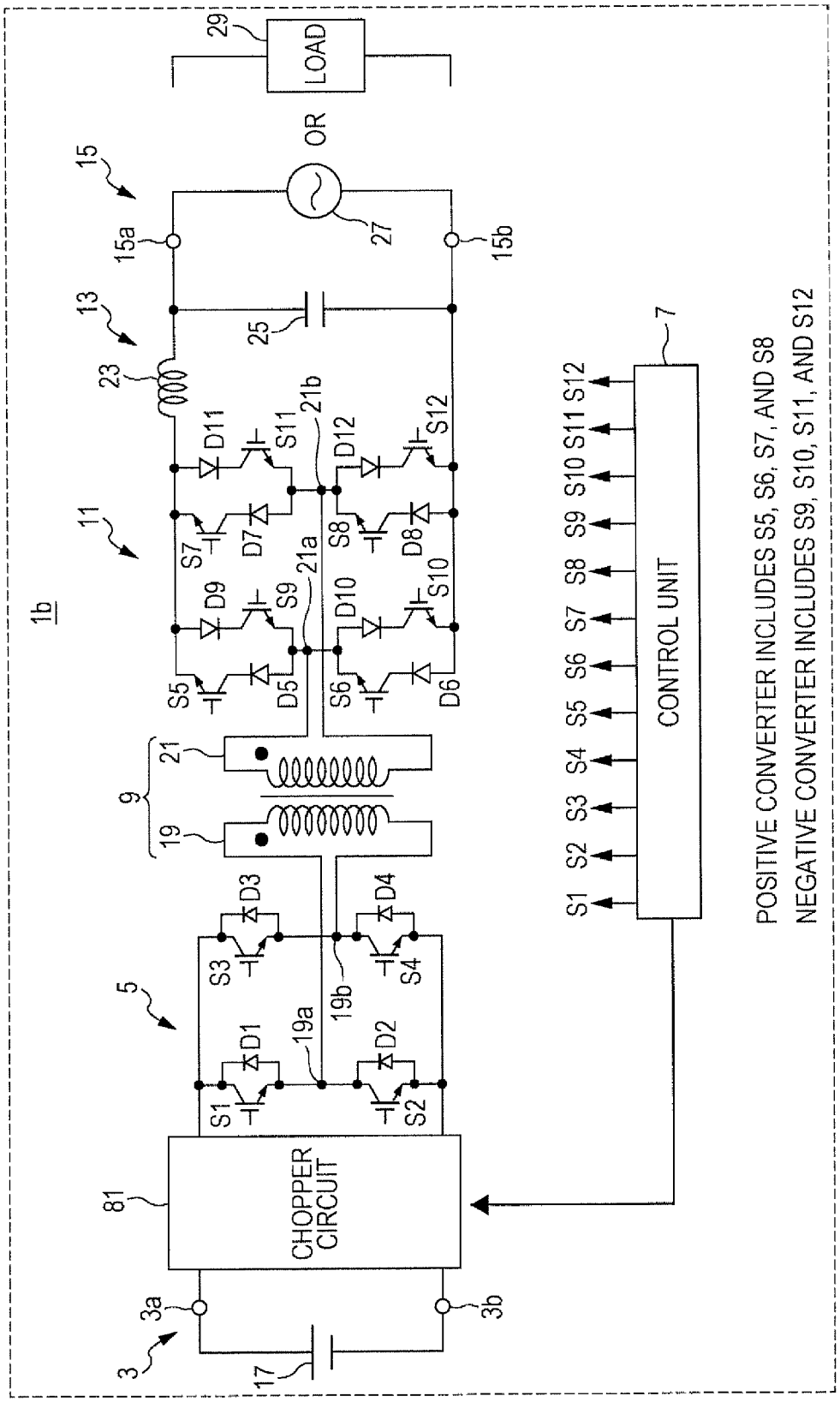
FIG. 40 is a diagram illustrating the circuitry of a second modification of the power conversion apparatus illustrated in FIG. 1.

The above-described configuration may, as illustrated in FIG. 40, further include a chopper circuit 81 that is connected to the inverter circuit 5, that performs a step-up operation in the power supply mode, and that performs a step-down operation in the power regeneration mode. The control unit 7 may control the amplitude of at least either the output voltage or the output current by controlling the chopper circuit 81 and the first to eighth switching devices S5 to S12.

According to this configuration, a DC power supply 17 whose voltage greatly varies can be used because of the chopper circuit 81. For example, the power conversion apparatus 1 can be applied even if the voltage of an electric vehicle (EV) battery, a solar cell, or a fuel cell greatly varies.

Figure 18:
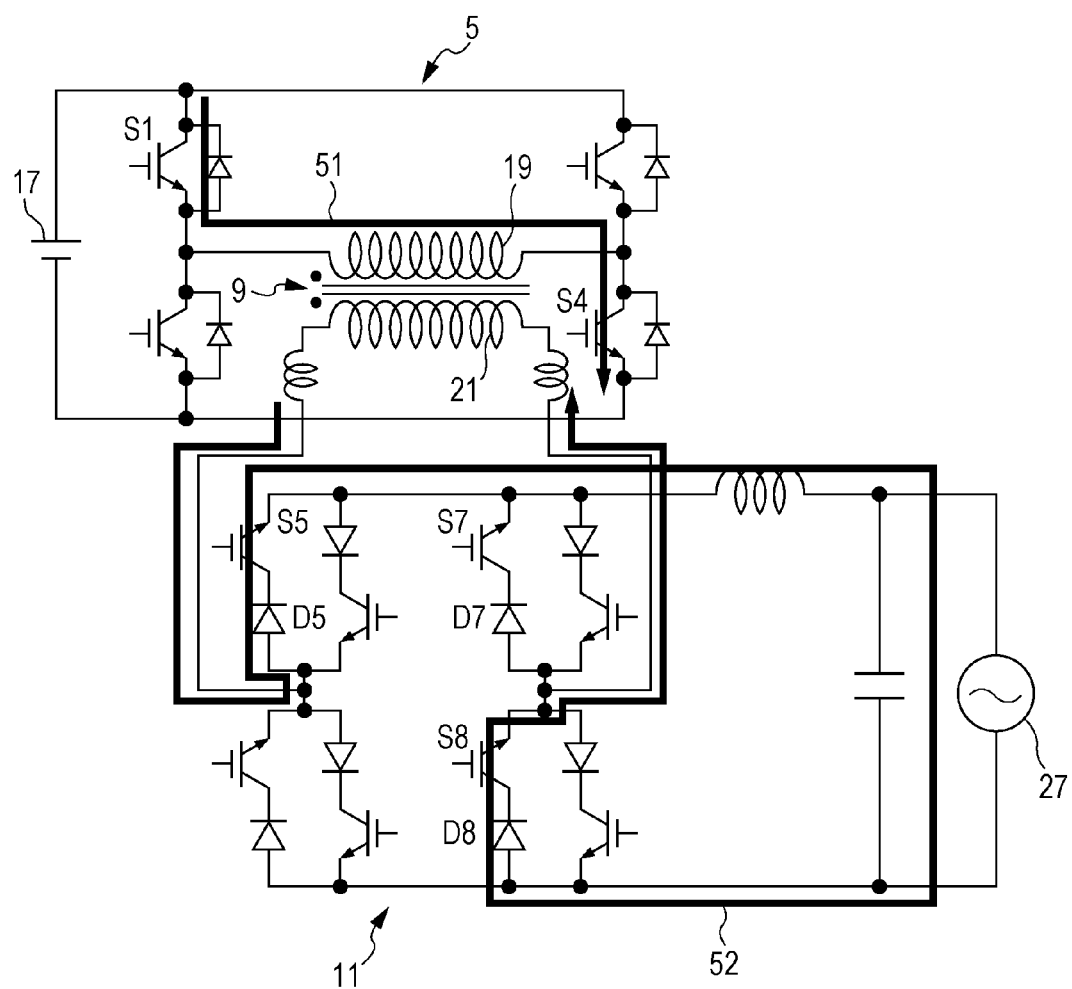
FIG. 18 is a circuit diagram illustrating currents flowing through the circuitry of the power conversion apparatus in a period illustrated in FIG. 5.
Figure 19:
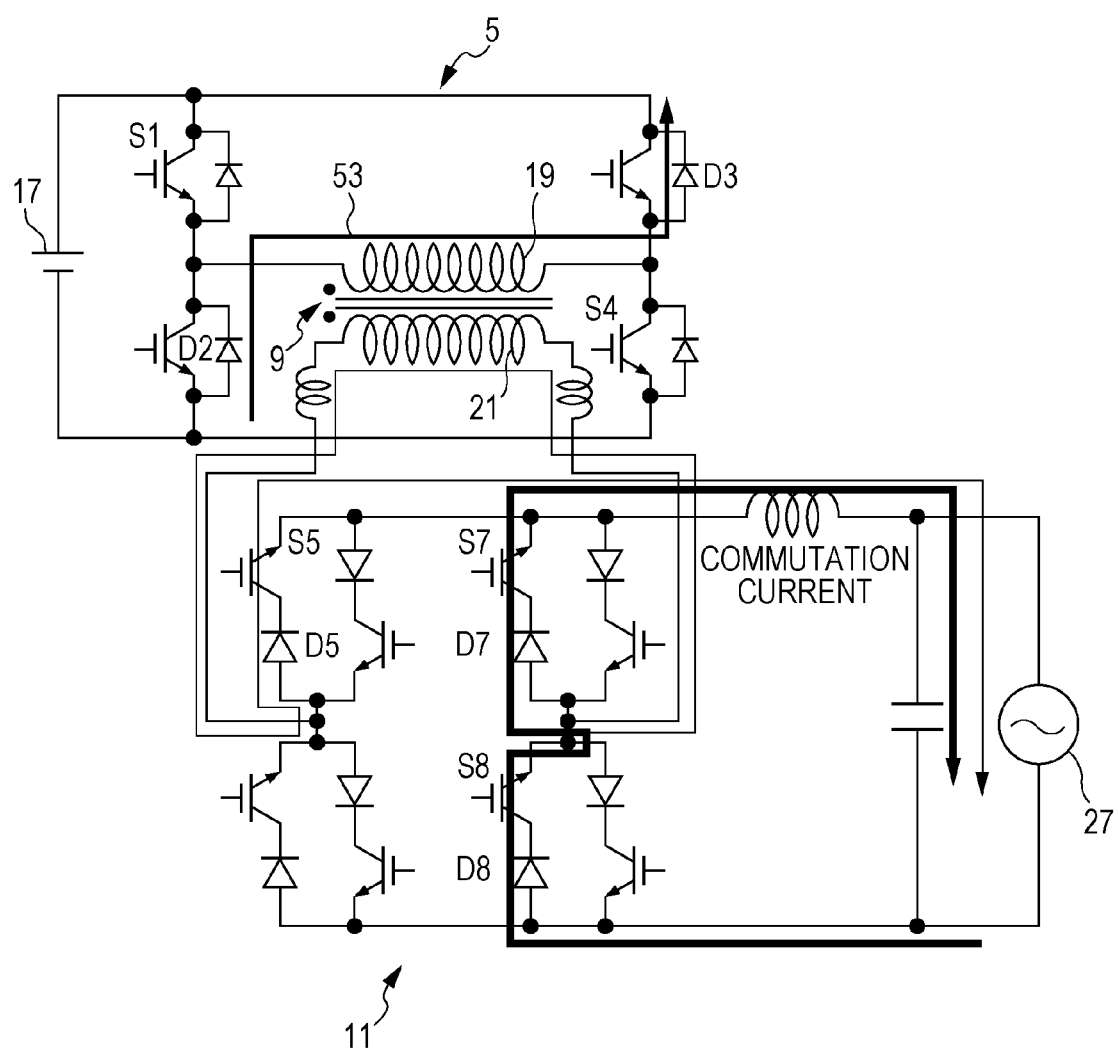
FIG. 19 is a circuit diagram illustrating a current flowing through the circuitry of the power conversion apparatus in another period illustrated in FIG. 5.

The above-described configuration may, as illustrated in FIGS. 18 and 19, further include a first diode D5, a second diode D6, a third diode D7, and a fourth diode D8. The first diode D5 and the first switching device S5 may be connected in series with each other and the third diode D7 and the third switching device S7 may be connected in series with each other so that either the first diode D5 or the third diode D7 is in a reverse bias state and the other is in a forward bias state when the control unit 7 commutates a path that runs through either the first switching device S5 or the third switching device S7 to establish a path that runs through the other. The second diode D6 and the second switching device S6 may be connected in series with each other and the fourth diode D8 and the fourth switching device S8 may be connected in series with each other so that either the second diode D6 or the fourth diode D8 is in a reverse bias state and the other is in a forward bias state when the control unit 7 commutates a path that runs through either the second switching device S6 or the fourth switching device S8 to establish a path that runs through the other.

According to this configuration, the control unit 7 can commutate a current path through soft switching.

First Embodiment

Embodiments of the present disclosure will be described in detail hereinafter with reference to the drawings. FIG. 1 is a diagram illustrating the circuitry of a power conversion apparatus 1 according to a first embodiment. The power conversion apparatus 1 is a power conditioner that includes a connection unit 3 (an example of the "connector"), an inverter circuit 5, a control unit 7, a transformer 9, a cycloconverter 11, a filter circuit 13, and a connection unit 15 (an example of the "connector").

The connection unit 3 includes a first end 3a electrically connected to a positive electrode of a DC power supply 17 and a second end 3b electrically connected to a negative electrode of the DC power supply 17. Although a storage battery is taken as an example of the DC power supply 17, the present embodiment may be applied to another type of DC power supply (for example, a solar cell or a fuel cell).

The DC power supply 17 supplies power to the inverter circuit 5 through the connection unit 3. The inverter circuit 5 is a high-frequency inverter that converts a DC voltage supplied from the DC power supply 17 into a high-frequency voltage (AC voltage).

The inverter circuit 5 is a full bridge circuit in which four switching devices S1, S2, S3, and S4 are bridged to one another. Although NPN insulated-gate bipolar transistors are taken as an example of the switching devices S1, S2, S3, and S4, any type of switching devices may be used insofar as the switching devices can configure a full bridge circuit. For example, field-effect transistors may be used, instead.

When turning on the switching devices S1 and S4, the control unit 7 turns off the switching devices S2 and S3. When turning off the switching devices S1 and S4, the control unit 7 turns on the switching devices S2 and S3.

The inverter circuit 5 includes four freewheeling diodes D1, D2, D3, and D4. The freewheeling diode D1 is connected to an emitter and a collector of the switching device S1 such that current flows in a certain direction. The current that flows in the certain direction refers to a current that flows in a direction opposite to a direction of a current flowing through the switching device S1 when the switching device S1 is on. Similarly, the freewheeling diode D2 is connected to an emitter and a collector of the switching device S2, the freewheeling diode D3 is connected to an emitter and a collector of the switching device S3, and the freewheeling diode D4 is connected to an emitter and a collector of the switching device S4.

The transformer 9 is a high-frequency transformer that includes a primary winding 19 and a secondary winding 21, which is magnetically coupled with the primary winding 19. A first end 19a and a second end 19b of the primary winding 19 are connected to an output terminal of the inverter circuit 5. A first end 21a and a second end 21b of the secondary winding 21 are connected to an input terminal of the cycloconverter 11.

The transformer 9 insulates the inverter circuit 5 and the cycloconverter 11 from each other. In a power supply mode, the transformer 9 supplies, to the cycloconverter 11, a high-frequency voltage supplied to the primary winding 19 from the inverter circuit 5. In a power regeneration mode, the transformer 9 supplies, to the inverter circuit 5, a voltage supplied to the secondary winding 21 from the cycloconverter 11. These modes will be described in detail later.

The cycloconverter 11 is a direct AC converter that directly converts the high-frequency voltage supplied from the transformer 9 into a commercial AC voltage.

The cycloconverter 11 includes a positive group converter (positive converter) in which a first switching device S5, a second switching device S6, a third switching device S7, and a fourth switching device S8 are bridged to one another and a negative group converter (negative converter) in which a fifth switching device S9, a sixth switching device S10, a seventh switching device S11, and an eighth switching device S12 are bridged to one another. Although NPN insulated-gate bipolar transistors are taken as an example of these switching devices, the type of switching devices used is not limited to this.

The positive group converter operates when an output current of the connection unit 15 is positive. The negative group converter operates when the output current of the connection unit 15 is negative.

The first switching device S5 is inserted between a first end 15a of the connection unit 15 and the first end 21a of the secondary winding 21. The second switching device S6 is inserted between a second end 15b of the connection unit 15 and the first end 21a of the secondary winding 21. The third switching device S7 is inserted between the first end 15a of the connection unit 15 and a second end 21b of the secondary winding 21. The fourth switching device S8 is inserted between the second end 15b of the connection unit 15 and the second end 21b of the secondary winding 21.

The cycloconverter 11 further includes a first diode D5, a second diode D6, a third diode D7, and a fourth diode D8. These diodes are used for performing zero-voltage switching (ZVS) or zero-current switching (ZCS) when the positive group converter, which includes the first switching device S5, the second switching device S6, the third switching device S7, and the fourth switching device S8, operates. The ZVS and the ZCS are referred to as "soft switching". The ZVS is switching performed when voltage is zero. The ZCS is switching performed when current is zero.

The first diode D5 is inserted between the first end 21a of the secondary winding 21 and a collector of the first switching device S5. A forward direction of the first diode D5 is a direction in which the first switching device S5 sends current.

The second diode D6 is inserted between the second end 15b of the connection unit 15 and a collector of the second switching device S6. A forward direction of the second diode D6 is a direction in which the second switching device S6 sends current.

The third diode D7 is inserted between the second end 21b of the secondary winding 21 and a collector of the third switching device S7. A forward direction of the third diode D7 is a direction in which the third switching device S7 sends current.

The fourth diode D8 is inserted between the second end 15b of the connection unit 15 and a collector of the fourth switching device S8. A forward direction of the fourth diode D8 is a direction in which the fourth switching device S8 sends current.

The fifth switching device S9 is inserted between the first end 15a of the connection unit 15 and the first end 21a of the secondary winding 21 parallel to the first switching device S5 and sends current in a direction opposite to the direction in which the first switching device S5 sends current. More specifically, a collector of the fifth switching device S9 is connected to an emitter of the first switching device S5 through a fifth diode D9. An emitter of the fifth switching device S9 is connected to the collector of the first switching device S5 through the first diode D5.

The sixth switching device S10 is inserted between the second end 15b of the connection unit 15 and the first end 21a of the secondary winding 21 parallel to the second switching device S6 and sends current in a direction opposite to the direction in which the second switching device S6 sends current. More specifically, a collector of the sixth switching device S10 is connected to an emitter of the second switching device S6 through a sixth diode D10. An emitter of the sixth switching device S10 is connected to the collector of the second switching device S6 through the second diode D6.

The seventh switching device S11 is inserted between the first end 15a of the connection unit 15 and the second end 21b of the secondary winding 21 parallel to the third switching device S7 and sends current in a direction opposite to the direction in which the third switching device S7 sends current. More specifically, a collector of the seventh switching device S11 is connected to an emitter of the third switching device S7 through a seventh diode D11. An emitter of the seventh switching device S11 is connected to the collector of the third switching device S7 through the third diode D7.

The eighth switching device S12 is inserted between the second end 15b of the connection unit 15 and the second end 21b of the secondary winding 21 parallel to the fourth switching device S8 and sends current in a direction opposite to the direction in which the fourth switching device S8 sends current. More specifically, a collector of the eighth switching device S12 is connected to an emitter of the fourth switching device S8 through an eighth diode D12. An emitter of the eighth switching device S12 is connected to the collector of the fourth switching device S8 through the fourth diode D8.

The cycloconverter 11 further includes the fifth diode D9, the sixth diode D10, the seventh diode D11, and the eighth diode D12. These diodes are used for performing ZVS or ZCS when the negative group converter, which includes the fifth switching device S9, the sixth switching device S10, the seventh switching device S11, and the eighth switching device S12, operates.

The fifth diode D9 is inserted between the first end 15a of the connection unit 15 and the collector of the fifth switching device S9. A forward direction of the fifth diode D9 is a direction in which the fifth switching device S9 sends current.

The sixth diode D10 is inserted between the first end 21a of the secondary winding 21 and the collector of the sixth switching device S10. A forward direction of the sixth diode D10 is a direction in which the sixth switching device S10 sends current.

The seventh diode D11 is inserted between the first end 15a of the connection unit 15 and the collector of the seventh switching device S11. A forward direction of the seventh diode D11 is a direction in which the seventh switching device S11 sends current.

The eighth diode D12 is inserted between the second end 21b of the secondary winding 21 and the collector of the eighth switching device S12. A forward direction of the eighth diode D12 is a direction in which the eighth switching device S12 sends current.

Positions of the first diode D5 and the first switching device S5 may be switched. That is, although the first diode D5 is arranged downstream of the first switching device S5 in the forward direction of the first diode D5, the first diode D5 may be arranged upstream of the first switching device S5, instead. The same holds for positions of the second to eighth diodes D6 to D12 and the second to eighth switching devices S6 to S12.

The control unit 7 controls the amplitude of an output voltage of the connection unit 15 by turning on or off the first to eighth switching devices S5 to S12. Details of the control will be described later. The control unit 7 may be configured with a processor (e.g. a CPU (Central Processing Unit) or a MPU (Micro-Processing Unit)). This processor may operate the control method shown in the present disclosure, by executing a program read from a memory.

The filter circuit 13 is inserted between an output of the cycloconverter 11 and the connection unit 15. The filter circuit 13 includes a coil 23 and a capacitor 25 and smooths an AC signal output from the cycloconverter 11. As a result, the rectangular AC signal output from the cycloconverter 11 is converted into a sinusoidal AC signal having amplitude according to a pulse width.

The connection unit 15 is a switch including the first end 15a and the second end 15b electrically connectable to either a commercial power system 27 or a bad 29. The bad 29 is a resistive load with which a power factor becomes 1 or an inductive bad or a capacitive load with which the power factor does not become 1. When the DC power supply 17 supplies power to the commercial power system 27 (selling power) or when the DC power supply 17 is charged, the connection unit 15 and the commercial power system 27 are connected to each other. When the DC power supply 17 supplies power to the bad 29 (for example, a home appliance), the connection unit 15 and the bad 29 are connected to each other.

The operation of the power conversion apparatus 1 according to the present embodiment will be described. FIG. 2 is a diagram illustrating an outline of the operation. As illustrated in FIGS. 1 and 2, the operation of the power conversion apparatus 1 includes the power supply mode (inverter mode) in which the DC power supply 17 supplies power to the commercial power system 27 or the bad 29 and the power regeneration mode (converter mode) in which the commercial power system 27 or the bad 29 regenerates power to the DC power supply 17.

Waveforms illustrated in FIG. 2 are an example of an output voltage Vo and an output current io of the connection unit 15. Because a waveform of voltage applied to the filter circuit 13 is not deformed, this voltage will be described as the output voltage Vo. A phase difference between the output voltage Vo and the output current io is 90°. When the output current io is positive, the positive group converter, which includes the first switching device S5, the second switching device S6, the third switching device S7, and the fourth switching device S8, operates. When the output current io is negative, the negative group converter, which includes the fifth switching device S9, the sixth switching device S10, the seventh switching device S11, and the eighth switching device S12, operates.

When polarities of the output voltage Vo and the output current io are the same, the power supply mode is established. The power supply mode may be a mode indicated by (1) in which the output voltage Vo and the output current io are positive or a mode indicated by (3) in which the output voltage Vo and the output current io are negative.

When the polarities of the output voltage Vo and the output current io are different from each other, the power regeneration mode is established. The power regeneration mode may be a mode indicated by (2) in which the output voltage Vo is negative but the output current io is positive or a mode indicated by (4) in which the output voltage Vo is positive but the output current io is negative.

Figure 3:
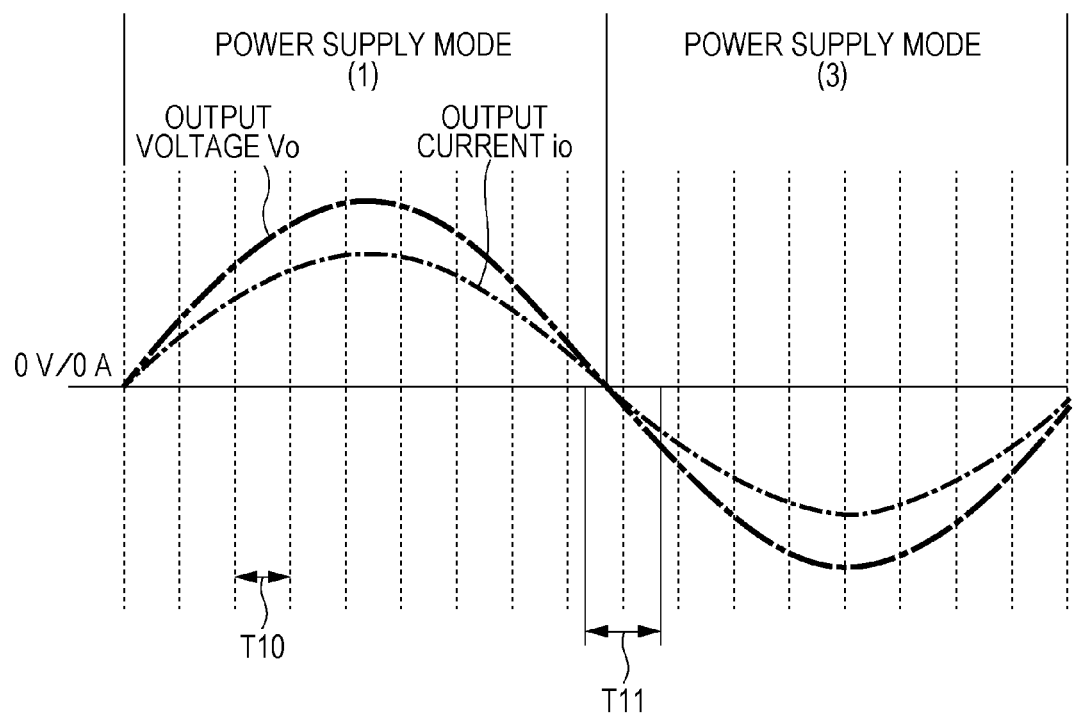
FIG. 3 is a diagram illustrating waveforms of an output voltage and an output current whose phase difference is 0°.
Figure 4:
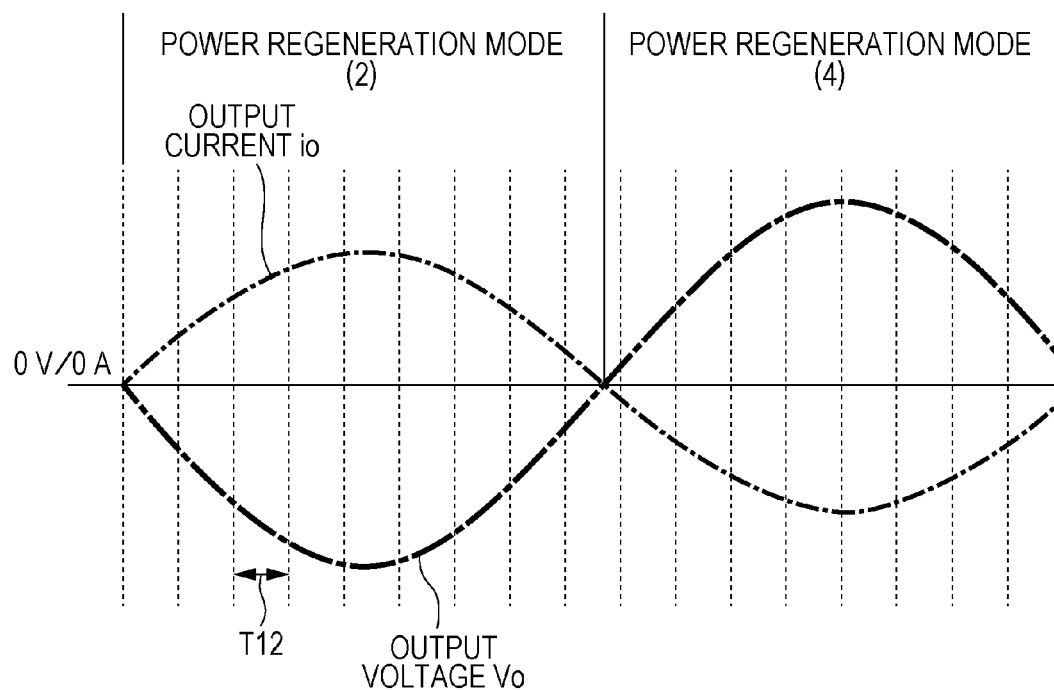
FIG. 4 is a diagram illustrating waveforms of an output voltage and an output current whose phase difference is 180°.

In the waveforms illustrated in FIG. 2, the phase difference between the output voltage Vo and the output current io is 90°, and the power supply mode alternates with the power regeneration mode. On the other hand, as illustrated in FIG. 3, if the phase difference between the output voltage Vo and the output current io are 0° (that is, the power factor is 1), only the power supply mode is established. Furthermore, as illustrated in FIG. 4, if the phase difference between the output voltage Vo and the output current io is 180° (that is, the power factor is 0), only the power regeneration mode is established. Although FIG. 2 illustrates a case of a lagging power factor, the same holds for a case of a leading power factor.

A table included in FIG. 2 indicates operations of the first to eighth switching devices S5 to S12. The operations of the first to eighth switching devices S5 to S12 differ between a case in which a transformer voltage V1 is positive in the power supply mode indicated by (1), a case in which the transformer voltage V1 is negative in the power supply mode indicated by (1), a case in which the transformer voltage V1 is positive in the power regeneration mode indicated by (2), a case in which the transformer voltage V1 is negative in the power regeneration mode indicated by (2), a case in which the transformer voltage V1 is positive in the power supply mode indicated by (3), a case in which the transformer voltage V1 is negative in the power supply mode indicated by (3), a case in which the transformer voltage V1 is positive in the power regeneration mode indicated by (4), and a case in which the transformer voltage V1 is negative in the power regeneration mode indicated by (4). In the table, a term "constantly on" means that a switching device in question remains turned on even while the polarity of voltage is reversing.

FIG. 5 is a timing chart illustrating a period T10 in the power supply mode illustrated in FIG. 3. FIG. 6 is a timing chart illustrating a period T12 in the power regeneration mode illustrated in FIG. 4. Primary drive signals are control signals for turning on the switching devices S1 to S4 included in the inverter circuit 5. The control unit 7 fixes phases of the primary drive signals and supplies the primary drive signals to the switching devices S1 to S4.

The transformer voltage V1 is the voltage of the secondary winding 21. A waveform of the voltage of the primary winding 19 is the same as a waveform of the voltage of the secondary winding 21, and accordingly illustration thereof is omitted. A transformer current i1 is the current of the secondary winding 21. A waveform of the current of the primary winding 19 is the same as a waveform of the current of the secondary winding 21, and accordingly illustration thereof is omitted.

Secondary drive signals are control signals for turning on the first to eighth switching devices S5 to S12 included in the cycloconverter 11.

As illustrated in FIGS. 1 and 2, since the output current io is positive in the power supply mode indicated by (1) and the power regeneration mode indicated by (2), the positive group converter operates. The control unit 7 turns on or off the first to fourth switching devices S5 to S8 included in the positive group converter.

On the other hand, since the output current io is negative in the power supply mode indicated by (3) and the power regeneration mode indicated by (4), the negative group converter operates. The operation of the negative group converter is basically the same as that of the positive group converter. Only switching devices that are turned on or off are different between the negative group converter and the positive group converter. In the power supply mode indicated by (3) and the power regeneration mode indicated by (4), therefore, the control unit 7 turns on or off, as illustrated in FIGS. 5 and 6, the sixth switching device S10, the fifth switching device S9, the eighth switching device S12, and the seventh switching device S11, instead of the first switching device S5, the second switching device S6, the third switching device S7, and the fourth switching device S8, respectively.

In the power supply mode and the power regeneration mode, the control unit 7 turns on or off the switching devices S1 to S4 included in the inverter circuit 5 in such a way as to constantly output high-frequency power whose duty ratio is 50% from the inverter circuit 5. The inverter circuit 5 therefore operates as a square wave oscillator that constantly symmetrically drives with a duty ratio of 50%. The control unit 7 controls the cycloconverter 11 in synchronization with the operation of the inverter circuit 5 to control the amplitude of the output voltage Vo (that is, to form the waveform of the output voltage Vo).

Figure 7:
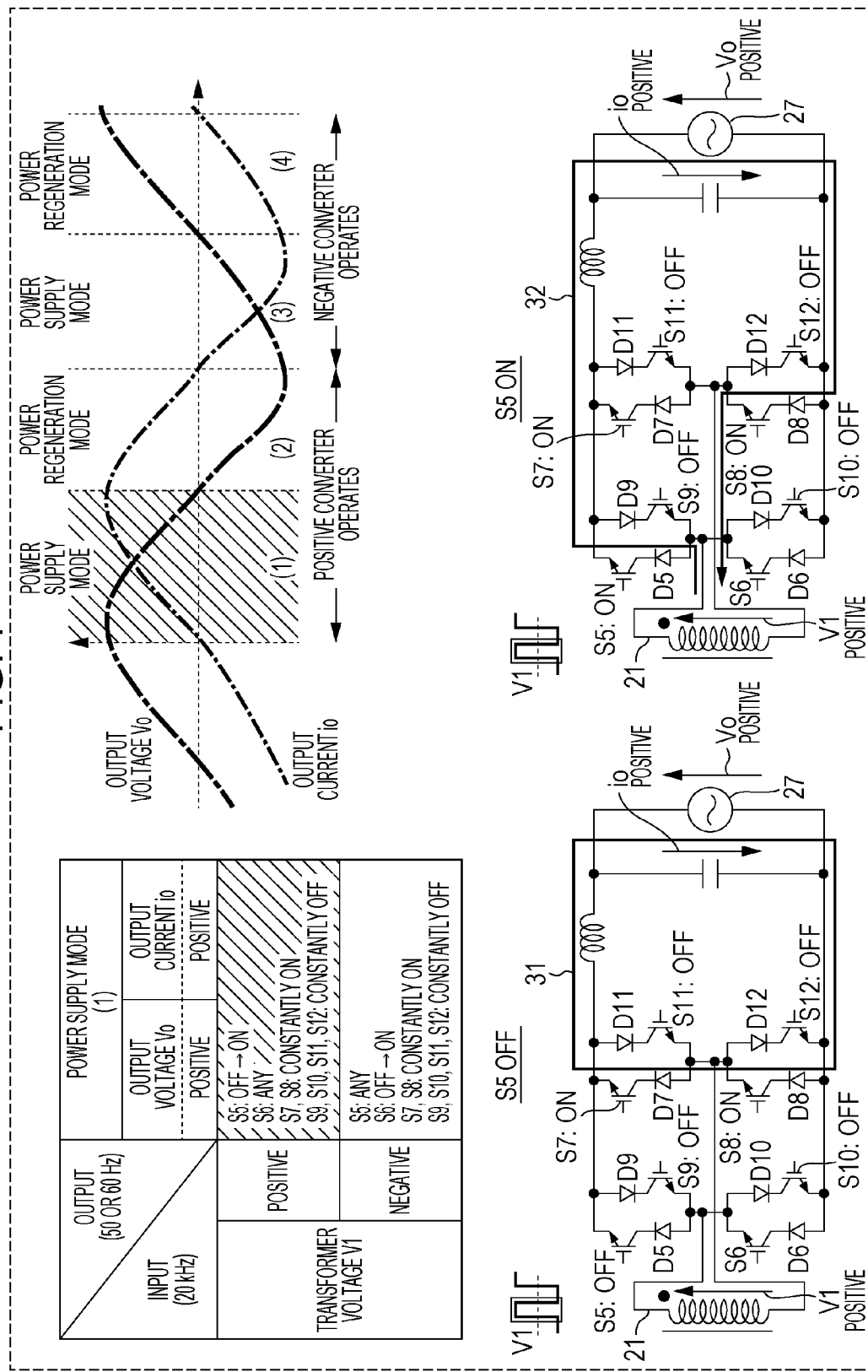
FIG. 7 is a first diagram illustrating the operation of a cycloconverter included in the power conversion apparatus according to the first embodiment.

First, control performed on the cycloconverter 11 when the transformer voltage V1 is positive in the power supply mode indicated by (1) will be described. FIG. 7 is a diagram illustrating the operation of the cycloconverter 11 in this case. FIG. 7 illustrates a circuit in a secondary side of the power conversion apparatus 1 illustrated in FIG. 1. The same holds for circuits illustrated in FIGS. 8 to 14. Although the commercial power system 27 is connected to the secondary side of the power conversion apparatus 1 in the following description, the same holds for a case in which the load 29 is connected to the secondary side of the power conversion apparatus 1.

As illustrated in FIGS. 5 and 7, the control unit 7 turns on the first switching device S5 among the switching devices S5 to S8 included in the positive group converter. The control unit 7 may keep the second switching device S6 turned on or off. FIG. 5 illustrates an example in which the control unit 7 keeps the second switching device S6 turned off. The control unit 7 constantly keeps the third switching device S7 and the fourth switching device S8 turned on.

The control unit 7 constantly keeps the fifth to eighth switching devices S9 to S12 included in the negative group converter turned off.

Alternatively, the operation of the first switching device S5 and the operation of the fourth switching device S8 may be switched. That is, the control unit 7 may constantly keep the first switching device S5 turned on and turn on the fourth switching device S8, instead.

In a period T1, in which the first switching device S5 is off, the current of the secondary side of the power conversion apparatus 1 flows through a path 31, which runs through the third switching device S7, the commercial power system 27, and the fourth switching device S8. In the period T1, a current path of the power conversion apparatus 1 is divided between a primary side and the secondary side. The transformer current i1 is therefore zero. Because reactive power is consumed only in the secondary side of the power conversion apparatus 1 and not regenerated to the primary side, power losses can be reduced.

In a period T2, in which the first switching device S5 has been turned on, the current of the secondary side of the power conversion apparatus 1 flows through a path 32, which runs through the first switching device S5, the commercial power system 27, and the fourth switching device S8. In the period T2, power from the DC power supply 17 is supplied to the commercial power system 27. In the period T2, the third switching device S7 is on, but because the third diode D7 is in a reverse bias stare, current does not flow through the third diode D7. Current therefore does not flow through the third switching device S7, although the third switching device S7 is on.

As described above, when the transformer voltage V1 is positive in the power supply mode indicated by (1), the control unit 7 performs control (phase shift) for causing current to start flowing through the first switching device S5.

Figure 8:
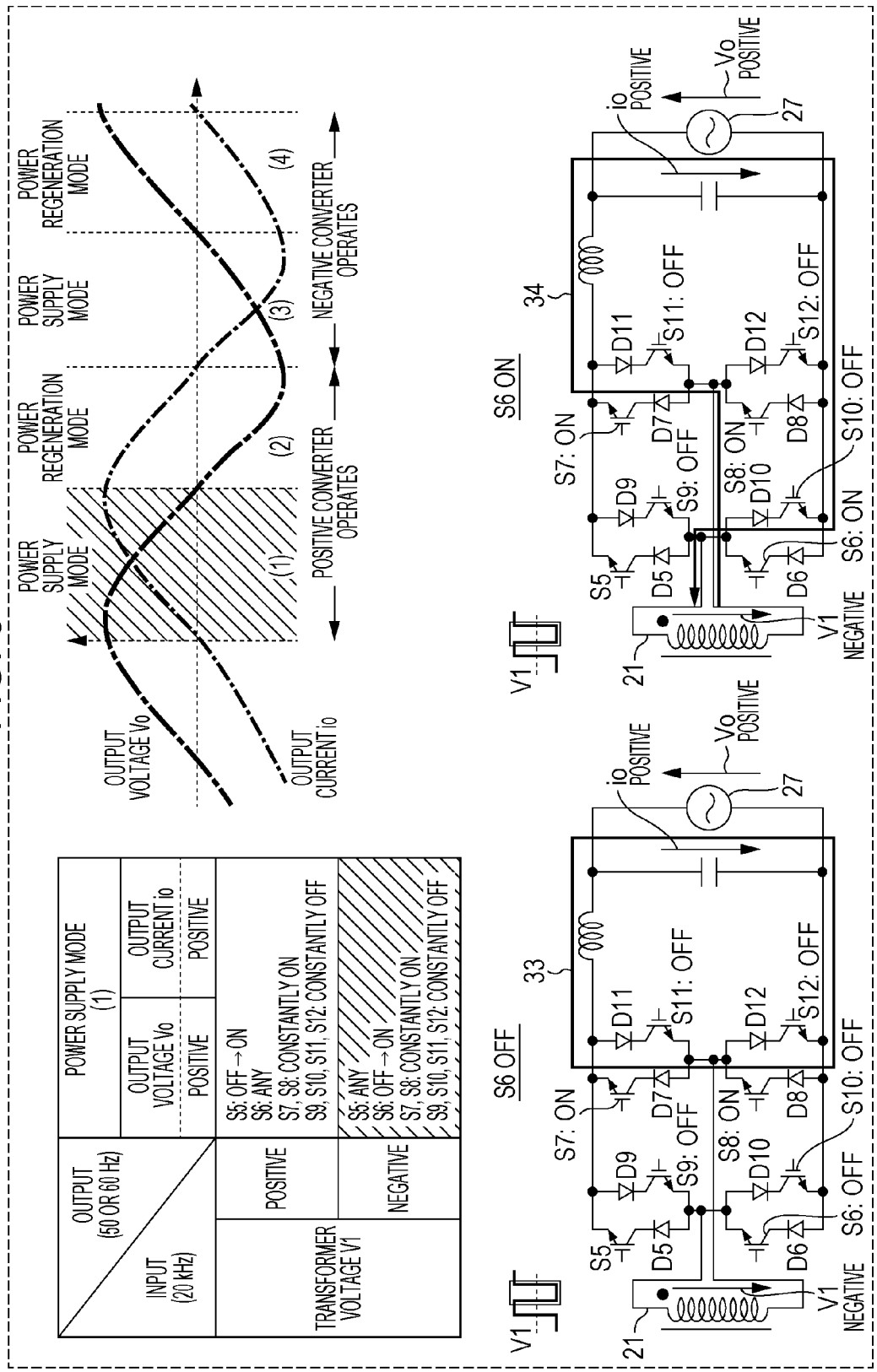
FIG. 8 is a second diagram illustrating the operation of the cycloconverter included in the power conversion apparatus according to the first embodiment.

FIG. 8 is a diagram illustrating the operation of the cycloconverter 11 at a time when the voltage of the transformer 9 is negative in the power supply mode indicated by (1). As illustrated in FIGS. 5 and 8, the control unit 7 may keep the first switching device S5 turned on or off among the switching devices S5 to S8 included in the positive group converter. FIG. 5 illustrates an example in which the control unit 7 keeps the first switching device S5 turned off. The control unit 7 turns on the second switching device S6. The control unit 7 constantly keeps the third switching device S7 and the fourth switching device S8 turned on.

The control unit 7 constantly keeps the fifth to eighth switching devices S9 to S12 included in the negative group converter turned off.

The operation of the second switching device S6 and the operation of the third switching device S7 may be switched. That is, the control unit 7 may constantly keep the second switching device S6 turned on and turn on the third switching device S7.

In a period T3, in which the second switching device S6 is off, the current of the secondary side of the power conversion apparatus 1 flows through a path 33, which runs through the third switching device S7, the commercial power system 27, and the fourth switching device S8. In the period T3, the current path of the power conversion apparatus 1 is divided between the primary side and the secondary side. The transformer current i1 is therefore zero. Because the reactive power is consumed only in the secondary side of the power conversion apparatus 1 and not regenerated to the primary side, power losses can be reduced.

In a period T4, in which the first switching device S6 has been turned on, the current of the secondary side of the power conversion apparatus 1 flows through a path 34, which runs through the third switching device S7, the commercial power system 27, and the second switching device S6. In the period T4, the power from the DC power supply 17 is supplied to the commercial power system 27. In the period T4, the fourth switching device S8 is on, but because the fourth diode D8 is in a reverse bias state, current does not flow through the fourth diode D8. Current therefore does not flow through the fourth switching device S8, although the fourth switching device S8 is on.

As described above, when the transformer voltage V1 is negative in the power supply mode indicated by (1), the control unit 7 performs control (phase shift) for causing current to start flowing through the second switching device S6.

Figure 9:
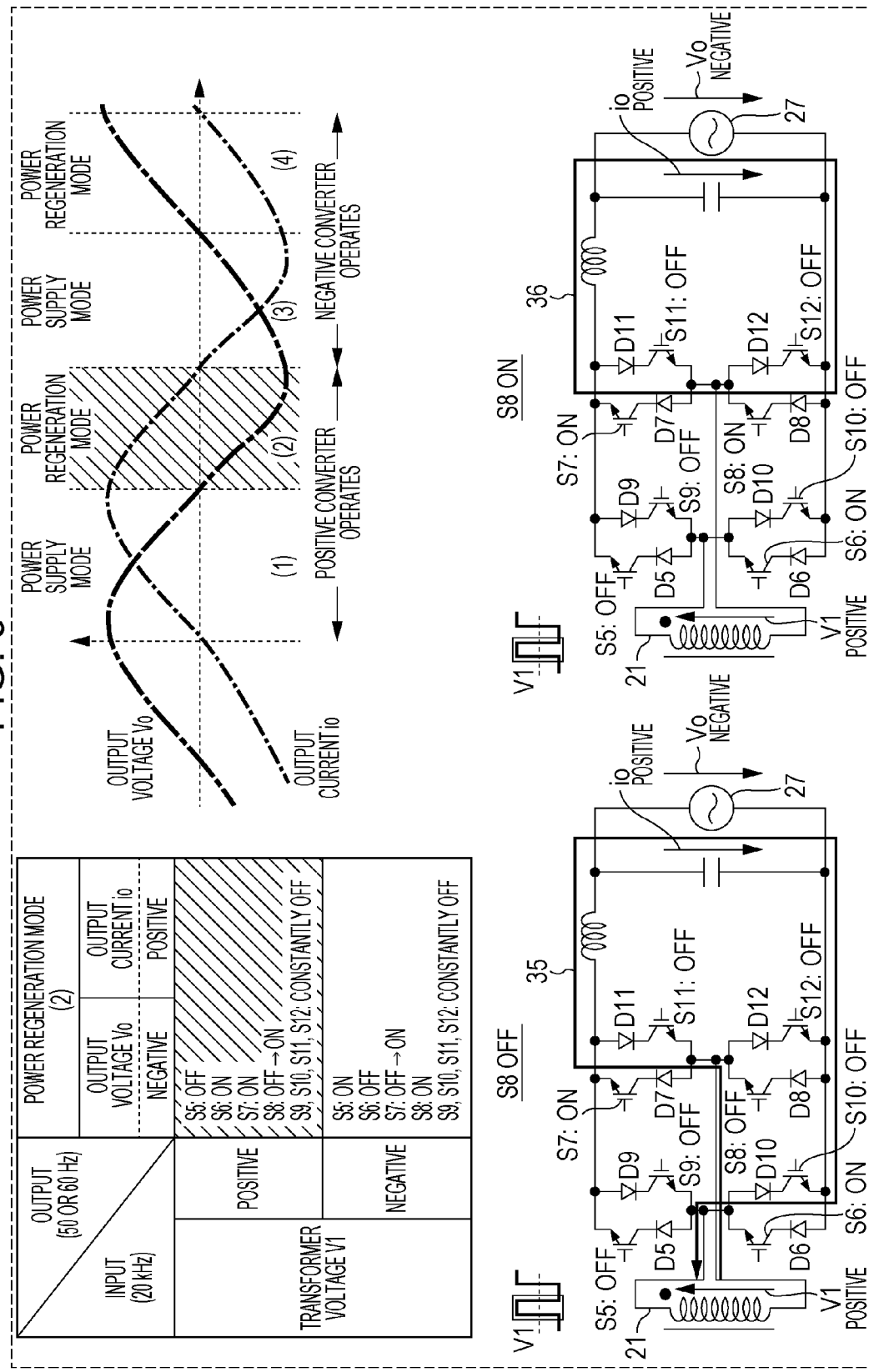
FIG. 9 is a third diagram illustrating the operation of the cycloconverter included in the power conversion apparatus according to the first embodiment.

FIG. 9 is a diagram illustrating the operation of the cycloconverter 11 at a time when the transformer voltage V1 is positive in the power generation mode indicated by (2). As illustrated in FIGS. 6 and 9, the control unit 7 keeps the first switching device S5 turned off among the switching devices S5 to S8 included in the positive group converter. The control unit 7 keeps the second switching device S6 and the third switching device S7 turned on. The control unit 7 turns on the fourth switching device S8.

The control unit 7 constantly keeps the fifth to eighth switching devices S9 to S12 included in the negative group converter turned off.

In a period T5, in which the fourth switching device S8 is off, the current of the secondary side of the power conversion apparatus 1 flows through a path 35, which runs through the third switching device S7, the commercial power system 27, and the second switching device S6. In the period T5, the power from the commercial power system 27 is regenerated to the DC power supply 17.

In a period T6, in which the fourth switching device S8 has been turned on, the current of the secondary side of the power conversion apparatus 1 flows through a path 36, which runs through the third switching device S7, the commercial power system 27, and the fourth switching device S8. Since the current path of the power conversion apparatus 1 is divided between the primary side and the secondary side in the period T6, the reactive power is consumed only in the secondary side of the power conversion apparatus 1 and not regenerated to the primary side.

In the period T6, the second switching device S6 is on, but because the second diode D6 is in a reverse bias state, current does not flow through the second diode D6. Current therefore does not flow through the second switching device S6, although the second switching device S6 is on.

As described above, when the transformer voltage V1 is positive in the power regeneration mode indicated by (2), the control unit 7 performs control (phase shift) for causing current to stop flowing through the second switching device S6 and control (phase shift) for causing current to start flowing through the fourth switching device S8.

Figure 10:
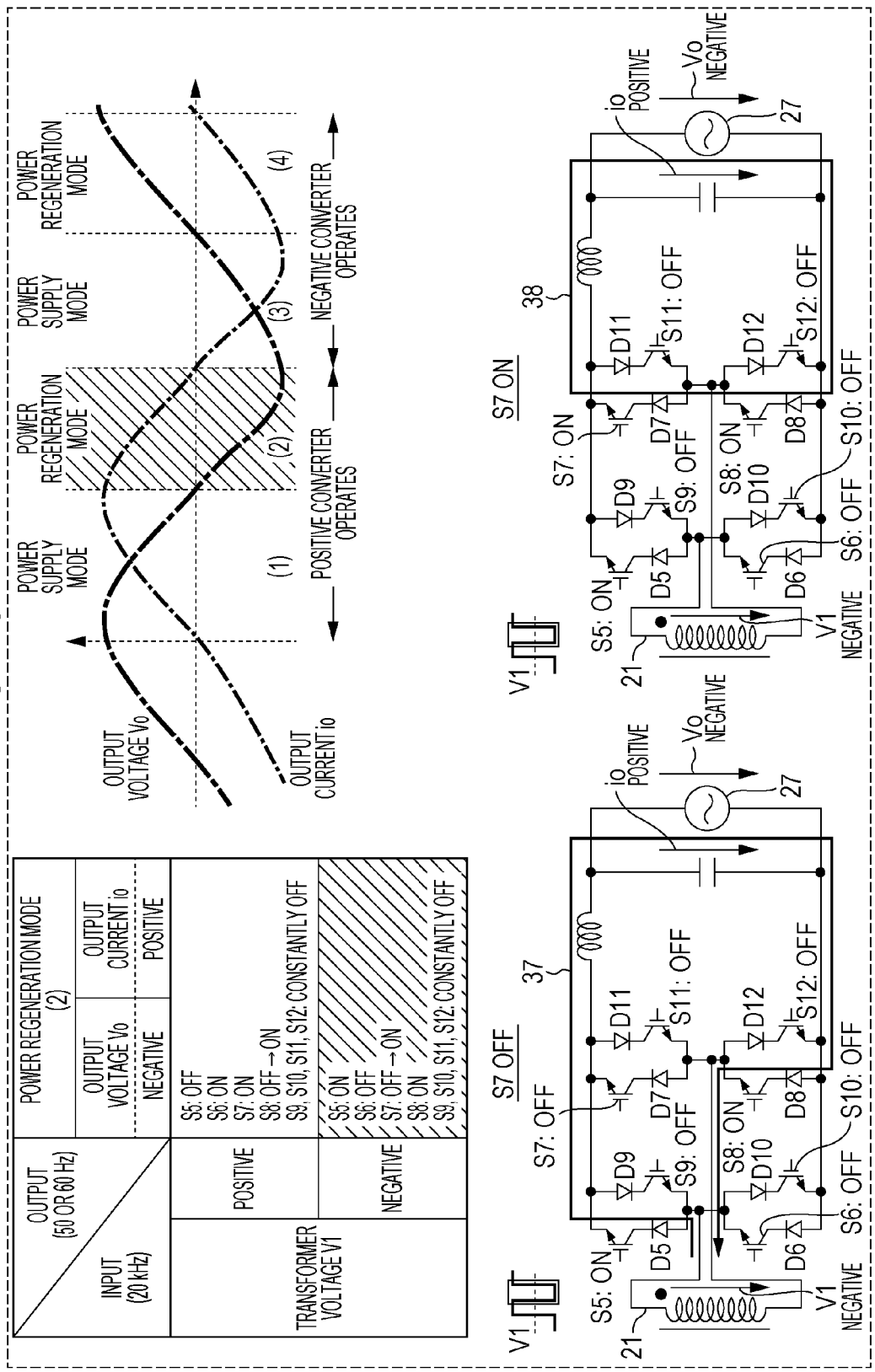
FIG. 10 is a fourth diagram illustrating the operation of the cycloconverter included in the power conversion apparatus according to the first embodiment.

FIG. 10 is a diagram illustrating the operation of the cycloconverter 11 at a time when the transformer voltage V1 is negative in the power generation mode indicated by (2). As illustrated in FIGS. 6 and 10, the control unit 7 keeps the first switching device S5 turned on among the switching devices S5 to S8 included in the positive group converter. The control unit 7 keeps the second switching device S6 turned off. The control unit 7 turns on the third switching device S7. The control unit 7 keeps the fourth switching device S8 turned on.

The control unit 7 constantly keeps the fifth to eighth switching devices S9 to S12 included in the negative group converter turned off.

In a period T7, in which the third switching device S7 has been turned off, the current of the secondary side of the power conversion apparatus 1 flows through a path 37, which runs through the first switching device S5, the commercial power system 27, and the fourth switching device S8. In the period T7, the power from the commercial power system 27 is regenerated to the DC power supply 17.

In a period T8, in which the third switching device S7 has been turned on, the current of the secondary side of the power conversion apparatus 1 flows through a path 38, which runs through the third switching device S7, the commercial power system 27, and the fourth switching device S8. Since the current path of the power conversion apparatus 1 is divided between the primary side and the secondary side in the period T8, the reactive power is consumed only in the secondary side of the power conversion apparatus 1 and not regenerated to the primary side.

In the period T8, the first switching device S5 is on, but because the first diode D5 is in a reverse bias state, current does not flow through the first diode D5. Current therefore does not flow through the first switching device S5, although the first switching device S5 is on.

As described above, when the transformer voltage V1 is negative in the power regeneration mode indicated by (2), the control unit 7 performs control (phase shift) for causing current to stop flowing through the first switching device S5 and control (phase shift) for causing current to start flowing through the third switching device S7.

Figure 11:
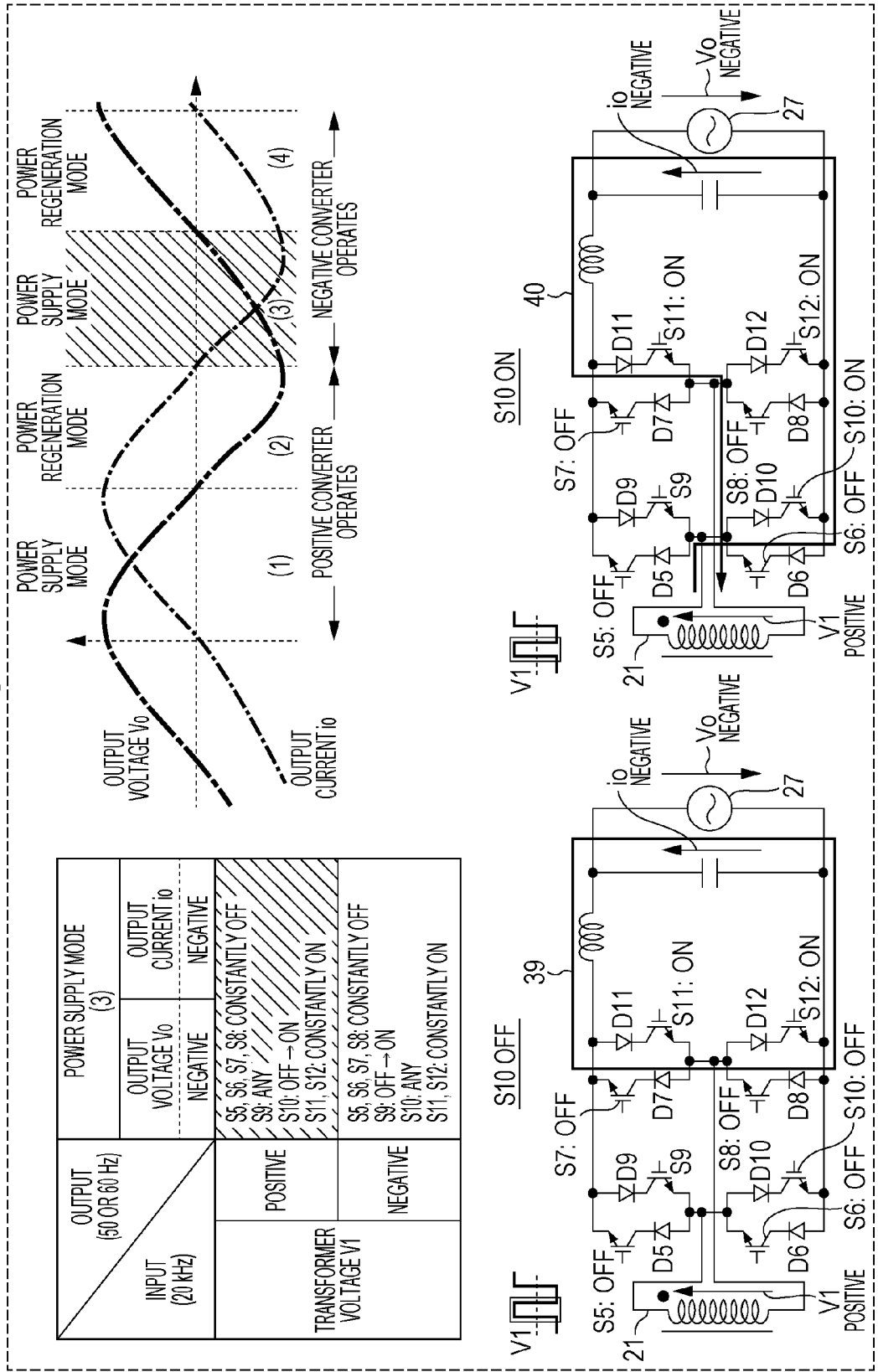
FIG. 11 is a fifth diagram illustrating the operation of the cycloconverter included in the power conversion apparatus according to the first embodiment.

FIG. 11 is a diagram illustrating the operation of the cycloconverter 11 at a time when the transformer voltage V1 is positive in the power supply mode indicated by (3). As illustrated in FIGS. 5 and 11, the control unit 7 may keep the fifth switching device S9 turned on or off among the switching devices S9 to S12 included in the negative group converter. FIG. 5 illustrates an example in which the control unit 7 keeps the fifth switching device S9 turned off. The control unit 7 turns on the sixth switching device S10. The control unit 7 constantly keeps the seventh switching device S11 and the eighth switching device S12 turned on.

The control unit 7 constantly keeps the first to fourth switching devices S5 to S8 included in the positive group converter turned off.

The operation of the sixth switching device S10 and the operation of the seventh switching device S11 may be switched. That is, the control unit 7 may constantly keep the sixth switching device S10 turned on and turn on the seventh switching device S11.

In the period T1, in which the sixth switching device S10 is off, the current of the secondary side of the power conversion apparatus 1 flows through a path 39, which runs through the eighth switching device S12, the commercial power system 27, and the seventh switching device S11. In the period T1, the current path of the power conversion apparatus 1 is divided between the primary side and the secondary side. The transformer current i1 is therefore zero. Because the reactive power is consumed only in the secondary side of the power conversion apparatus 1 and not regenerated to the primary side, power losses can be reduced.

In the period T2, in which the sixth switching device S10 has been turned on, the current of the secondary side of the power conversion apparatus 1 flows through a path 40, which runs through the sixth switching device S10, the commercial power system 27, and the seventh switching device S11. In the period T2, the power from the DC power supply 17 is supplied to the commercial power system 27. In the period T2, the eighth switching device S12 is on, but because the eighth diode D12 is in a reverse bias state, current does not flow through the eighth diode D12. Current therefore does not flow through the eighth switching device S12 although the eighth switching device S12 is on. In the power supply mode indicated by (3), the output voltage Vo is negative.

As described above, when the transformer voltage V1 is positive in the power supply mode indicated by (3), the control unit 7 performs control (phase shift) for causing current to start flowing through the sixth switching device S10.

Figure 12:
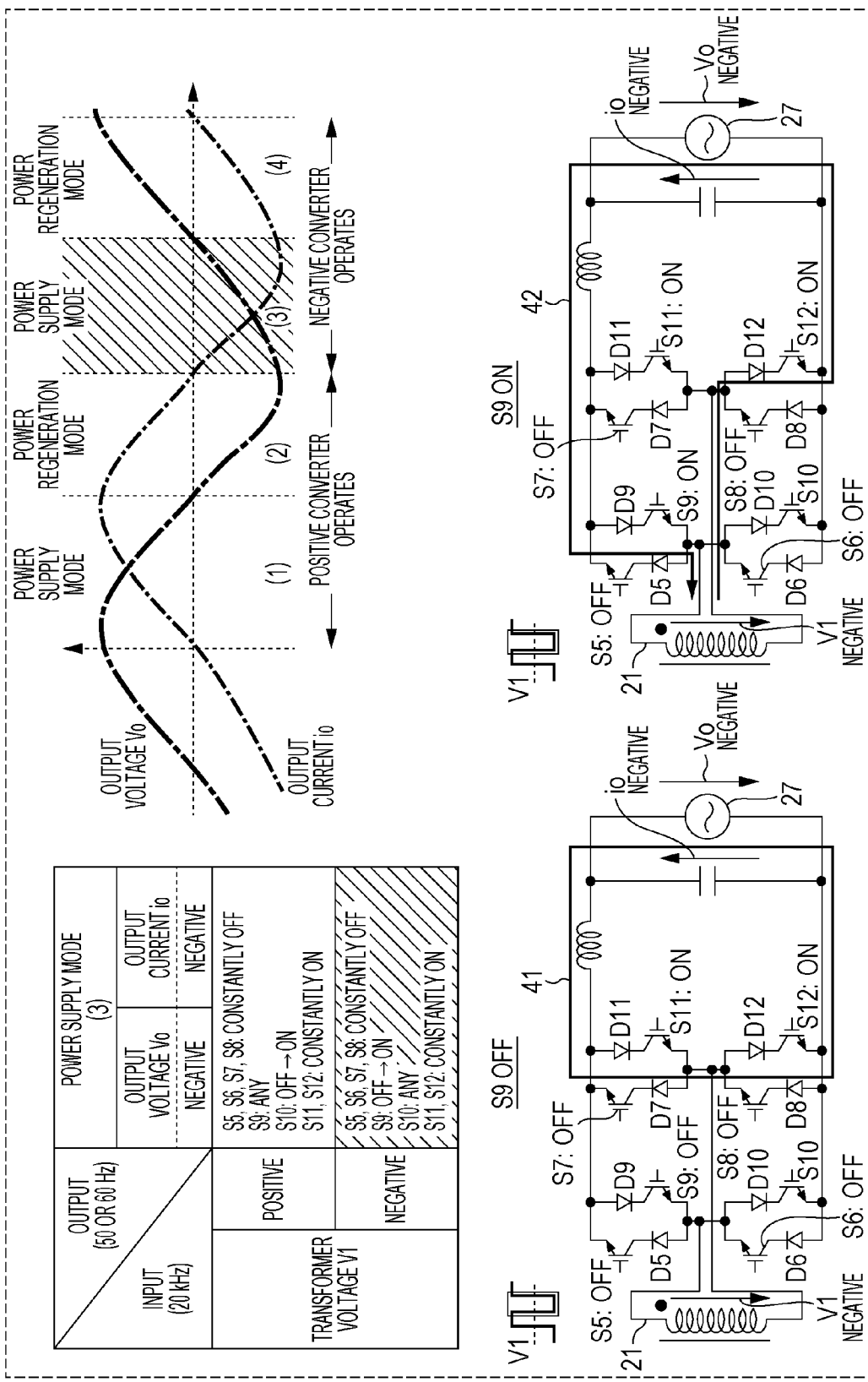
FIG. 12 is a sixth diagram illustrating the operation of the cycloconverter included in the power conversion apparatus according to the first embodiment.

FIG. 12 is a diagram illustrating the operation of the cycloconverter 11 at a time when the transformer voltage V1 is negative in the power supply mode indicated by (3). As illustrated in FIGS. 5 and 12, the control unit 7 turns on the fifth switching device S9 among the switching devices S9 to S12 included in the negative group converter. The control unit 7 may keep the sixth switching device S10 turned on or off. FIG. 5 illustrates an example in which the control unit 7 keeps the sixth switching device S10 turned off. The control unit 7 constantly keeps the seventh switching device S11 and the eighth switching device S12 turned on.

The control unit 7 constantly keeps the first to fourth switching devices S5 to S8 included in the positive group converter turned off.

The operation of the fifth switching device S9 and the operation of the eighth switching device S12 may be switched. That is, the control unit 7 may constantly keep the fifth switching device S9 turned on and turn on the eighth switching device S12.

In the period T3, in which the fifth switching device S9 is off, the current of the secondary side of the power conversion apparatus 1 flows through a path 41, which runs through the eighth switching device S12, the commercial power system 27, and the seventh switching device S11. In the period T3, the current path of the power conversion apparatus 1 is divided between the primary side and the secondary side. The transformer current i1 is therefore zero. Because the reactive power is consumed only in the secondary side of the power conversion apparatus 1 and not regenerated to the primary side, power losses can be reduced.

In the period T4, in which the fifth switching device S9 has been turned on, the current of the secondary side of the power conversion apparatus 1 flows through a path 42, which runs through the eighth switching device S12, the commercial power system 27, and the fifth switching device S9. In the period T4, the power from the DC power supply 17 is supplied to the commercial power system 27. In the period T4, the seventh switching device S11 is on, but because the seventh diode D11 is in a reverse bias state, current does not flow through the seventh diode D11. Current therefore does not flow through the seventh switching device S11, although the seventh switching device S11 is on.

As described above, when the transformer voltage V1 is negative in the power supply mode indicated by (3), the control unit 7 performs control (phase shift) for causing current to start flowing through the fifth switching device S9.

Figure 13:
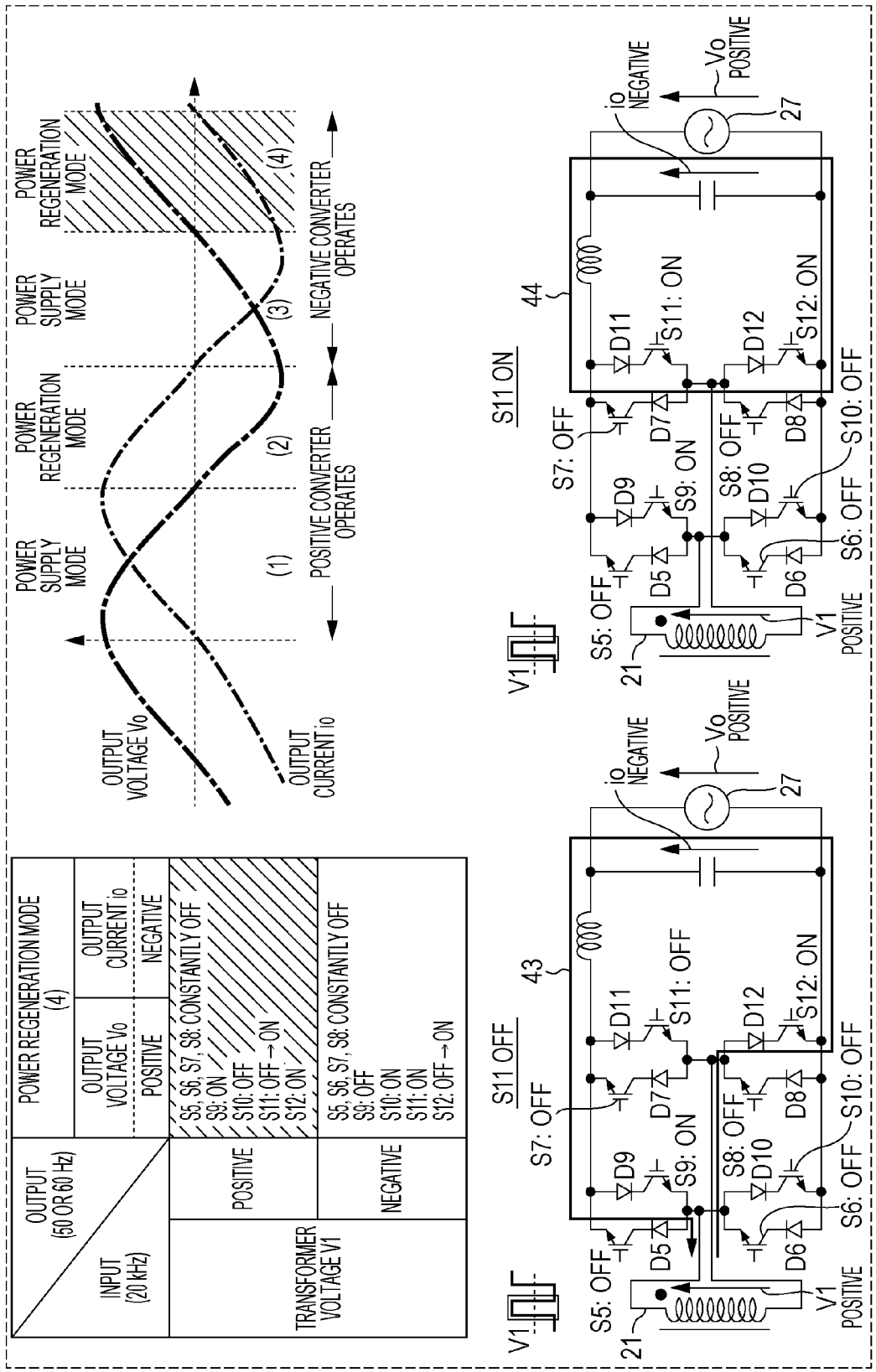
FIG. 13 is a seventh diagram illustrating the operation of the cycloconverter included in the power conversion apparatus according to the first embodiment.

FIG. 13 is a diagram illustrating the operation of the cycloconverter 11 at a time when the transformer voltage V1 is positive in the power regeneration mode indicated by (4). As illustrated in FIGS. 6 and 13, the control unit 7 keeps the fifth switching device S9 turned on among the switching devices S9 to S12 included in the negative group converter. The control unit 7 keeps the sixth switching device S10 turned off. The control unit 7 turns on the seventh switching device S11. The control unit 7 keeps the eighth switching device S12 turned on.

The control unit 7 constantly keeps the first to fourth switching devices S5 to S8 included in the positive group converter turned off.

In the period T5, in which the seventh switching device S11 is off, the current of the secondary side of the power conversion apparatus 1 flows through a path 43, which runs through the eighth switching device S12, the commercial power system 27, and the fifth switching device S9. In the period T5, the power from the commercial power system 27 is regenerated to the DC power supply 17. In the power regeneration mode indicated by (4), the output voltage Vo is positive.

In the period T6, in which the seventh switching device S11 has been turned on, the current of the secondary side of the power conversion apparatus 1 flows through a path 44, which runs through the eighth switching device S12, the commercial power system 27, and the seventh switching device S11. Since the current path of the power conversion apparatus 1 is divided between the primary side and the secondary side in the period T6, the reactive power is consumed only in the secondary side of the power conversion apparatus 1 and not regenerated to the primary side.

In the period T6, the fifth switching device S9 is on, but because the fifth diode D9 is in a reverse bias state, current does not flow through the fifth diode D9. Current therefore does not flow through the fifth switching device S9, although the fifth switching device S9 is on.

As described above, when the transformer voltage V1 is positive in the power regeneration mode indicated by (4), the control unit 7 performs control (phase shift) for causing current to stop flowing through the fifth switching device S9 and control (phase shift) for causing current to start flowing through the seventh switching device S11.

Figure 14:
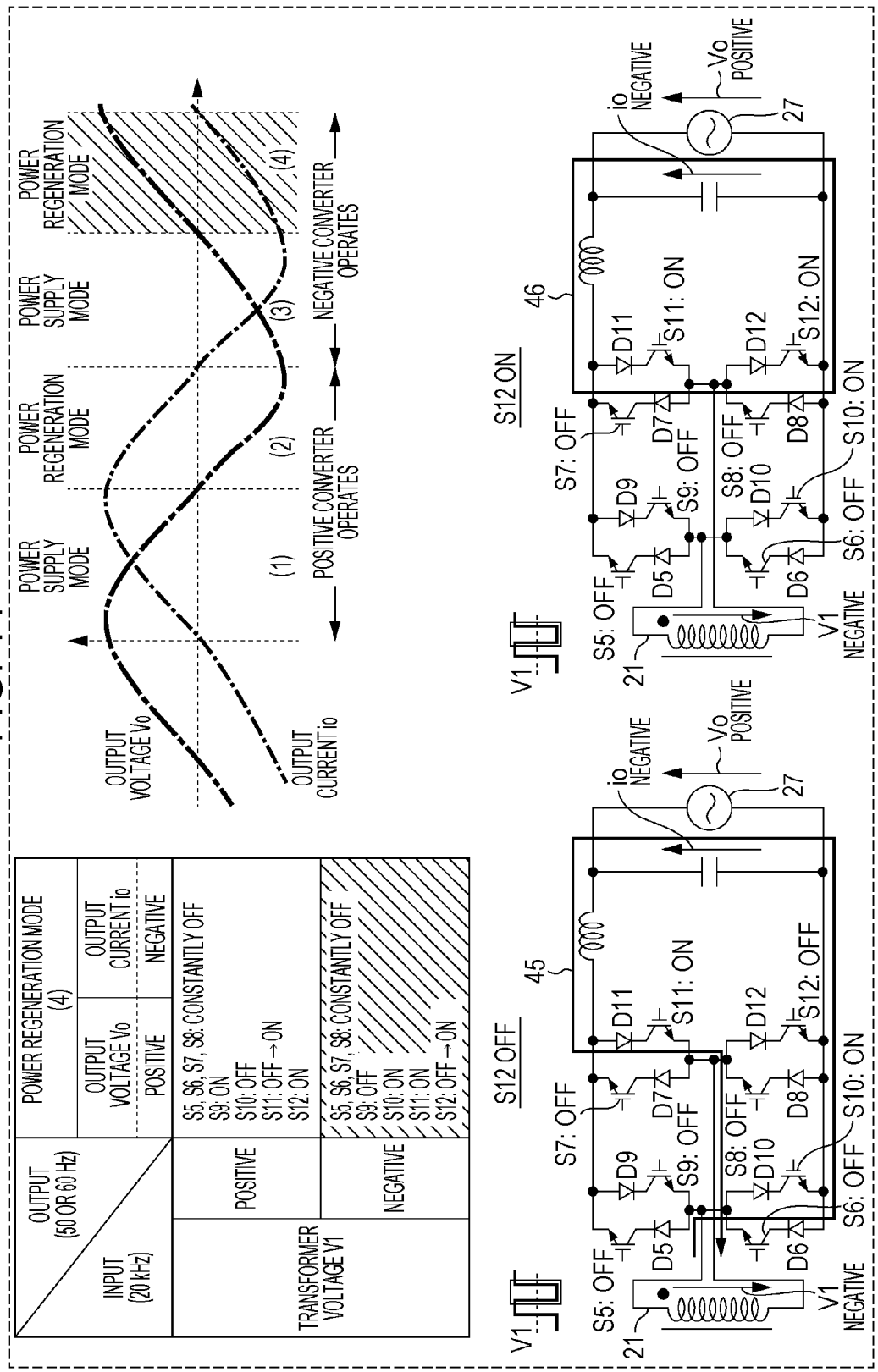
FIG. 14 is an eighth diagram illustrating the operation of the cycloconverter included in the power conversion apparatus according to the first embodiment.

FIG. 14 is a diagram illustrating the operation of the cycloconverter 11 at a time when the transformer voltage V1 is negative in the power regeneration mode indicated by (4). As illustrated in FIGS. 6 and 14, the control unit 7 keeps the fifth switching device S9 turned off among the switching devices S9 to S12 included in the negative group converter. The control unit 7 keeps the sixth switching device S10 and the seventh switching device S11 turned on. The control unit 7 turns on the eighth switching device S12.

The control unit 7 constantly keeps the first to fourth switching devices S5 to S8 included in the positive group converter turned off.

In the period T7, in which the eighth switching device S12 has been turned off, the current of the secondary side of the power conversion apparatus 1 flows through a path 45, which runs through the sixth switching device S10, the commercial power system 27, and the seventh switching device S11. In the period T7, the power from the commercial power system 27 is regenerated to the DC power supply 17.

In the period T8, in which the eighth switching device S12 has been turned on, the current of the secondary side of the power conversion apparatus 1 flows through a path 46, which runs through the eighth switching device S12, the commercial power system 27, and the seventh switching device S11. Since the current path of the power conversion apparatus 1 is divided between the primary side and the secondary side in the period T8, the reactive power is consumed only in the secondary side of the power conversion apparatus 1 and not regenerated to the primary side.

In the period T8, the sixth switching device S10 is on, but because the sixth diode D10 is in a reverse bias state, current does not flow through the sixth diode D10. Current therefore does not flow through the sixth switching device S10, although the sixth switching device S10 is on.

As described above, when the transformer voltage V1 is negative in the power regeneration mode indicated by (4), the control unit 7 performs control (phase shift) for causing current to stop flowing through the sixth switching device S10 and control (phase shift) for causing current to start flowing through the eighth switching device S12.

The operation of the power conversion apparatus 1 indicated in the table of FIG. 2 has been described.

A first on time Ton1 illustrated in FIG. 5 is when the first switching device S5 or the sixth switching device S10 turns on in a first period, in which the transformer voltage V1 (the voltage of the secondary winding 21) is positive. A second on time Ton2 is when the second switching device S6 or the fifth switching device S9 turns on in a second period, in which the transformer voltage V1 (the voltage of the secondary winding 21) is negative, after the first period.

A third on time Ton3 illustrated in FIG. 6 is when the first switching device S5 or the sixth switching device S10 turns on in the first period. A fourth on time Ton4 is when the fourth switching device S8 or the seventh switching device S11 turns on in the first period before the third on time Ton3. A fifth on time Ton5 is when the second switching device S6 or the fifth switching device S9 turns on in the second period. A sixth on time Ton6 is when the third switching device S7 or the eighth switching device S12 turns on in the second period before the fifth on time Ton5.

FIG. 6 is a timing chart illustrating an example of the power regeneration mode. FIG. 15 is a timing chart illustrating another example of the power regeneration mode. That is, FIG. 15 is a timing chart illustrating another example of the power regeneration mode in the period T12 illustrated in FIG. 4 during asymmetric control.

A third on time Ton3 illustrated in FIG. 15 is when the first switching device S5 or the sixth switching device S10 turns on in the second period. A third off time Toff3 is when the first switching device S5 or the sixth switching device S10 turns off in the second period after the third on time Ton3.

A fifth on time Ton5 is when the second switching device S6 or the fifth switching device S9 turns on in the third period. A fifth off time Toff5 is when the second switching device S6 or the fifth switching device S9 turns off in the first period before the fifth on time Ton5.

A sixth on time Ton6 is when the third switching device S7 or the eighth switching device S12 turns on in the second period before the third off time Toff3.

A fourth on time Ton4 is when the fourth switching device S8 or the seventh switching device S11 turns on in the first period before the fifth off time Toff5. A fourth off time Toff4 is when the fourth switching device S8 or the seventh switching device 311 turns off after the fifth on time Ton5.

A sixth off time Toff6 is when the third switching device S7 or the eighth switching device S12 turns off after the third on time Ton3 but before the sixth on time Ton6.

The control unit 7 fixes timings at which the switching devices S1 to S4 in the primary side turn on and off and then controls the amplitude of at least either the output voltage Vo or the output current io by shifting the first on time Ton1, the second on time Ton2, the fourth on time Ton4, and the sixth on time Ton6 by a certain length of time α.

If the DC power supply 17 and the commercial power system 27 are connected to each other (grid-connected operation), the control unit 7 controls the amplitude of the output current io. If the DC power supply 17 and the load 29 are connected to each other (grid-independent operation), the control unit 7 controls the amplitude of the output voltage Vo and the output current io. An example will be described hereinafter in which the control unit 7 controls the amplitude of the output voltage Vo and the output current io.

More specifically, if the certain length of time α is reduced in the power supply mode illustrated in FIG. 5, the amplitude of the output voltage Vo and the output current io increases. If the certain length of time α is increased, the amplitude of the output voltage Vo and the output current io decreases. If the certain length of time α is reduced in the power regeneration mode illustrated in FIGS. 6 and 15, the amplitude of the output voltage Vo and the output current io decreases. If the certain length of time α is increased, the amplitude of the output voltage Vo and the output current io increases.

Alternatively, the control unit 7 may control the amplitude of the output voltage Vo and the output current io by shifting at least either the first on time Ton1 or the second on time Ton2 by the certain length of time α. Alternatively, the control unit 7 may control the amplitude of the output voltage Vo and the output current io by shifting at least either the fourth on time Ton4 or the sixth on time Ton6 by the certain length of time α.

As illustrated in FIGS. 5, 6, and 15, when the positive group converter operates, the control unit 7 asymmetrically controls a combination of the first switching device S5 and the fourth switching device S8 and a combination of the second switching device S6 and the third switching device S7. When the negative group converter operates, the control unit 7 asymmetrically controls a combination of the sixth switching device S10 and the seventh switching device S11 and a combination of the fifth switching device S9 and the eighth switching device S12. This will be referred to as "asymmetric control". The control unit 7 may symmetrically control these combinations, instead. This will be referred to as "symmetric control". In asymmetric control, a plurality of devices are controlled differently, and in symmetric control, a plurality of devices are controlled in the same manner.

FIG. 16 is a timing chart illustrating the period T10 in the power supply mode illustrated in FIG. 3 under symmetric control. FIG. 17 is a timing chart illustrating the period T12 in the power regeneration mode illustrated in FIG. 4 under symmetric control. Unlike in the timing charts of FIGS. 5, 6, and 15, when the positive group converter operates, the control unit 7 symmetrically controls the combination of the first switching device S5 and the fourth switching device S8 and the combination of the second switching device S6 and the third switching device S7. When the negative group converter operates, the control unit 7 symmetrically controls the combination of the sixth switching device S10 and the seventh switching device S11 and the combination of the fifth switching device S9 and the eighth switching device S12.

In the case of symmetric control, there are periods in which the DC power supply 17 supplies power to the commercial power system 27 and periods in which the commercial power system 27 regenerates power to the DC power supply 17 regardless of whether the mode used is the power supply mode or the power regeneration mode. The control unit 7 controls the amplitude of the output voltage Vo and the output current io by changing the length of each period.

In the case of symmetric control, there are periods in which the commercial power system 27 regenerates power to the DC power supply 17 in a cycle of the transformer voltage V1 in the power supply mode, and there are periods in which the DC power supply 17 supplies power to the commercial power system 27 in a cycle of the transformer voltage V1 in the power regeneration mode. These periods result in power losses.

On the other hand, in the case of the asymmetric control illustrated in FIGS. 5, 6, and 15, there are no periods in which the commercial power system 27 regenerates power to the DC power supply 17 in a cycle of the transformer voltage V1 in the power supply mode. Although there might be periods in which the DC power supply 17 supplies power to the commercial power system 27 in a cycle of the transformer voltage V1 in the power regeneration mode, these periods only last for an extremely short period of time. Since little wasteful regenerative current or supply current is generated in asymmetric control compared to symmetric control, efficient power conversion can be realized.

Switching between asymmetric control and symmetric control can be realized only by changing timings at which the first to eighth switching devices S5 to S12 included in the cycloconverter 11 are turned on and off, unless optimization of circuit constants and other factors are taken into consideration.

According to a grid-connected inverter apparatus disclosed in Japanese Patent No. 4100125, power is not regenerated to the primary side. If a low power factor load is connected to the grid-connected inverter apparatus in a grid-independent operation, the secondary side consumes regenerative power. As a result, if the DC power supply 17 is a storage battery, it is difficult to charge the storage battery in this grid-connected inverter apparatus.

According to the power conversion apparatus 1 according to the present embodiment, as illustrated in FIGS. 6, 15, and 17, the commercial power system 27 can regenerate power to the DC power supply 17. As a result, if the DC power supply 17 is a storage battery, the storage battery can be charged.

In addition, according to the power conversion apparatus 1 according to the present embodiment, the cycloconverter 11 directly converts the high-frequency power generated by the inverter circuit 5 into AC power without initially converting the high-frequency power into DC power. As a result, the power conversion apparatus 1 causes little power losses and the size thereof can be reduced.

Next, a commutation operation performed the power conversion apparatus 1 will be described. As illustrated in FIGS. 5, 6, 15, 16, and 17, dead times are provided in order to prevent simultaneous short circuits of upper and lower arms of the inverter circuit 5 on the primary side. That is, in order to prevent short circuits caused when the switching device S1 and the switching device S2 are both on, the control unit 7 separates an on period of the switching device S1 and an on period of the switching device S2 from each other. Similarly, in order to prevent short circuits caused when the switching device S3 and the switching device S4 are both on, the control unit 7 separates an on period of the switching device S3 and an on period of the switching device S4 from each other.

On the other hand, overlapping times are provided for the cycloconverter 11 on the secondary side. That is, the control unit 7 causes a commutation current in the secondary side of the power conversion apparatus 1 by providing a period in which an on period of the first switching device S5 and an on period of the third switching device S7 overlap, a period in which an on period of the second switching device S6 and an on period of the fourth switching device S8 overlap, a period in which an on period of the sixth switching device S10 and an on period of the eighth switching device S12 overlap, and a period in which an on period of the fifth switching device S9 and an on period of the seventh switching device S11 overlap. The overlapping times will be described while taking circuit operations in the period T2 illustrated in FIG. 5 and a period T9 after the period T2 as an example.

FIG. 18 is a circuit diagram illustrating currents flowing through the circuitry of the power conversion apparatus 1 in the period T2. As illustrated in FIG. 7, in the period T2, the DC power supply 17 supplies power to the commercial power system 27. A current from the DC power supply 17 flows through a path S1, which runs through the switching device S1, the primary winding 19 of the transformer 9, and the switching device S4. As a result, in the secondary side, current flows through a path 52, which runs through the secondary winding 21 of the transformer 9, the first diode D5, the first switching device S5, the commercial power system 27, the fourth diode D8, and the fourth switching device S8. In the period T2, the third switching device S7 is on, but because the third diode D7 is in a reverse bias state, current does not flows through the third switching device S7.

FIG. 19 is a circuit diagram illustrating a current flowing through the circuitry of the power conversion apparatus 1 in the period T9. The control unit 7 shifts from the period T2 to the period T9 by turning off the switching devices S1 and S4. In the primary side, current flows through a path 53, which runs through the freewheeling diode D2, the primary winding 19, and the freewheeling diode D3.

When the switching devices S1 and S4 are turned off, the polarity of the voltage (transformer voltage V1) of the secondary winding 21 of the transformer 9 reverses. As a result, the third diode D7 enters a forward bias state, and the first diode D5 enters a reverse bias state. In the secondary side, commutation occurs in which the current that has been flowing through the first diode D5 and the first switching device S5 now flows through the third diode D7 and the third switching device S7.

In the period T9, the commutation occurs in accordance with characteristics of the first diode D5 and the third diode D7 with the first switching device S5 and the third switching device S7 turned on. The current that has been flowing through the first diode D5 and the first switching device S5 therefore gradually begins to flow through the third diode D7 and the third switching device S7.

The first switching device S5 is configured in advance to be turned off after the commutation is completed. That is, after the commutation is completed, the control unit 7 turns off the first switching device S5.

As described above, according to the present embodiment, when the current flowing through the third diode D7 is zero, the third diode D7 can be turned on. When the voltage applied to the first diode D5 is zero and the current flowing through the first diode D5 is zero, the first diode D5 can be turned off. The current path can thus be changed through soft switching, not by forcibly blocking current.

In order to realize the soft switching, the power conversion apparatus 1 has the following configuration. The first diode D5 and the first switching device S5 are connected in series with each other and the third diode D7 and the third switching device S7 are connected in series with each other so that either the first diode D5 or the third diode D7 is in a reverse bias state and the other is in a forward bias state when the control unit 7 commutates a current path that runs through either the first switching device S5 or the third switching device S7 to establish a current path that runs through the other.

Similarly, the second diode D6 and the second switching device S6 are connected in series with each other and the fourth diode D8 and the fourth switching device S8 are connected in series with each other so that either the second diode D6 or the fourth diode D8 is in a reverse bias state and the other is in a forward bias state when the control unit 7 commutates a current path that runs through either the second switching device S6 or the fourth switching device S8 to establish a current path that runs through the other.

Next, switching from the positive group converter to the negative group converter will be described. FIG. 20 is a timing chart illustrating the operation of the positive group converter and the negative group converter under the asymmetric control illustrated in FIG. 5 in a period T11 illustrated in FIG. 3, in which the polarity of the output current io reverses.

While the positive group converter is operating (on), pulse-width modulation (PWM) signals are secondary drive signals for the first switching device S5, the second switching device S6, the third switching device S7, and the fourth switching device S8. While the negative group converter is operating (on), PWM signals are secondary drive signals for the fifth switching device S9, the sixth switching device S10, the seventh switching device S11, and the eighth switching device S12.

As indicated by the periods T2 and T4 illustrated in FIG. 5, for example, power supply periods are periods in which the DC power supply 17 supplies power to the commercial power system 27. As indicated by the periods T1 and T3, for example, power non-supply periods are periods in which the DC power supply 17 does not supply power to the commercial power system 27.

With the operation of the negative group converter stopped, the control unit 7 gradually reduces generation periods of the PWM signals, that is, gradually delays the first on time Ton1 and the second on time Ton2, for the positive group converter. As a result, the positive output current io gradually decreases and reaches zero. Thereafter, with the operation of the positive group converter stopped, the control unit 7 gradually increases the generation periods of the PWM signals, that is, gradually advances the first on time Ton1 and the second on time Ton2, for the negative group converter. As a result, the negative output current io gradually increases in a negative direction.

The period illustrated in the timing chart of FIG. 5 includes power supply periods and power non-supply periods, except for transitional periods (for example, the period T9) in which the polarity of the transformer voltage V1 reverses. A case will be described in which the control unit 7 switches from the positive group converter to the negative group converter in a power supply period.

Figure 21:
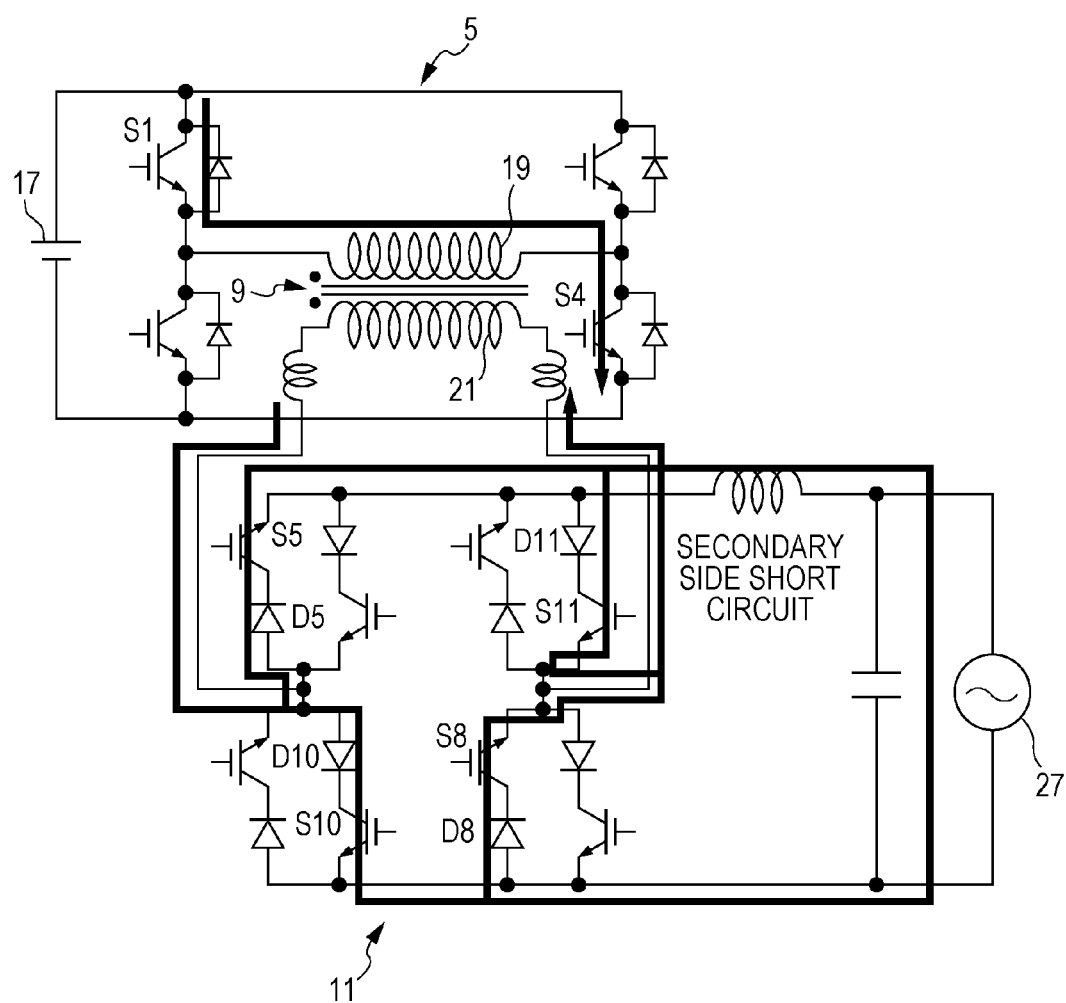
FIG. 21 is a circuit diagram illustrating currents flowing through the circuitry of the power conversion apparatus while a control unit is switching from the positive group converter to the negative group converter in a power supply period.

As described above, FIG. 18 is a circuit diagram illustrating currents flowing through the circuitry of the power conversion apparatus 1 in a power supply period in which the positive group converter operates. FIG. 21 is a circuit diagram illustrating currents flowing through the circuitry of the power conversion apparatus 1 while the control unit 7 is switching from the positive group converter to the negative group converter.

When the first switching device S5 and the fourth switching device S8 included in the positive group converter and the sixth switching device S10 and the seventh switching device S11 included in the negative group converter are on in this state, the first diode D5, the fourth diode D8, the sixth diode D10, and the seventh diode D11 are in a forward bias state.

As a result, a path running through the first diode D5 and the first switching device S5 and a path running through the sixth diode D10 and the sixth switching device S10 are electrically connected to each other and a path running through the fourth diode D8 and the fourth switching device S8 and a path running through the seventh diode D11 and the seventh switching device S11 are electrically connected to each other. A short circuit therefore occurs in the secondary side, thereby causing a large current to flow through the circuitry of the power conversion apparatus 1 and damaging the circuitry. For this reason, in a power supply period, it is difficult for the control unit 7 to switch from the positive group converter to the negative group converter.

The control unit 7 therefore switches from the positive group converter to the negative group converter in a power non supply period. That is, the control unit 7 determines each timing at which the polarity of the output current io reverses in a power non-supply period and controls the positive group converter and the negative group converter in a predetermined manner that does not cause a short circuit in the secondary side of the power conversion apparatus 1.

A first example of this control will be described with reference to FIGS. 5 and 22 to 24. FIG. 22 is a circuit diagram illustrating a current flowing through the circuitry of the power conversion apparatus 1 immediately before the control unit 7 switches from the positive group converter to the negative group converter in a power non-supply period. FIG. 23 is a circuit diagram illustrating currents flowing through the circuitry of the power conversion apparatus 1 while the control unit 7 is switching from the positive group converter to the negative group converter in a power non-supply period. FIG. 24 is a circuit diagram illustrating a current flowing through the circuitry of the power conversion apparatus 1 immediately after the control unit 7 switches from the positive group converter to the negative group converter in a power non-supply period.

As illustrated in FIG. 22, the control unit 7 turns on the switching devices S1 and S4 and the third switching device S7 and the fourth switching device S8 among the switching devices S5 to S8 included in the positive group converter. The control unit 7 turns off the first switching device S5 and the second switching device S6 and all the switching devices S9 to S12 included in the negative group converter. In the secondary side of the power conversion apparatus 1, current flows through a path that runs through the fourth diode D8, the fourth switching device S8, the third diode D7, the third switching device S7, and the commercial power system 27.

Next, as illustrated in FIG. 23, the control unit 7 turns on the seventh switching device S11 and the eighth switching device S12 among the switching devices S9 to S12 included in the negative group converter in the state illustrated in FIG. 22. Current flows through a path that runs through the seventh diode D11, the seventh switching device S11, the eighth diode D12, and the eighth switching device S12 as well as the path that runs through the fourth diode D8, the fourth switching device S8, the third diode D7, the third switching device S7, and the commercial power system 27.

If this state continues, a positive current flowing through a path that runs through the fourth diode D8, the fourth switching device S8, the third diode D7, and the third switching device S7 gradually decreases and a negative current flowing through a path that runs through the seventh diode D11, the seventh switching device S11, the eighth diode D12, and the eighth switching device S12 gradually increases due to soft switching realized by the third diode D7, the fourth diode D8, the seventh diode D11, and the eighth diode D12.

FIG. 24 illustrates a state in which the current path has completely switched from the path that runs through the fourth diode D8, the fourth switching device S8, the third diode D7, and the third switching device S7 to the path that runs through the seventh diode D11, the seventh switching device S11, the eighth diode D12, and the eighth switching device S12. Current flows through a path that runs through the commercial power system 27, the seventh diode D11, the seventh switching device S11, the eighth diode D12, and the eighth switching device S12.

In a period illustrated in FIGS. 22 to 24, the control unit 7 constantly keeps the first switching device S5, the second switching device S6, the fifth switching device S9, and the sixth switching device S10 turned off. As a result, a short circuit does not occur in the secondary side of the power conversion apparatus 1, thereby making it possible to complete the switching from the positive group converter to the negative group converter.

Figure 25:
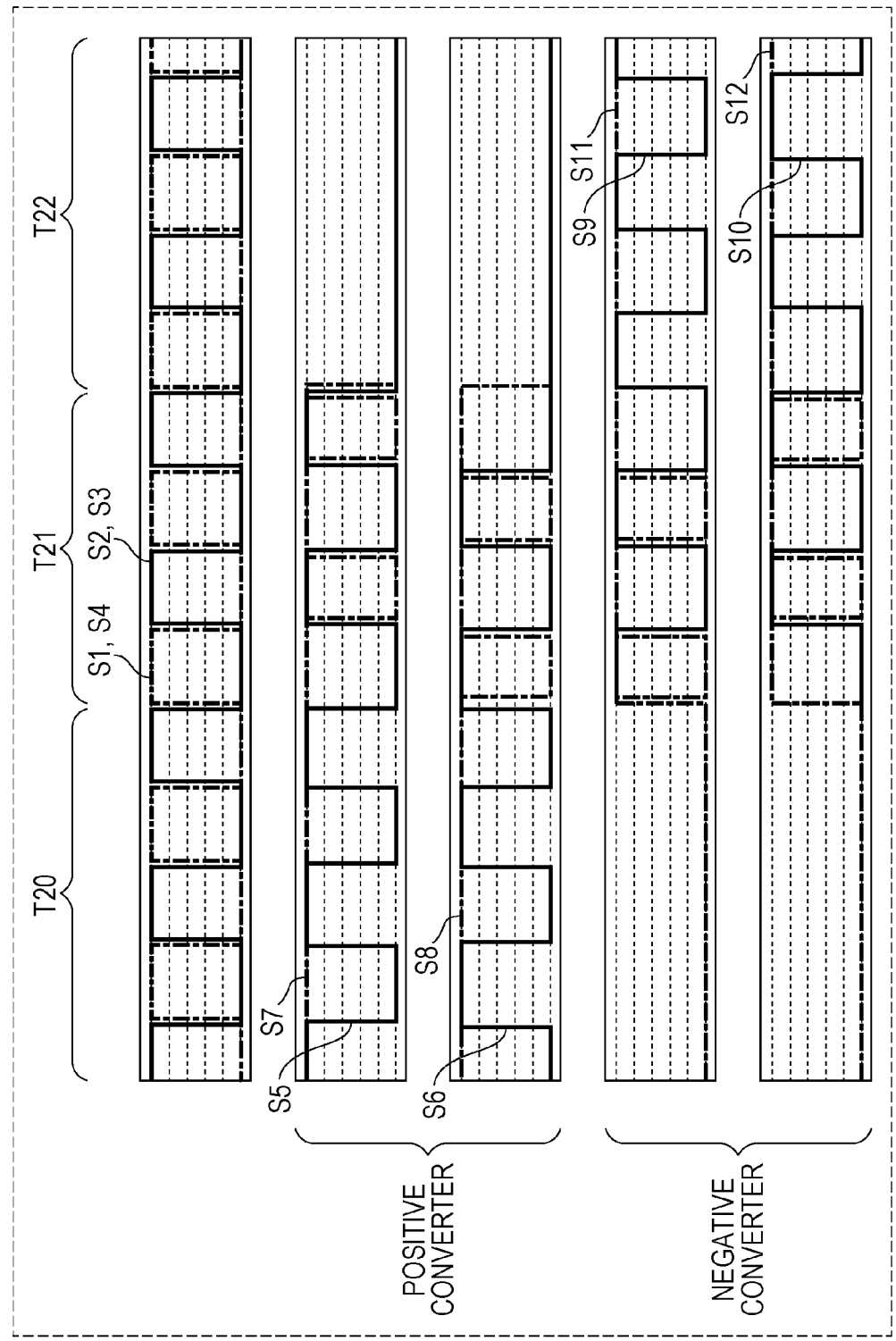
FIG. 25 is a waveform diagram illustrating waveforms of control signals applied to switching devices when the control unit switches from the positive group converter to the negative group converter in a second example of switching control.

A second example (hereinafter referred to as a "second example of the switching control") of the switching from the positive group converter to the negative group converter will be described. FIG. 25 is a waveform diagram illustrating waveforms of control signals applied to the switching devices S1 to S12 when the control unit 7 switches from the positive group converter to the negative group converter in the second example of the switching control. A vertical axis in the waveform diagram represents the control signals, and a horizontal axis represents time. A period immediately before the control unit 7 switches from the positive group converter to the negative group converter will be referred to as a "period T20". A period during the switching will be described to as a "period T21". A period immediately after the switching will be referred to as a "period T22".

As illustrated in FIGS. 1 and 25, the switching devices S1 to S4 operate in the periods T20, T21, and T22. The first switching device S5, the second switching device S6, the third switching device S7, and the fourth switching device S8 included in the positive group converter operate in the periods T20 and T21, but stop operating in the period T22. The fifth switching device S9, the sixth switching device S10, the seventh switching device S11, and the eighth switching device S12 included in the negative group converter do not operate in the period T20, but start operating in the periods T21 and T22.

FIG. 26 is a timing chart illustrating a control mode in the period T21 in the second example of the switching control. The primary drive signals, the transformer voltage V1, the transformer current i1, the secondary drive signals, and the output voltage Vo have already been described with reference to FIG. 5. Although a timing at which the control unit 7 generates the primary drive signals for turning on the switching devices S2 and S3 and a timing at which the control unit 7 generates the secondary drive signals for turning on the first switching device S5 and the sixth switching device S10 are the same in FIG. 26, these timings may be slightly different from each other, instead. Similarly, although a timing at which the control unit 7 generates the primary drive signals for turning on the switching devices S1 and S4 and a timing at which the control unit 7 generates the secondary drive signals for turning on the second switching device S6 and the fifth switching device S9 are the same in FIG. 26, these timings may be slightly different from each other, instead.

The operation of the power conversion apparatus 1 in periods (0), (5), and (10) and at times (1) to (4) and (6) to (9) will be described with reference to FIGS. 26 to 37. In FIGS. 27 to 37, it is assumed that the commercial power system 27 is connected to the connection unit 15, and switching devices turned on are surrounded by broken lines.

Figure 27:
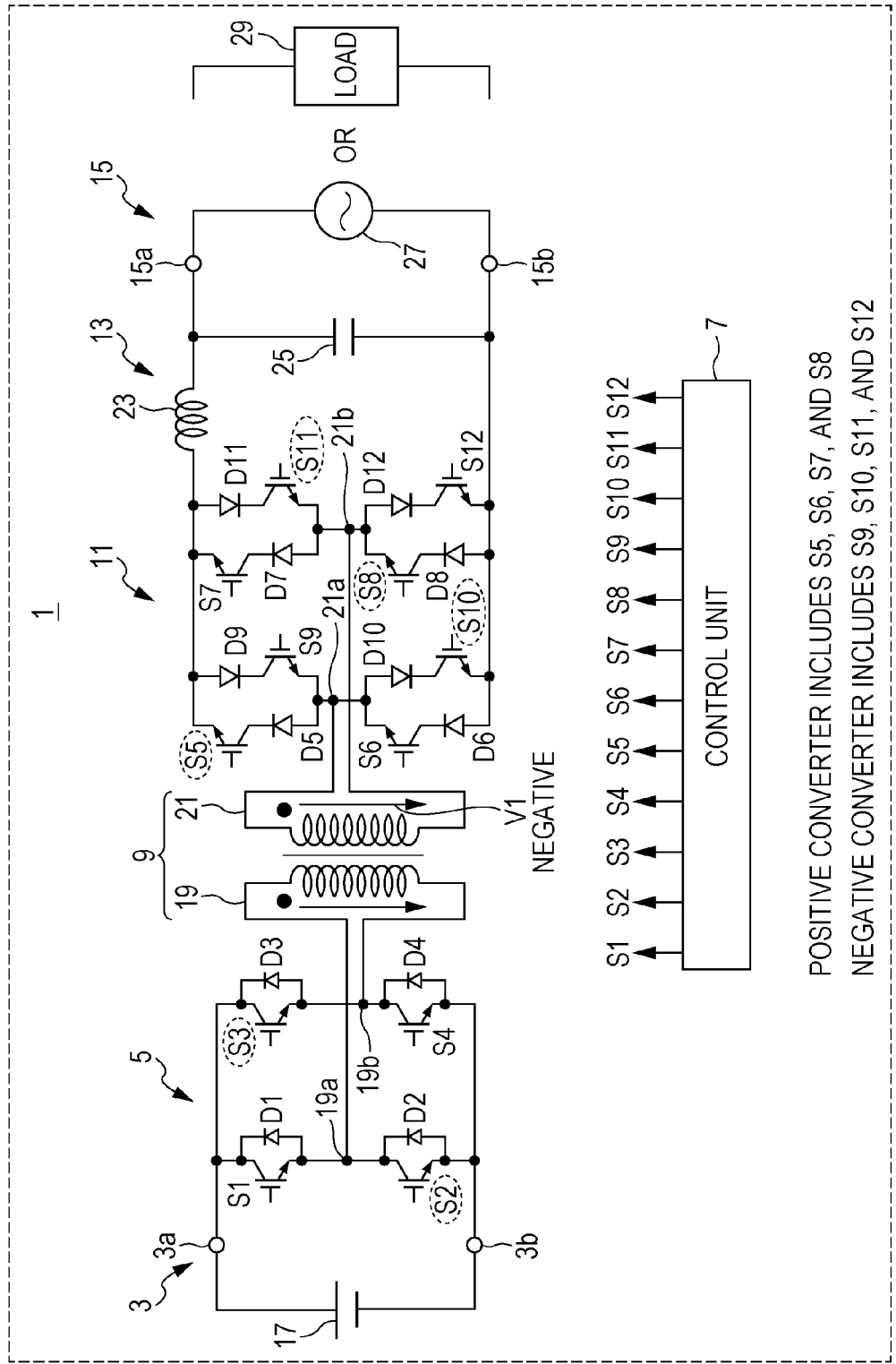
FIG. 27 is a diagram indicating switching devices turned on in the circuitry of the power conversion apparatus illustrated in FIG. 1 in a period illustrated in FIG. 26.

FIG. 27 is a diagram indicating switching devices turned on in the circuitry of the power conversion apparatus 1 illustrated in FIG. 1 in the period (0) illustrated in FIG. 26. As illustrated in FIGS. 26 and 27, in the period (0), the control unit 7 turns on the switching devices S2 and S3 and turns off the switching devices S1 and S4. As a result, the transformer voltage V1 is negative.

In the period (0), the control unit 7 turns on the first switching device S5, the fourth switching device S8, the sixth switching device S10, and the seventh switching device S11 among the switching devices S5 to S12 included in the cycloconverter 11 and turns off the other switching devices.

Figure 28:
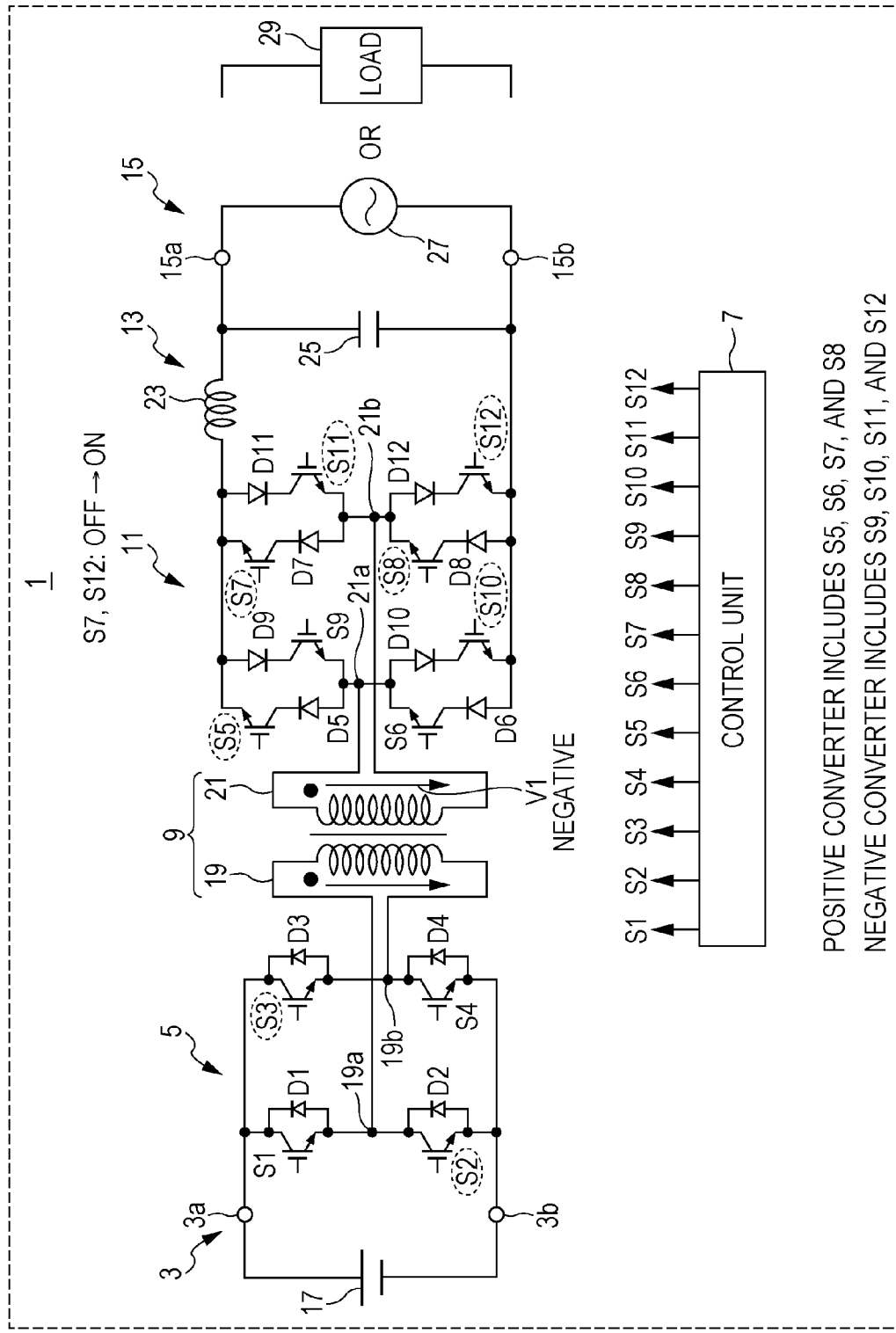
FIG. 28 is a diagram indicating switching devices turned on in the circuitry of the power conversion apparatus illustrated in FIG. 1 at a time.

FIG. 28 is a diagram indicating switching devices turned on in the circuitry of the power conversion apparatus 1 illustrated in FIG. 1 at the time (1). The time (1) is when the period (0) ends. As illustrated in FIGS. 26 and 28, because the time (2), at which the control unit 7 turns off the switching devices S2 and S3, will come soon, the primary side of the power conversion apparatus 1 and the commercial power system 27 need to be separated from each other. The control unit 7 therefore turns on the third switching device S7 and the eighth switching device S12 at the time (1) to cause an AC reactor (coil 23) to enter a charging mode. As a result, the primary side of the power conversion apparatus 1 and the commercial power system 27 can be separated from each other. The current of the commercial power system 27 at this time might be positive, or might be negative.

Figure 29:
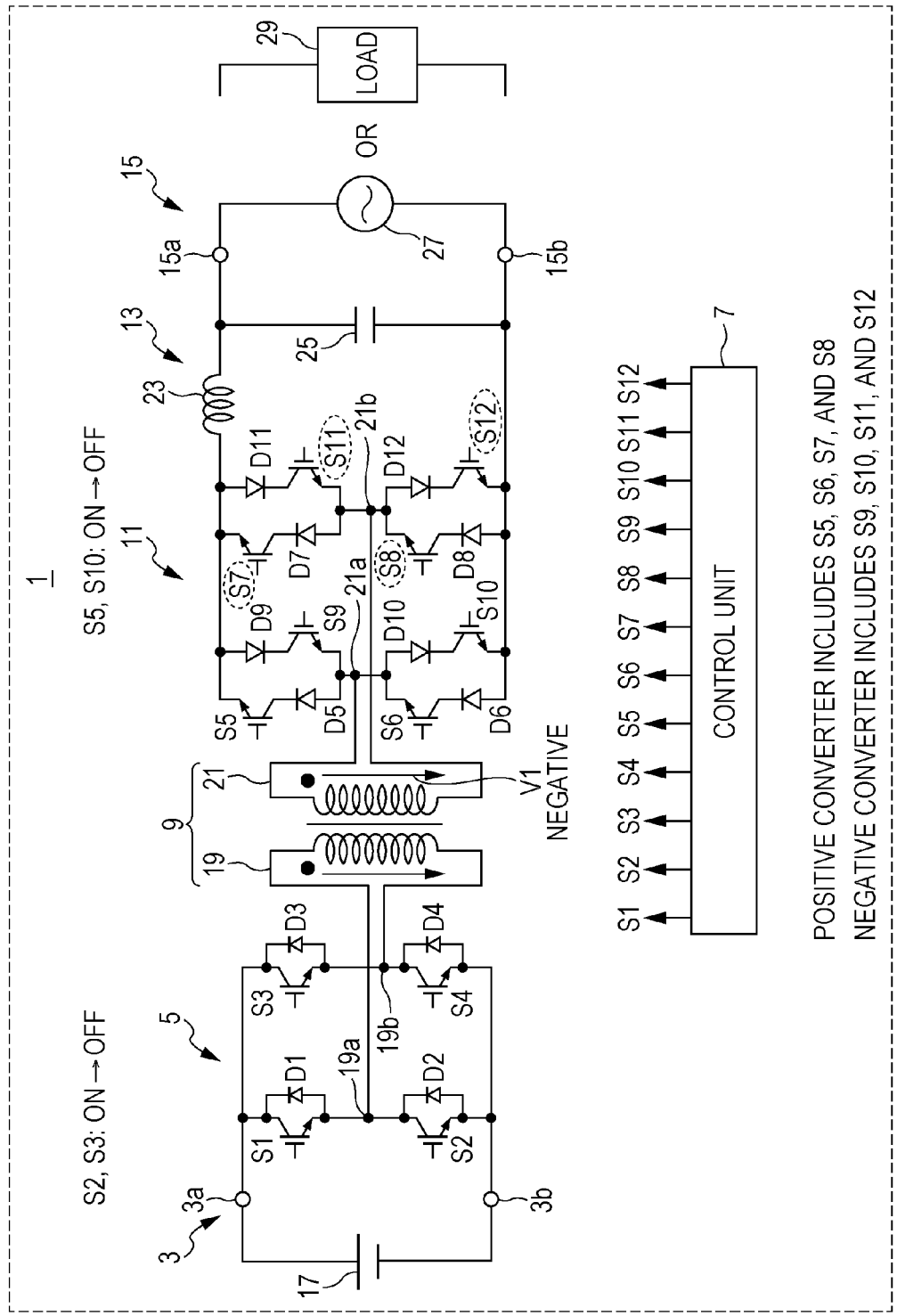
FIG. 29 is a diagram indicating switching devices turned on in the circuitry of the power conversion apparatus illustrated in FIG. 1 at another time.

FIG. 29 is a diagram indicating switching devices turned on in the circuitry of the power conversion apparatus 1 illustrated in FIG. 1 at the time (2). The time (2) comes after the time (1). As illustrated in FIGS. 26 and 29, the control unit 7 turns off the switching devices S2 and S3, the first switching device S5, and the sixth switching device S10. The control unit 7 thus prepares for reversal of the polarity of the transformer voltage V1.

Figure 30:
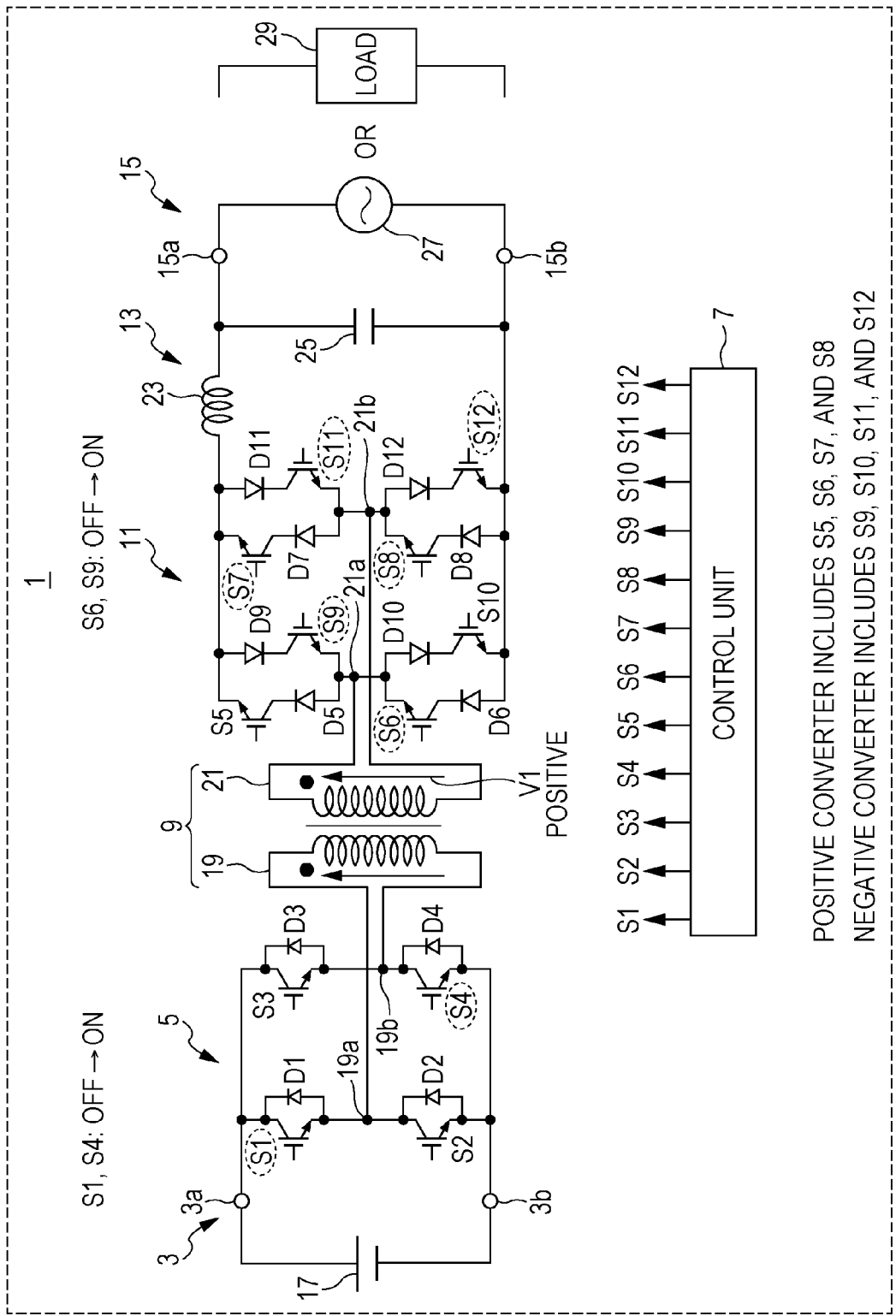
FIG. 30 is a diagram indicating switching devices turned on in the circuitry of the power conversion apparatus illustrated in FIG. 1 at another time.

FIG. 30 is a diagram indicating switching devices turned on in the circuitry of the power conversion apparatus 1 illustrated in FIG. 1 at the time (3). The time (3) comes after the time (2). As illustrated in FIGS. 26 and 30, the control unit 7 turns on the switching devices S1 and S4, the second switching device S6, and the fifth switching device S9.

Since the switching devices S1 and S4 are turned on, the polarity of the transformer voltage V1 reverses.

Since the second switching device S6 and the fifth switching device S9 are turned on, a path for charging the AC reactor (coil 23) can be secured. Because the transformer voltage V1 is higher than the voltage of the commercial power system 27, the second switching device S6 and the fifth switching device S9 are in a reverse bias state.

Figure 31:
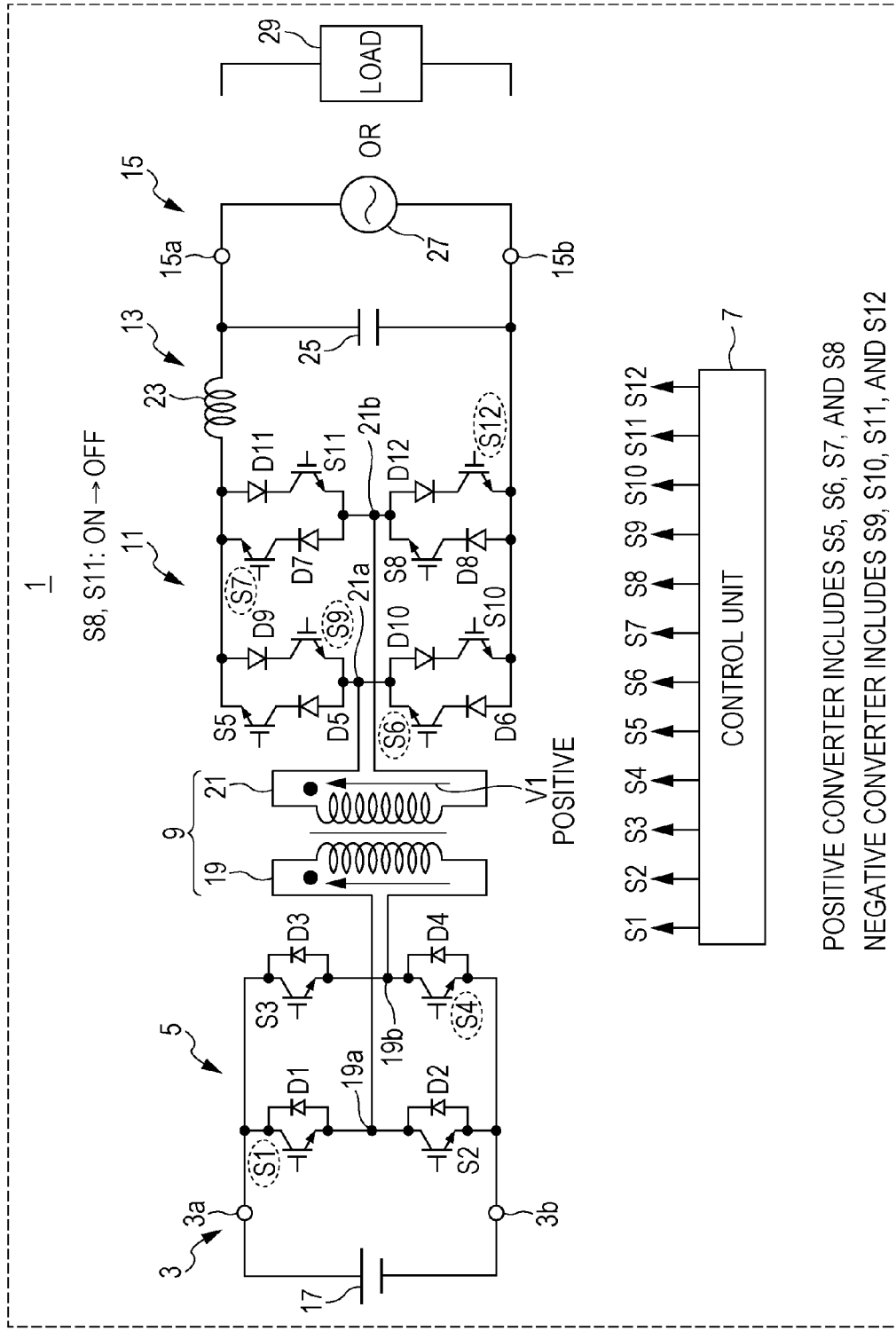
FIG. 31 is a diagram indicating switching devices turned on in the circuitry of the power conversion apparatus illustrated in FIG. 1 at another time.

FIG. 31 is a diagram indicating switching devices turned on in the circuitry of the power conversion apparatus 1 illustrated in FIG. 1 at the time (4). The time (4) comes after the time (3). As illustrated in FIGS. 26 and 31, the control unit 7 turns off the fourth switching device S8 and the seventh switching device S11. As a result, a mode is established in which energy accumulated in the AC reactor (coil 23) is released.

A current generated by releasing the energy accumulated in the AC reactor (coil 23) can be positive or negative depending on the polarity of the voltage of the commercial power system 27. In the case of a positive current, the current flows through a path that runs through the third diode D7, the third switching device S7, the coil 23, the commercial power system 27, the second diode D6, and the second switching device S6. In the case of a negative current, the current flows through a path that runs through the eighth diode D12, the eighth switching device S12, the commercial power system 27, the coil 23, the fifth diode D9, and the fifth switching device S9.

Figure 32:
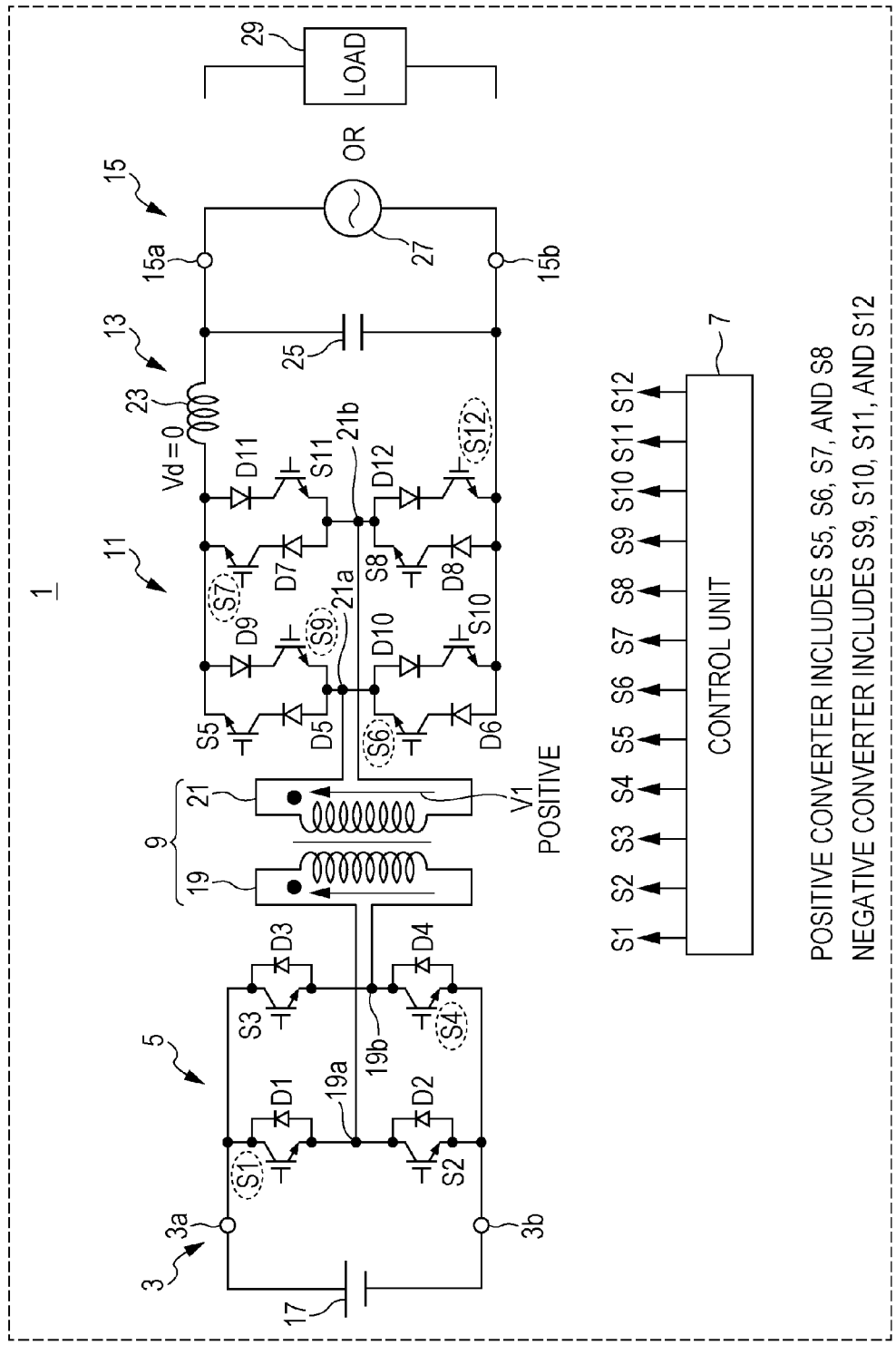
FIG. 32 is a diagram indicating switching devices turned on in the circuitry of the power conversion apparatus illustrated in FIG. 1 in another period.

FIG. 32 is a diagram indicating switching devices turned on in the circuitry of the power conversion apparatus 1 illustrated in FIG. 1 in the period (5). A time at which the period (5) begins is the time (4). As illustrated in FIGS. 26 and 32, switching devices turned on by the control unit 7 are the same as those turned on at the time (4).

A period in which energy is accumulated in the AC reactor (coil 23) begins at the time (1) and ends at the time (4), which means that the period is extremely short. The energy accumulated in the AC reactor (coil 23) therefore immediately becomes zero (Vd=0), thereby making the transformer current i1 become zero.

Figure 33:
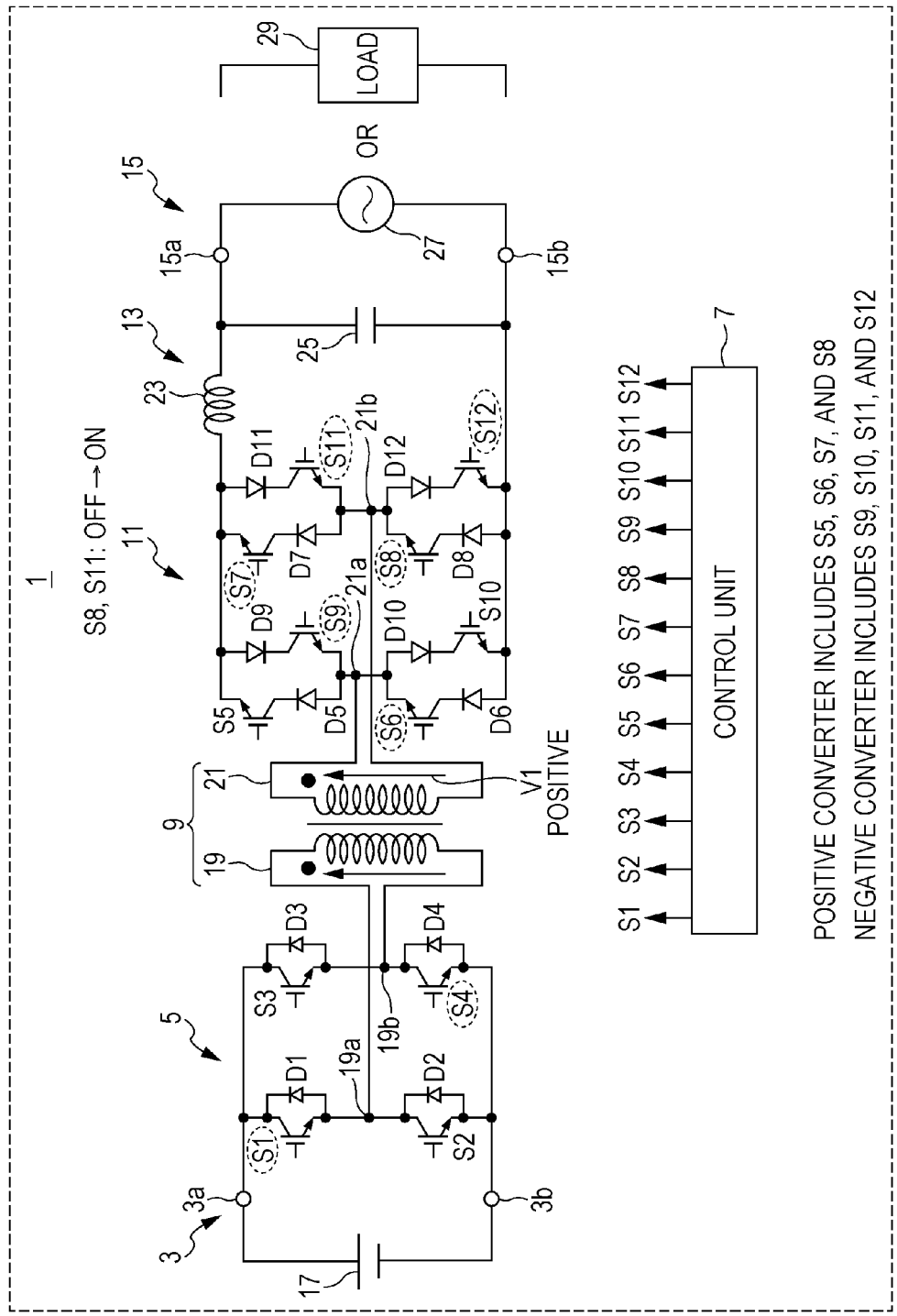
FIG. 33 is a diagram indicating switching devices turned on in the circuitry of the power conversion apparatus illustrated in FIG. 1 at another time.

FIG. 33 is a diagram indicating switching devices turned on in the circuitry of the power conversion apparatus 1 illustrated in FIG. 1 at the time (6). The time (6) is when the period (5) ends. As illustrated in FIGS. 26 and 33, because the time (7), at which the control unit 7 turns off the switching devices S1 and S4, will come soon, the primary side of the power conversion apparatus 1 and the commercial power system 27 need to be separated from each other. The control unit 7 therefore turns on the fourth switching device S8 and the seventh switching device S11 at the time (6) to cause the AC reactor (coil 23) to enter the charging mode. As a result, the primary side of the power conversion apparatus 1 and the commercial power system 27 can be separated from each other. The current of the commercial power system 27 at this time might be positive, or might be negative.

Figure 34:
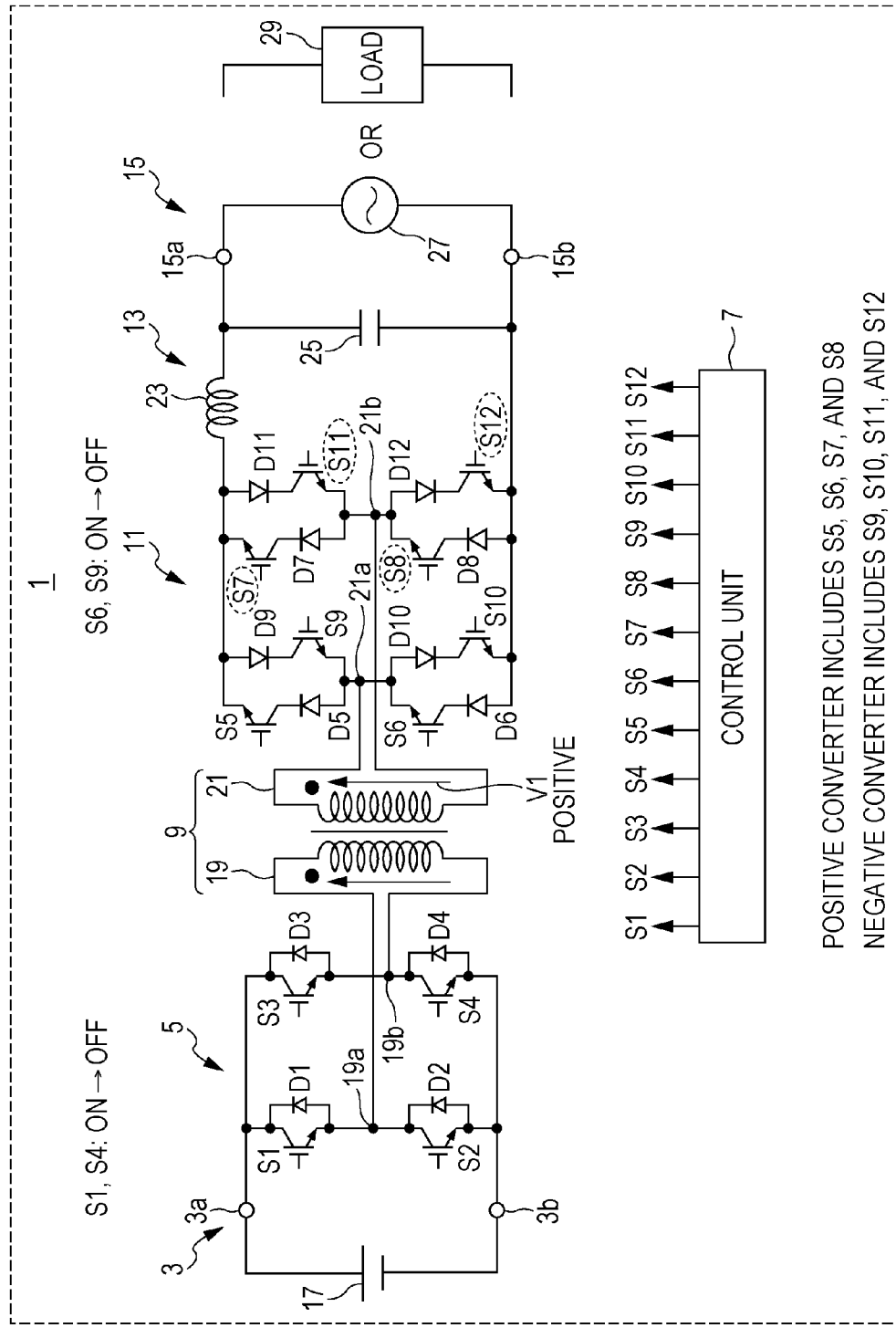
FIG. 34 is a diagram indicating switching devices turned on in the circuitry of the power conversion apparatus illustrated in FIG. 1 at another time.

FIG. 34 is a diagram indicating switching devices turned on in the circuitry of the power conversion apparatus 1 illustrated in FIG. 1 at the time (7). The time (7) comes after the time (6). As illustrated in FIGS. 26 and 34, the control unit 7 turns off the switching devices S1 and S4, the second switching device S6, and the fifth switching device S9. The control unit 7 thus prepares for reversal of the polarity of the transformer voltage V1.

Figure 35:
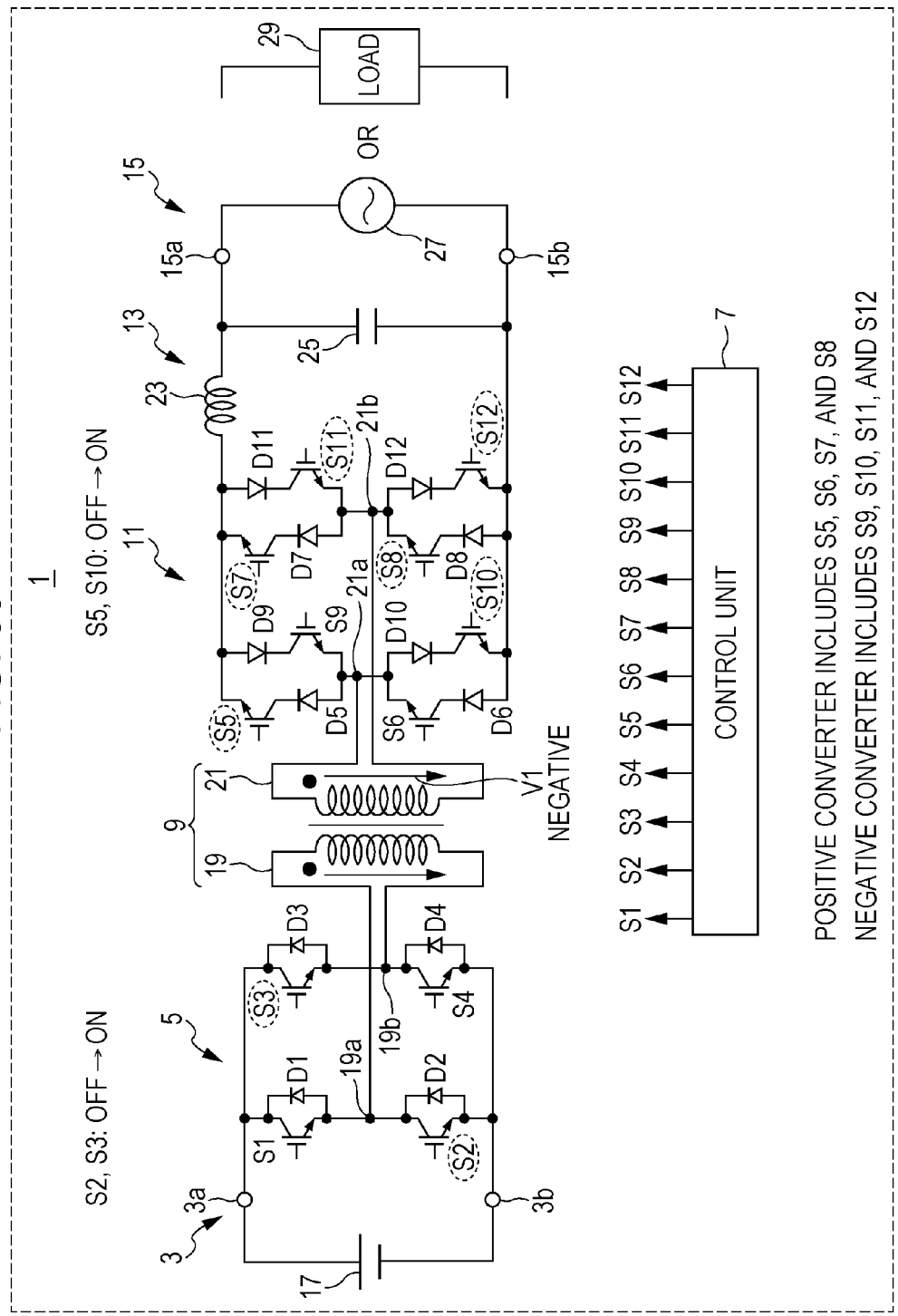
FIG. 35 is a diagram indicating switching devices turned on in the circuitry of the power conversion apparatus illustrated in FIG. 1 at another time.

FIG. 35 is a diagram indicating switching devices turned on in the circuitry of the power conversion apparatus 1 illustrated in FIG. 1 at the time (8). The time (8) comes after the time (7). As illustrated in FIGS. 26 and 35, the control unit 7 turns on the switching device S2 and S3, the first switching device S5, and the sixth switching device S10.

Since the switching devices S2 and S3 are turned on, the polarity of the transformer voltage V1 reverses.

Since the first switching device S5 and the sixth switching device S10 are turned on, a path for charging the AC reactor (coil 23) is secured. Because the transformer voltage V1 is lower than the voltage of the commercial power system 27, the first switching device S5 and the sixth switching device S10 are in a reverse bias state.

Figure 36:
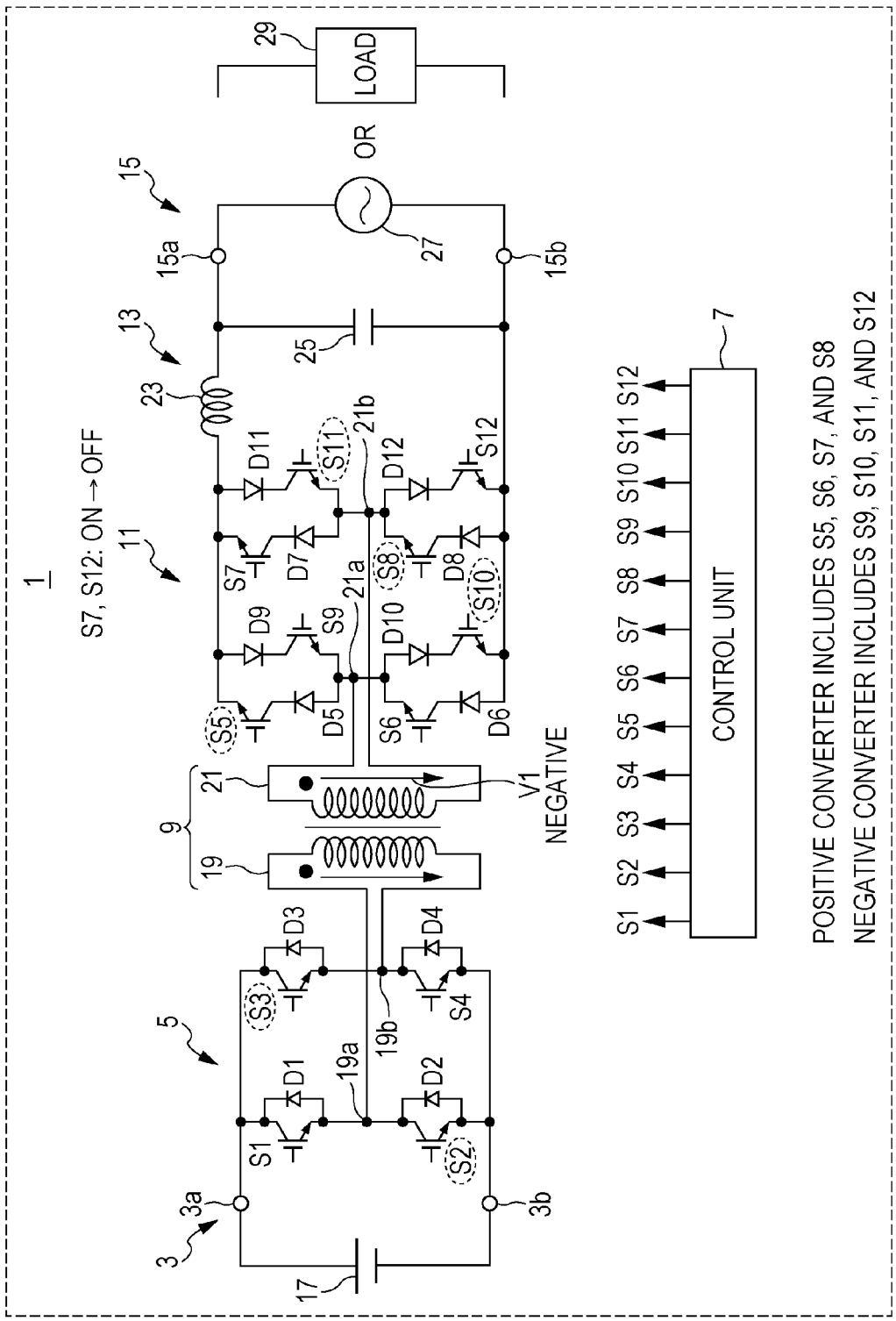
FIG. 36 is a diagram indicating switching devices turned on in the circuitry of the power conversion apparatus illustrated in FIG. 1 at another time.

FIG. 36 is a diagram indicating switching devices turned on in the circuitry of the power conversion apparatus 1 illustrated in FIG. 1 at the time (9). The time (9) comes after the time (8). As illustrated in FIGS. 26 and 36, the control unit 7 turns off the third switching device S7 and the eighth switching device S12. As a result, the mode is established in which the energy accumulated in the AC reactor (coil 23) is released.

A current generated by releasing the energy accumulated in the AC reactor (con 23) can be positive or negative depending on the polarity of the voltage of the commercial power system 27. In the case of a positive current, the current flows through a path that runs through the first diode D5, the first switching device S5, the coil 23, the commercial power system 27, the fourth diode D8, and the fourth switching device S8. In the case of a negative current, the current flows through a path that runs through the sixth diode D10, the sixth switching device S10, the commercial power system 27, the coil 23, the seventh diode D11, and the seventh switching device S11.

Figure 37:
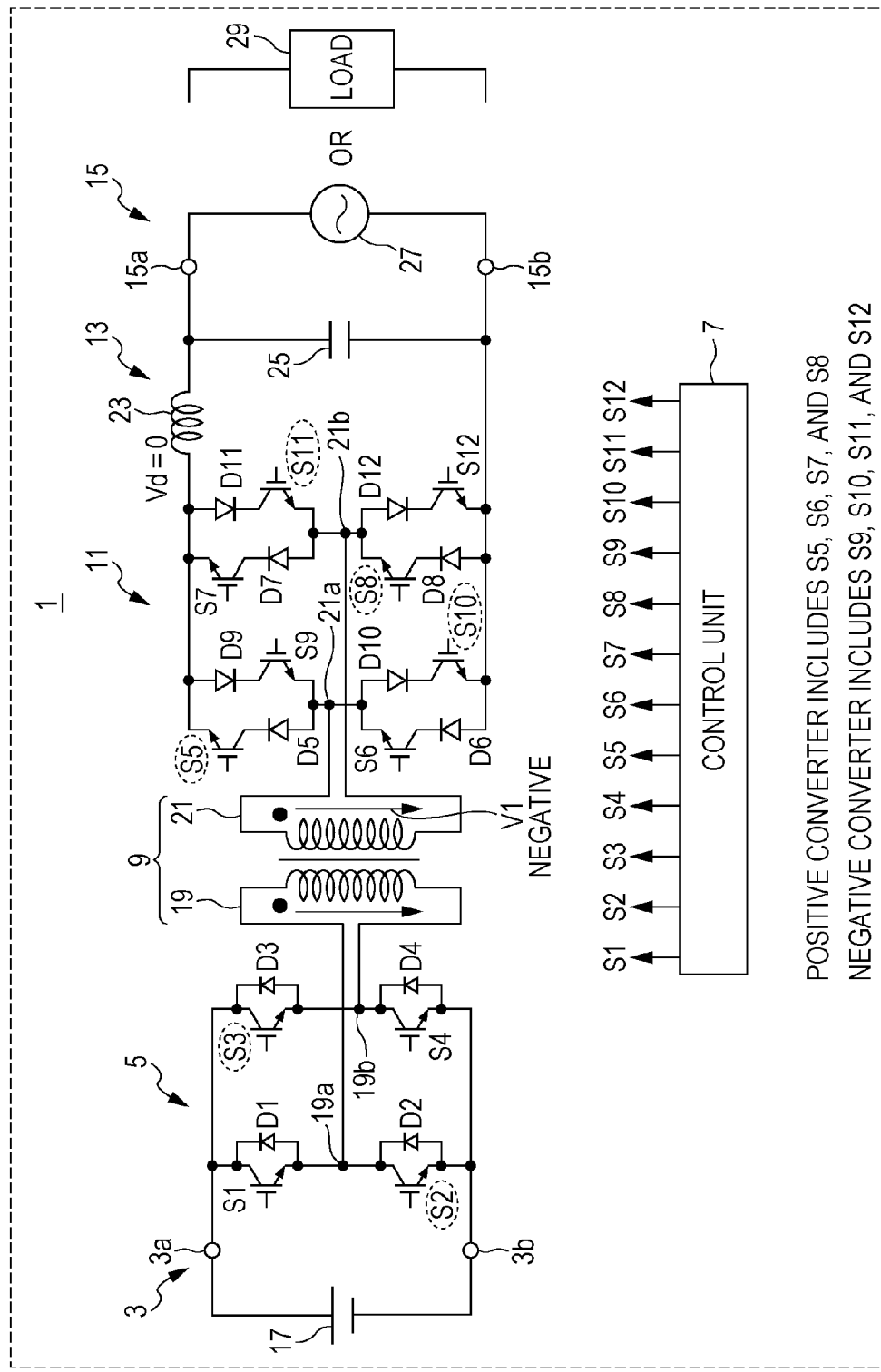
FIG. 37 is a diagram indicating switching devices turned on in the circuitry of the power conversion apparatus illustrated in FIG. 1 in another period.

FIG. 37 is a diagram indicating switching devices turned on in the circuitry of the power conversion apparatus 1 illustrated in FIG. 1 in the period (10). A time at which the period (10) begins is the time (9). As illustrated in FIGS. 26 and 37, switching devices turned on by the control unit 7 are the same as those turned on at the time (9).

A period in which energy is accumulated in the AC reactor (coil 23) begins at the time (6) and ends at the time (9), which means that the period is extremely short. The energy accumulated in the AC reactor (coil 23) therefore immediately becomes zero (Vd=0), thereby making the transformer current become zero.

As described above, according to the second example of the switching control, there are periods in which the transformer current i1 is zero. As a result, a short circuit does not occur in the secondary side, thereby making it possible to switch from the positive group converter to the negative group converter.

As described above, according to the present embodiment, when the polarity of the output current io reverses, the above-described switching control sequence is performed that is different from a sequence (positive period control sequence) in which the positive group converter operates when the output current io is positive or a sequence (negative period control sequence) in which the negative group converter operates when the output current io is negative. As a result, the polarity of the output current io can smoothly reverses, and waveform distortion of the output current io can be suppressed to a minimum.

The control (switching control sequence) for switching from the positive group converter to the negative group converter is not limited to the above-described type of control. The control unit 7 may control the positive group converter and the negative group converter in any manner insofar as a short circuit does not occur in the secondary side of the power conversion apparatus 1 in a power non-supply period.

Figure 38:
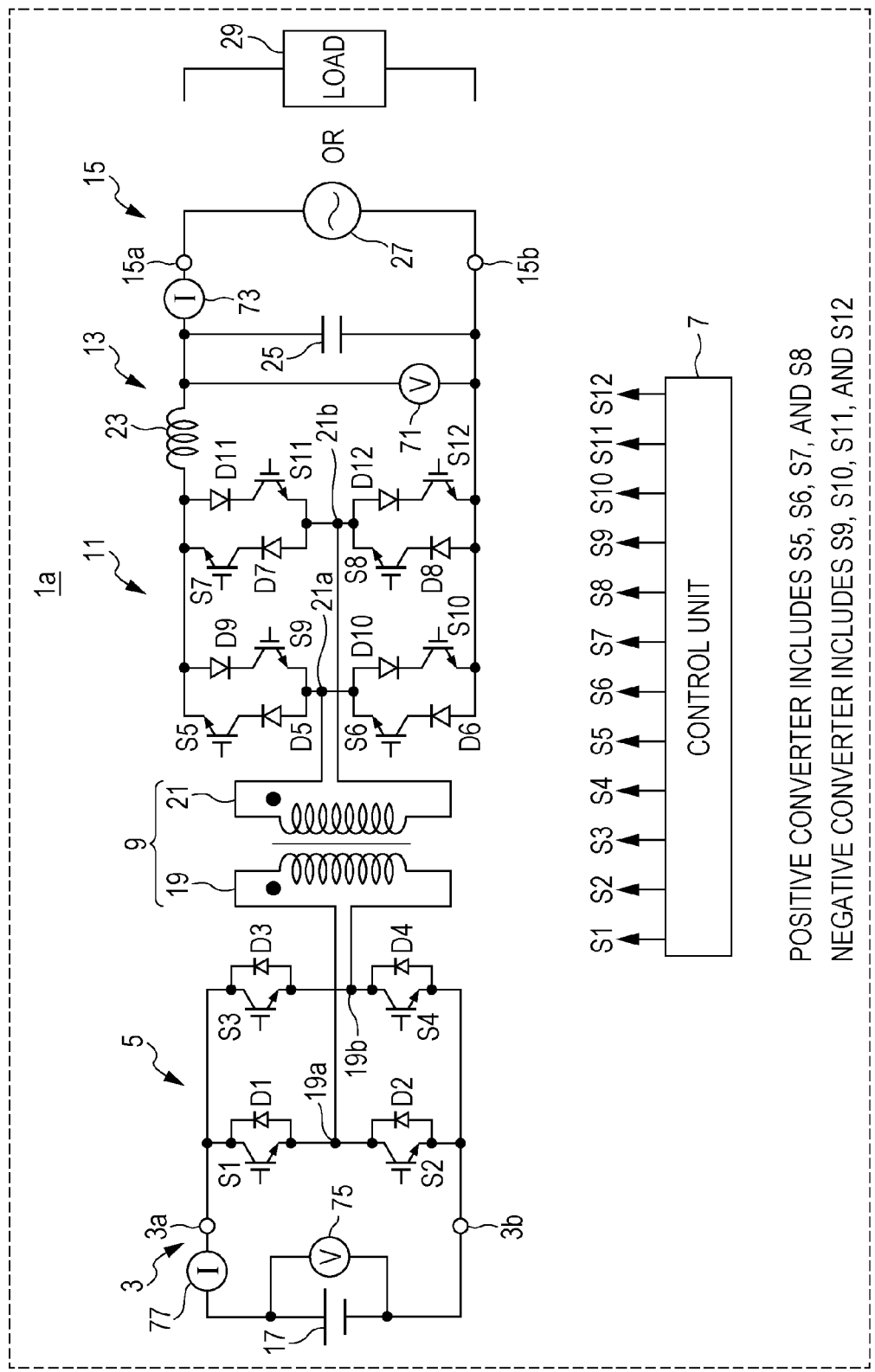
FIG. 38 is a diagram illustrating the circuitry of a first modification of the power conversion apparatus illustrated in FIG. 1.

In order to perform the switching control sequence, the value of the output current io needs to be monitored. FIG. 38 is a diagram illustrating the circuitry of a power conversion apparatus 1a, which is a first modification of the power conversion apparatus 1 illustrated in FIG. 1. Differences between the power conversion apparatus 1 illustrated in FIG. 1 and the power conversion apparatus 1a according to the first modification will be described.

The power conversion apparatus 1a includes voltage sensors 71 and 75 and current sensors 73 and 77. The voltage sensor 71 is connected to an end and another end of the capacitor 25 of the filter circuit 13 and measures a voltage input to the capacitor 25 as the output voltage Vo. The current sensor 73 is inserted between a first end 15a of the connection unit 15 and the filter circuit 13 and measures a current flowing therethrough as the output current io.

The voltage sensor 75 measures the voltage of the DC power supply 17. The current sensor 77 is inserted between the DC power supply 17 and the connection unit 3 and measures the current of the DC power supply 17.

The control unit 7 monitors the value of the output current io measured by the current sensor 73. If the control unit 7 determines that the value of the output current io has reached a predetermined value close to zero, the control unit 7 performs the switching control sequence.

As described later, the control unit 7 monitors the output voltage Vo in order to switch between the power supply mode and the power regeneration mode.

If the voltage and current of the DC power supply 17 deviate from their respective ranges, it is difficult to keep the amplitude of the output voltage Vo to a desired value. The control unit 7 therefore monitors the values of the voltage and current of the DC power supply 17 using the voltage sensor 75 and the current sensor 77. Even if the control unit 7 does not monitor the output voltage Vo and the voltage and current of the DC power supply 17 and monitors only the output current io, however, the control unit 7 can perform the switching control sequence. If voltage is known as in the grid-connected operation, the control unit 7 can perform the switching control sequence using an internal current instruction value.

Figure 39:
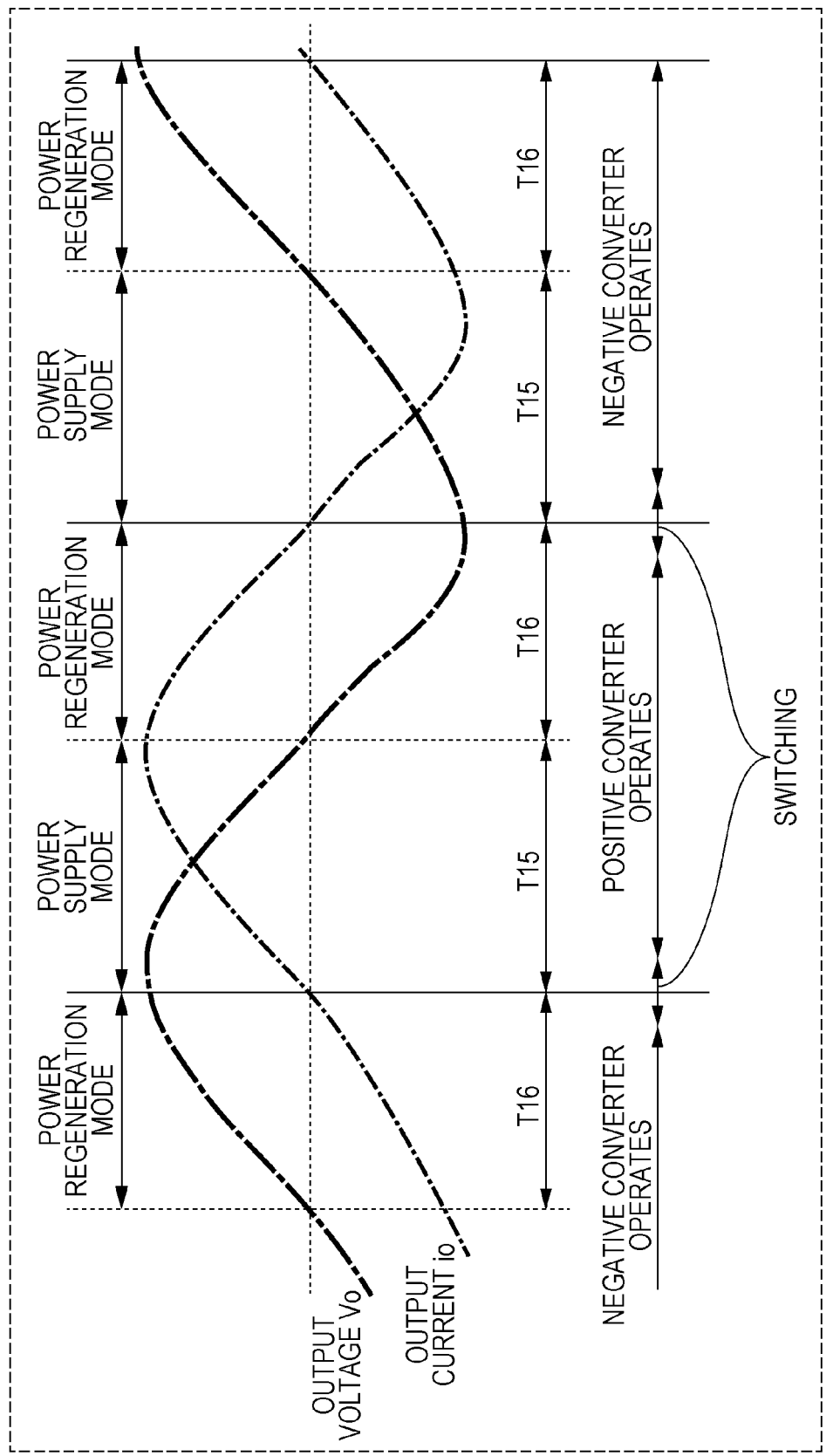
FIG. 39 is a diagram illustrating switching between the power supply mode and the power regeneration mode.

Next, switching between the power supply mode and the power regeneration mode will be described. FIG. 39 is a diagram illustrating the switching between the power supply mode and the power regeneration mode. As illustrated in FIG. 3, if the phase difference between the output voltage Vo and the output current io is 0° (that is, the power factor is 1), only the power supply mode is established. As illustrated in FIG. 4, if the phase difference between the output voltage Vo and the output current io is 180° (that is, the power factor is 0), only the power regeneration mode is established.

If the phase difference between the output voltage Vo and the output current io is not 0° or 180°, a period T15, in which the polarities of the output voltage Vo and the output current io are the same, alternates with a period T16, in which the polarities are different from each other, in a cycle of the commercial power system 27 as illustrated in FIG. 39. FIG.

39 illustrates an example in which the phase difference between the output voltage Vo and the output current io is 90°.

Examples in which the period T15 alternates with the period T16 include a case in which the power factor of the load 29 is low (for example, in the case of a motor) after the operation switches from the grid-connected operation to the grid-independent operation and a case in which the frequency of the commercial power system 27 varies during the grid-connected operation.

The control unit 7 monitors the values measured by the voltage sensor 71 and the current sensor 73 illustrated in FIG. 38 and determines whether the phase difference between the output voltage Vo and the output current io is different from 0° and 180°. If the control unit 7 determines that the phase difference between the output voltage Vo and the output current io is different from 0° and 180° and the output current io is positive, the control unit 7 operates the positive group converter. If the output current io is negative, the control unit 7 operates the negative group converter. When the control unit 7 switches between the positive group converter and the negative group converter, the control unit 7 performs the above-described switching control sequence. The control unit 7 then enters the power supply mode in the period T15 and enters the power regeneration mode in the period T16.

A second modification of the power conversion apparatus 1 will be described. FIG. 40 is a diagram illustrating the circuitry of a power conversion apparatus 1b according to the second modification. Differences between the power conversion apparatus 1 illustrated in FIG. 1 and the power conversion apparatus 1b according to the second modification will be described. The power conversion apparatus 1b includes a chopper circuit 81, which is inserted between the inverter circuit 5 and the connection unit 3.

The chopper circuit 81 is a step-up/step-down chopper circuit that performs a step-up operation in the power supply mode and a step-down operation in the power regeneration mode. The control unit 7 controls the amplitude of at least either the output voltage Vo or the output current io by controlling the chopper circuit 81, the first to fourth switching devices S5 to S8 included in the positive group converter, and the fifth to eighth switching devices S9 to S12 included in the negative group converter.

According to the power conversion apparatus 1b according to the second modification, a DC power supply 17 whose voltage greatly varies can be used because of the chopper circuit 81. For example, the power conversion apparatus 1b can be applied even if the voltage of an EV battery, a solar cell, or a fuel cell greatly varies.

Figure 41:
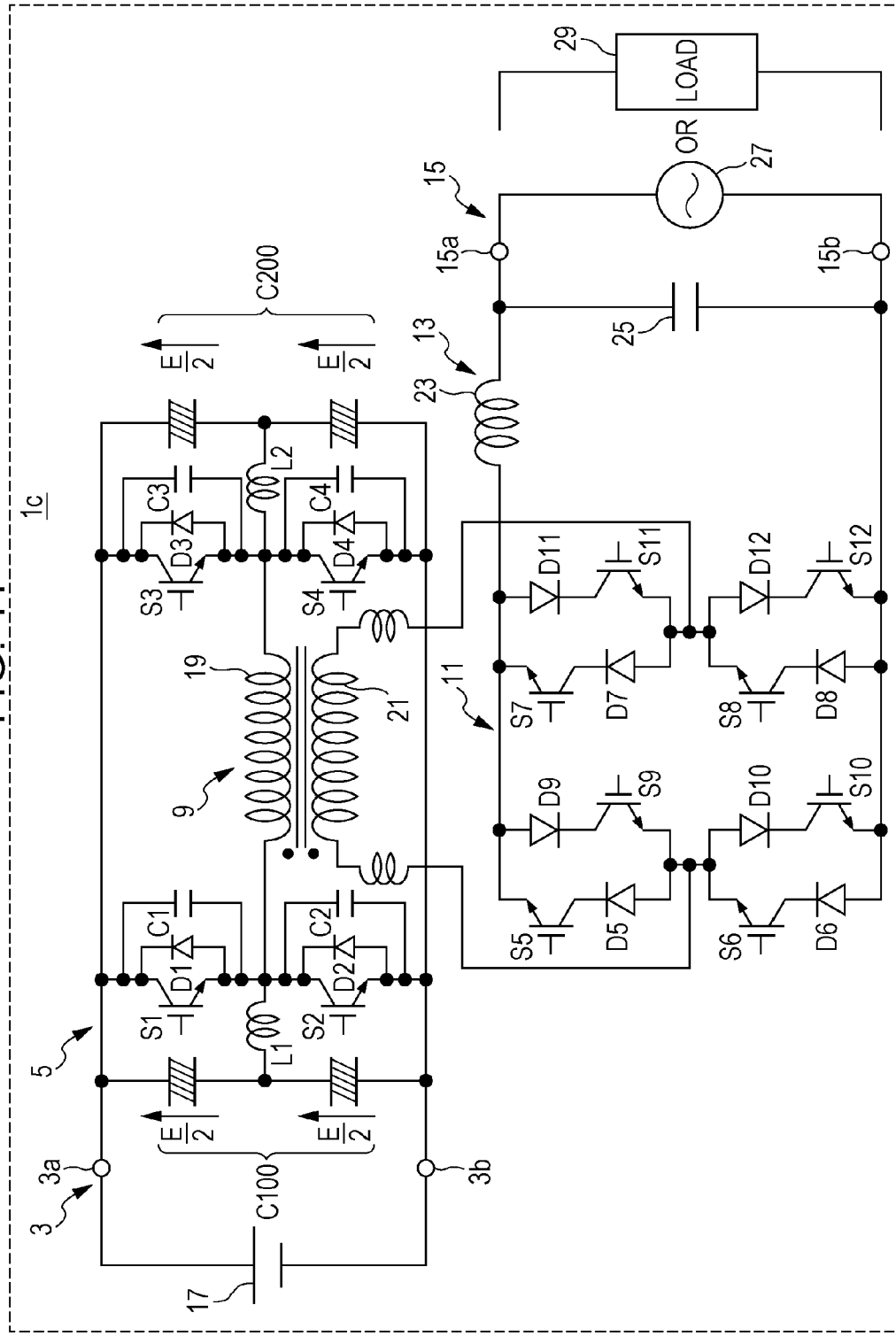
FIG. 41 is a diagram illustrating the circuitry of a third modification of the power conversion apparatus illustrated in FIG. 1.

A third modification of the power conversion apparatus 1 will be described. FIG. 41 is a diagram illustrating the circuitry of a power conversion apparatus 1c according to the third modification. Differences between the power conversion apparatus 1 illustrated in FIG. 1 and the power conversion apparatus 1c according to the third modification will be described. The inverter circuit 5 of the power conversion apparatus 1c includes lossless snubber capacitors C1, C2, C3, and C4, exciting inductances L1 and L2, and electrolytic capacitors C100 and C200.

The lossless snubber capacitor C1 is connected to the emitter and the collector of the switching device S1. The lossless snubber capacitor C2 is connected to the emitter and the collector of the switching device S2. The lossless snubber capacitor C3 is connected to the emitter and the collector of the switching device S3. The lossless snubber capacitor C4 is connected to the emitter and the collector of the switching device S4.

The electrolytic capacitor C100 is connected to the collector of the switching device S1 and the emitter of the switching device S2. The exciting inductance L1 is connected to the electrolytic capacitor C100, the emitter of the switching device S1, and the collector of the switching device S2.

The electrolytic capacitor C200 is connected to the collector of the switching device S3 and the emitter of the switching device S4. The exciting inductance L2 is connected to the electrolytic capacitor C200, the emitter of the switching device S3, and the collector of the switching device S4.

The lossless snubber capacitors C1 to C4, the exciting inductances L1 and L2, and the electrolytic capacitors C100 and C200 realize soft switching in the inverter circuit 5. As a result, the switching devices S1 to S4 can be protected.

Second Embodiment

The configuration of a power conversion apparatus according to a second embodiment will be described hereinafter. Description of elements that have already been described in the first embodiment is omitted as necessary.

The power conversion apparatus according to the second embodiment includes a transformer, an inverter circuit, a connection unit, a first switching device, a second switching device, a third switching device, a fourth switching device, and a control unit.

The transformer includes a primary winding and a secondary winding, which is magnetically coupled with the primary winding.

The inverter circuit converts a DC voltage supplied from a DC power supply into an AC voltage and supplies the AC voltage obtained as a result of the conversion to the primary winding.

The connection unit includes a first end and a second end electrically connectable to at least either a commercial power system or a load.

The first switching device is inserted between the first end of the connection unit and a first end of the secondary winding.

The second switching device is inserted between the second end of the connection unit and the first end of the secondary winding.

The third switching device is inserted between the first end of the connection unit and a second end of the secondary winding.

The fourth switching device is inserted between the second end of the connection unit and the second end of the secondary winding.

The control unit controls the amplitude of at least either an output voltage or an output current of the connection unit.

Specific configurations described in the first embodiment as examples may be adopted in the above-described configuration as necessary.

The control unit of the power conversion apparatus according to the second embodiment turns on at least either the first switching device or the fourth switching device at an on time TonA in a first period, in which the voltage of the secondary winding is positive.

The control unit of the power conversion apparatus according to the second embodiment turns on at least either the second switching device or the third switching device at an on time TonB in a second period, in which the voltage of the secondary winding is negative, after the first period.

The control unit of the power conversion apparatus according to the second embodiment controls the amplitude of at least either the output voltage or the output current by shifting at least either the on time TonA or the on time TonB.

The control unit of the power conversion apparatus according to the second embodiment turns on the first switching device or the fourth switching device that is turned on at the on time TonA at an on time TonC in a third period, in which the voltage of the secondary winding is positive, after the secondary period.

In the following description, periods in which both the first switching device and the second switching device are on will be referred to as "first circulating periods".

The control unit of the power conversion apparatus according to the second embodiment generates a first circulating period at least either between the on time TonA and the on time TonB or between the on time TonB and the on time TonC.

According to the above-described configuration, the control unit can generate a circulating period not only using the third switching device and the fourth switching device but also using the first switching device and the second switching device. As a result, the first to fourth switching devices can share burdens. Heat caused in the first to fourth switching devices can thus be reduced. The efficiency of power conversion can also be increased.

In the following description, periods in which both the third switching device and the fourth switching device are on will be referred to as "second circulating periods".

The control unit of the power conversion apparatus according to the second embodiment may generate both a first circulating period and a second circulating period between the on time TonA and the on time TonC.

According to the above-described configuration, the first to fourth switching devices can share burdens. Heat generated in the first to fourth switching devices can thus be reduced. The efficiency of power conversion can therefore be increased.

The control unit of the power conversion apparatus according to the second embodiment may turn on the second switching device or the third switching device that is turned on at the on time TonB at an on time TonD in a fourth period, in which the voltage of the secondary winding is negative, after the third period.

The control unit of the power conversion apparatus according to the second embodiment may generate either first circulating periods or second circulating periods between the on time TonA and the on time TonB and between the on time TonC and the on time TonD and the other between the on time TonB and the on time TonC.

According to the above-described configuration, the first circulating periods, which are realized by the first switching device and the second switching device, and the second circulating periods, which are realized by the third switching device and the fourth switching device, can be alternately generated. As a result, the first to fourth switching devices can share burdens. Furthermore, capacitor elements of the switching devices and the transformer can cause resonance. As a result, voltage surges that would otherwise be caused in the switching devices can be suppressed.

The operation of the power conversion apparatus according to the second embodiment will be described in detail hereinafter.

Figure 42:
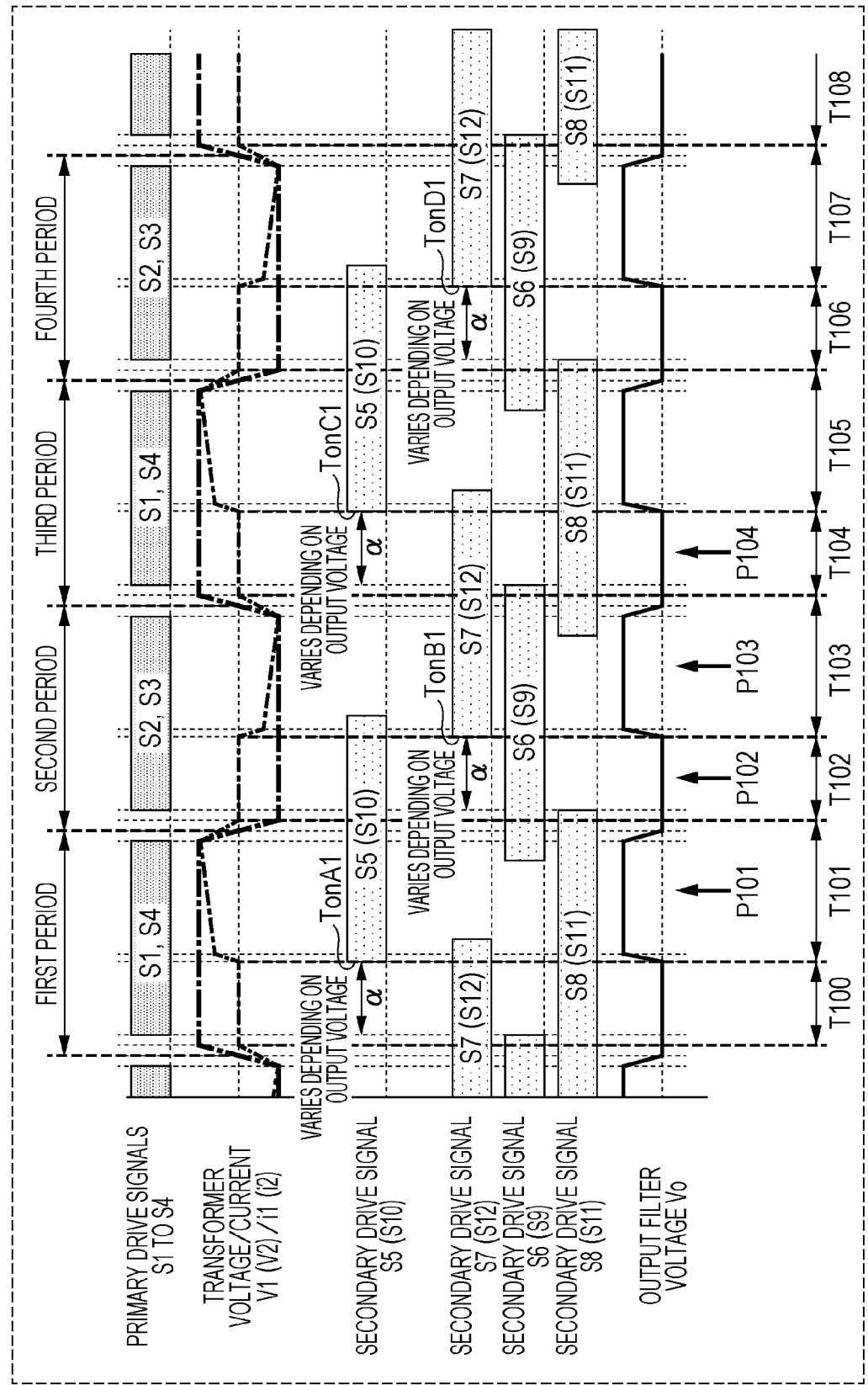
FIG. 42 is a timing chart illustrating an example of a power supply mode in which polarities of an output voltage and an output current are the same.
Figure 43A:
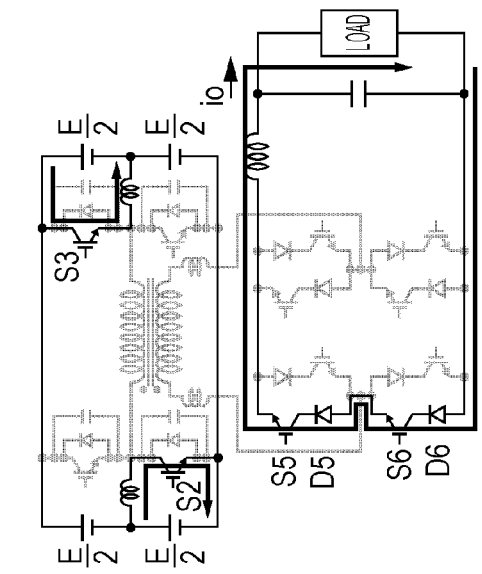
FIGS. 43A to 43D are diagrams illustrating currents flowing at timings illustrated in FIG. 42.
Figure 43B:
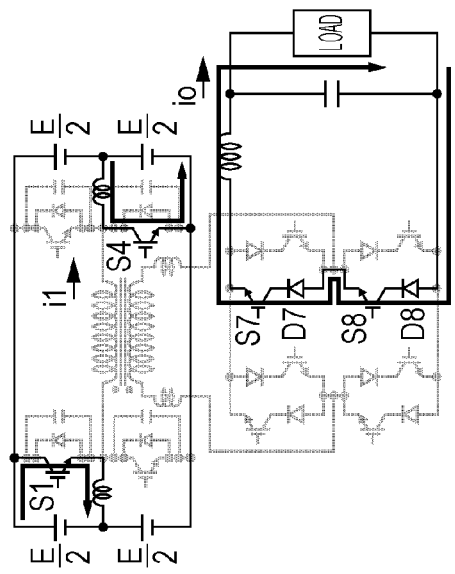
Figure 43C:
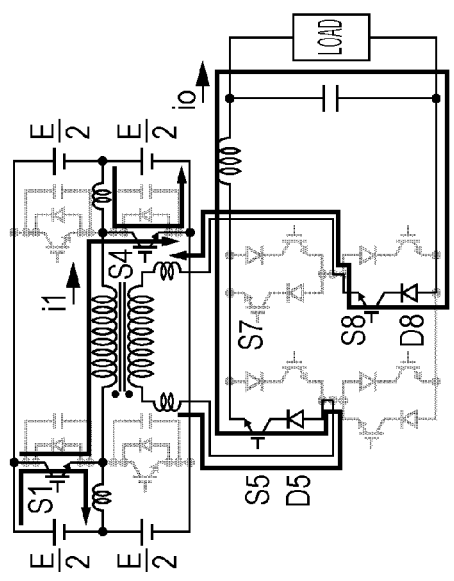
Figure 43D:
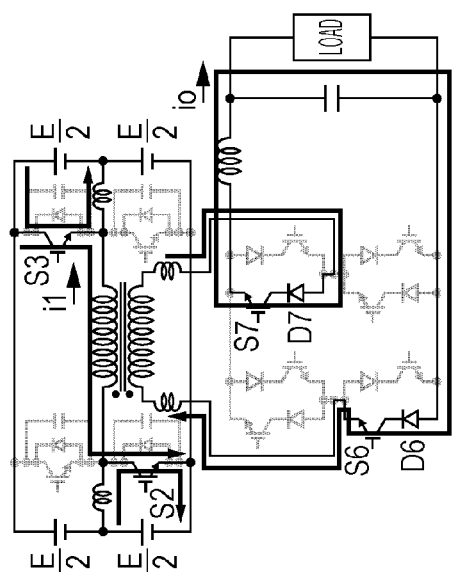
Figure 45B:
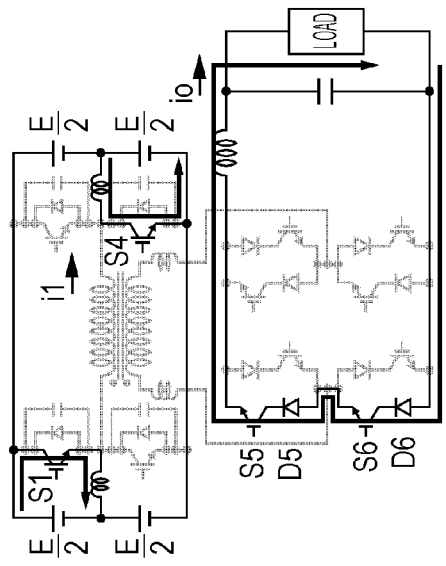
FIGS. 45A to 45D are diagrams illustrating currents flowing at timings illustrated in FIG. 44.
Figure 45D:
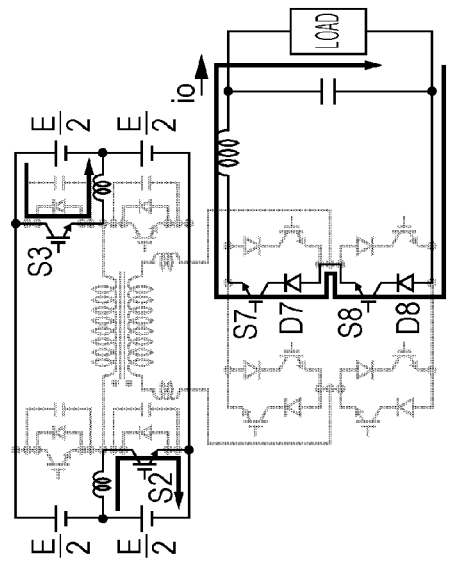
Figure 45A:
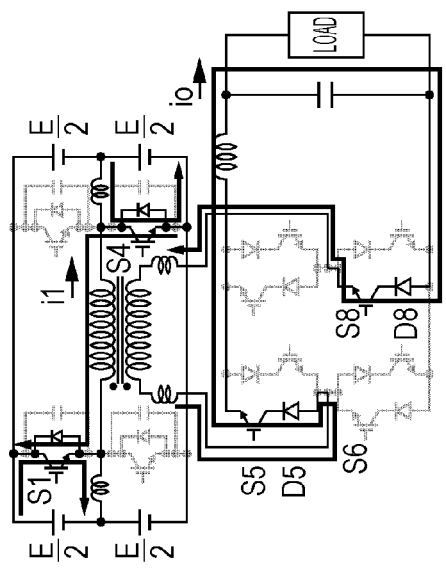
Figure 45C:
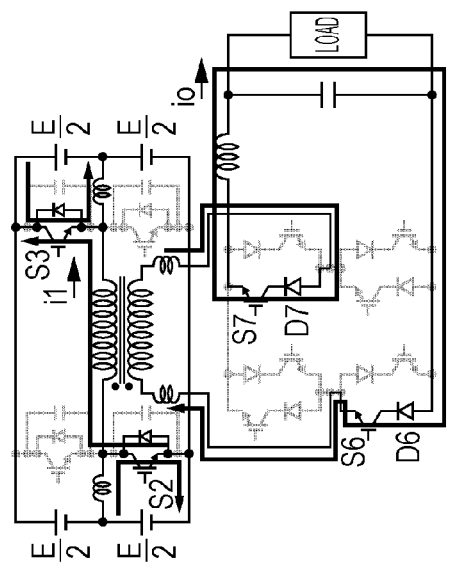

FIG. 42 is a timing chart illustrating an example of a power supply mode in which polarities of the output voltage and the output current are the same.

In the example illustrated in FIG. 42, periods T102 and T106, in which both the first switching device S5 and the second switching device S6 are on, correspond to first circulating periods.

In the example illustrated in FIG. 42, a period T104, in which both the third switching device S7 and the fourth switching device S8 are on, corresponds to a second circulating period.

In the example illustrated in FIG. 42, both the first circulating period T102 and the second circulating period T104 are generated between an on time TonA1 and an on time TonC1.

That is, in the example illustrated in FIG. 42, the first circulating period T102 is generated between the on time TonA1 and an on time TonB1. The second circulating period T104 is generated between the on time TonB1 and the on time TonC1.

In the example illustrated in FIG. 42, the first circulating period T106 is generated between the on time TonC1 and an on time TonD1.

FIGS. 43A to 43D are diagrams illustrating currents flowing at timings P101 to P104 illustrated in FIG. 42.

In FIG. 42, the timings P101 to P104 are in periods T101 to T104, respectively.

FIG. 44 is a timing chart illustrating an example of a power regeneration mode in which the polarities of the output voltage and the output current are different from each other.

In the example illustrated in FIG. 44, periods T202 and T206, in which both the first switching device S5 and the second switching device S6 are on, correspond to first circulating periods.

In the example illustrated in FIG. 44, a period T204, in which both the third switching device S7 and the fourth switching device S8 are on, corresponds to a second circulating period.

In the example illustrated in FIG. 44, both the first circulating period T202 and the second circulating period T204 are generated between an on time TonA2 and an on time TonC2.

That is, in the example illustrated in FIG. 44, the first circulating period T202 is generated between the on time TonA2 and an on time TonB2. The second circulating period T204 is generated between the on time TonB2 and the on time TonC2.

In the example illustrated in FIG. 44, the first circulating period T206 is generated between the on time TonC2 and the on time TonD2.

FIGS. 45A to 45D are diagrams illustrating currents flowing at timings P201 to P204 illustrated in FIG. 44.

In FIG. 44, the timings P201 to P204 are in periods T201 to T204, respectively.

As illustrated in FIGS. 43A to 43D and 45A to 45D, control can be performed in the circulating periods (power non-supply periods) such that current flows through Path 1, which runs through the first switching device S5 and the second switching device S6, and Path 2, which runs through the third switching device S7 and the fourth switching device S8. As a result, for example, current does not repeatedly flows through Path 2 in the circulating periods (power non-supply periods). The first to fourth switching devices S5 to S8 can therefore share burdens.

Alternatively, a second circulating period may be generated between the on time TonA and the on time TonB. A first circulating period may be generated between the on time TonB and the on time TonC. A second circulating period may be generated between the on time TonC and the on time TonD.

As illustrated in FIGS. 43A to 43D and 45A to 45D, the capacitor elements of the switching devices and the transformer can cause resonance by making current flow through Path 1 and Path 2 alternately. As a result, voltage surges that would otherwise be caused in the switching devices can be suppressed.

The power conversion apparatus according to the second embodiment may include a capacitor connected in series with at least either the second switching device or the fourth switching device.

According to the above-described configuration, the capacitor and the transformer can cause resonance. Voltage surges that would otherwise be caused in the switching devices can be suppressed more effectively.

Figure 46:
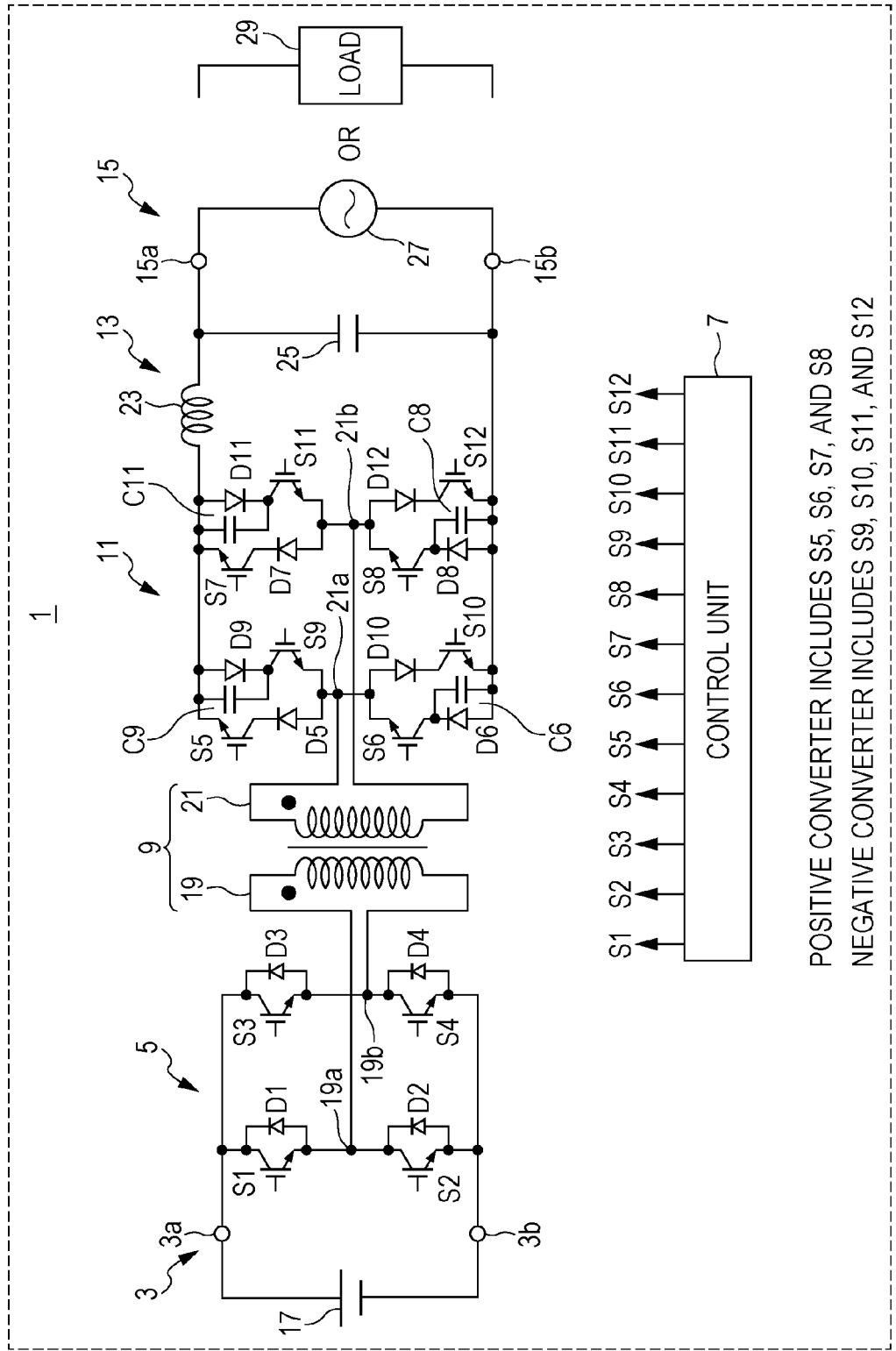
FIG. 46 is a diagram illustrating an example of the circuitry of the power conversion apparatus at a time when the power conversion apparatus includes capacitors.

FIG. 46 is a diagram illustrating an example of the circuitry of the power conversion apparatus at a time when the power conversion apparatus includes capacitors.

In the example illustrated in FIG. 46, the power conversion apparatus includes a capacitor C6 connected in series with the second switching device S6 and parallel to the second diode D6. The power conversion apparatus also includes a capacitor C8 connected in series with the fourth switching device S8 and parallel to the fourth diode D8.

FIGS. 47A to 47D are diagrams illustrating currents flowing through the power conversion apparatus including the capacitors C6 and C8 at the timings P101 to P104.

As illustrated in FIG. 47A, after the first switching device S5 is turned on, the capacitor C8 is charged. As illustrated in FIG. 473, after the second switching device S6 is turned on, the capacitor C6 is discharged. As illustrated in FIG. 47C, after the third switching device S7 is turned on, the capacitor C6 is charged. As illustrated in FIG. 47D, after the fourth switching device S8 is turned on, the capacitor C8 is discharged.

As described above, by performing control such that current alternately flows through Path 1 and Path 2, the capacitors C6 and C8 can be discharged. As a result, voltage surges that would otherwise be caused in the switching devices can be suppressed using the discharged capacitors C6 and C8.

Alternatively, the power conversion apparatus according to the second embodiment may include the fifth switching device S9, the sixth switching device S10, the seventh switching device S11, and the eighth switching device S12.

The fifth switching device S9 is inserted between the first end of the connection unit and the first end of the secondary winding parallel to the first switching device S5. Current flows through the fifth switching device S9 in a direction opposite to a direction in which current flows through the first switching device S5.

The sixth switching device S10 is inserted between the second end of the connection unit and the first end of the secondary winding parallel to the second switching device S6. Current flows through the sixth switching device S10 in a direction opposite to a direction in which current flows through the second switching device S6.

The seventh switching device S11 is inserted between the first end of the connection unit and the second end of the secondary winding parallel to the third switching device S7. Current flows through the seventh switching device S11 in a direction opposite to a direction in which current flows through the third switching device S7.

The eighth switching device S12 is inserted between the second end of the connection unit and the second end of the secondary winding parallel to the fourth switching device S8. Current flows through the eighth switching device S12 in a direction opposite to a direction in which current flows through the fourth switching device S8.

At this time, in a period in which the output current of the connection unit is negative, the control unit of the power conversion apparatus according to the second embodiment may control the sixth switching device S10, the fifth switching device S9, the eighth switching device S12, and the seventh switching device S11 instead of the first switching device S5, the second switching device S6, the third switching device S7, and the fourth switching device S8, respectively, in order to control the amplitude of at least either the output voltage or the output current.

At this time, the power conversion apparatus according to the second embodiment may include a capacitor connected in series with at least either the fifth switching device S9 or the seventh switching device S11.

According to the above-described configuration, even in the period in which the output current of the connection unit is negative, the capacitors and the transformer can cause resonance. As a result, voltage surges that would otherwise be caused in the switching devices can be suppressed.

In the example illustrated in FIG. 46, the power conversion apparatus includes a capacitor C9 connected in series with the fifth switching device S9 and parallel to the fifth diode D9. The power conversion apparatus also includes a capacitor C11 connected in series with the seventh switching device S11 and parallel to the seventh diode D11.

Alternatively, the power conversion apparatus according to the second embodiment may include a capacitor connected to the first end and the second end of the secondary winding.

According to the above-described configuration, the capacitors and the transformer can cause resonance. As a result, voltage surges that would otherwise be caused in the switching devices can be suppressed.

Figure 48:
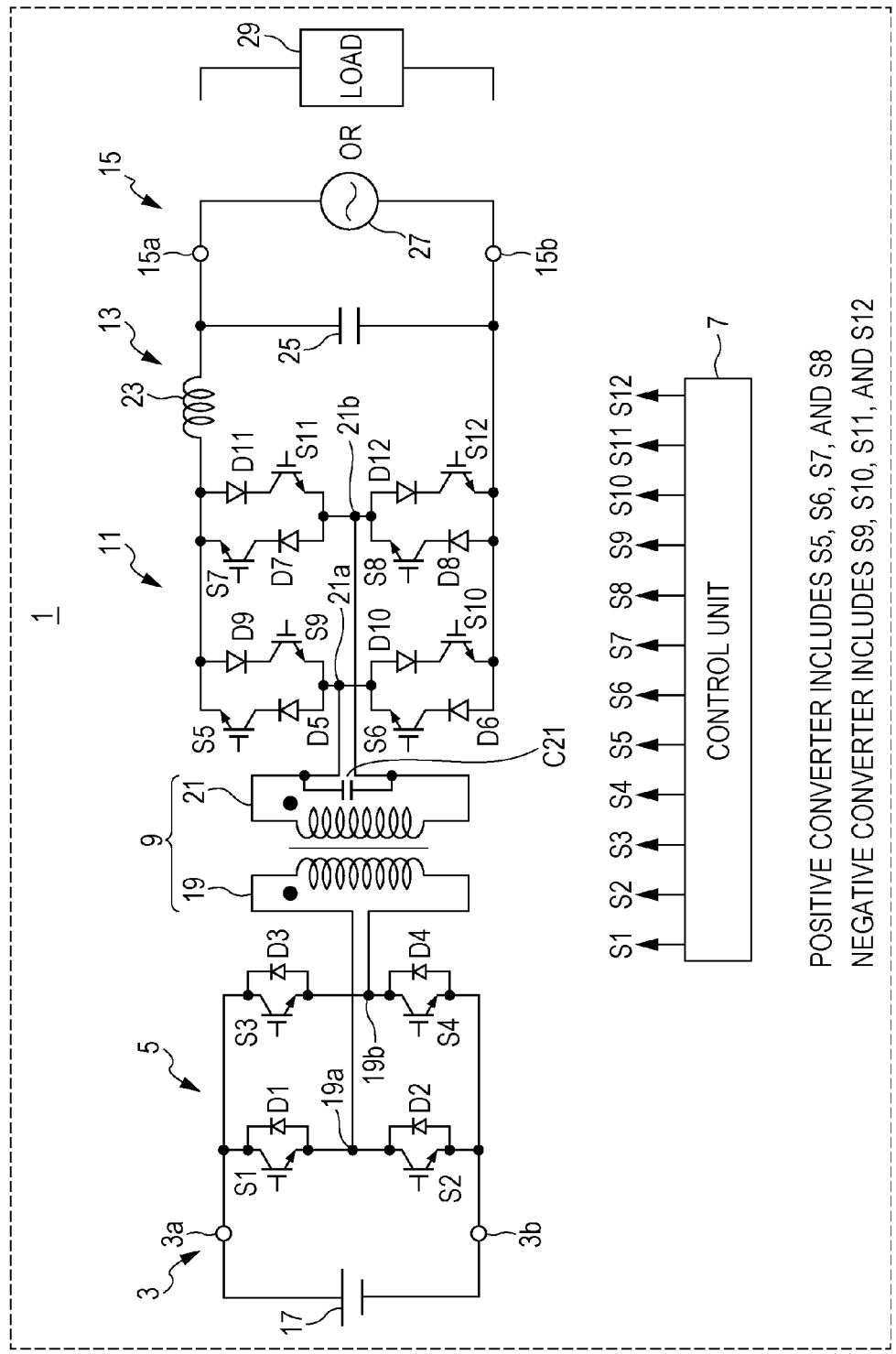
FIG. 48 is a diagram illustrating an example of the circuitry of the power conversion apparatus at a time when the power conversion apparatus includes a capacitor.

FIG. 48 is a diagram illustrating an example of the circuitry of the power conversion apparatus at a time when the power conversion apparatus includes the above-mentioned capacitor.

In the example illustrated in FIG. 48, the power conversion apparatus includes a capacitor C21 connected to the first end and the second end of the secondary winding.

Third Embodiment

The configuration of a power conversion apparatus 2000 according to a third embodiment will be described hereinafter. Description of elements that have already been described in the first or second embodiment is omitted as necessary.

Figure 49:
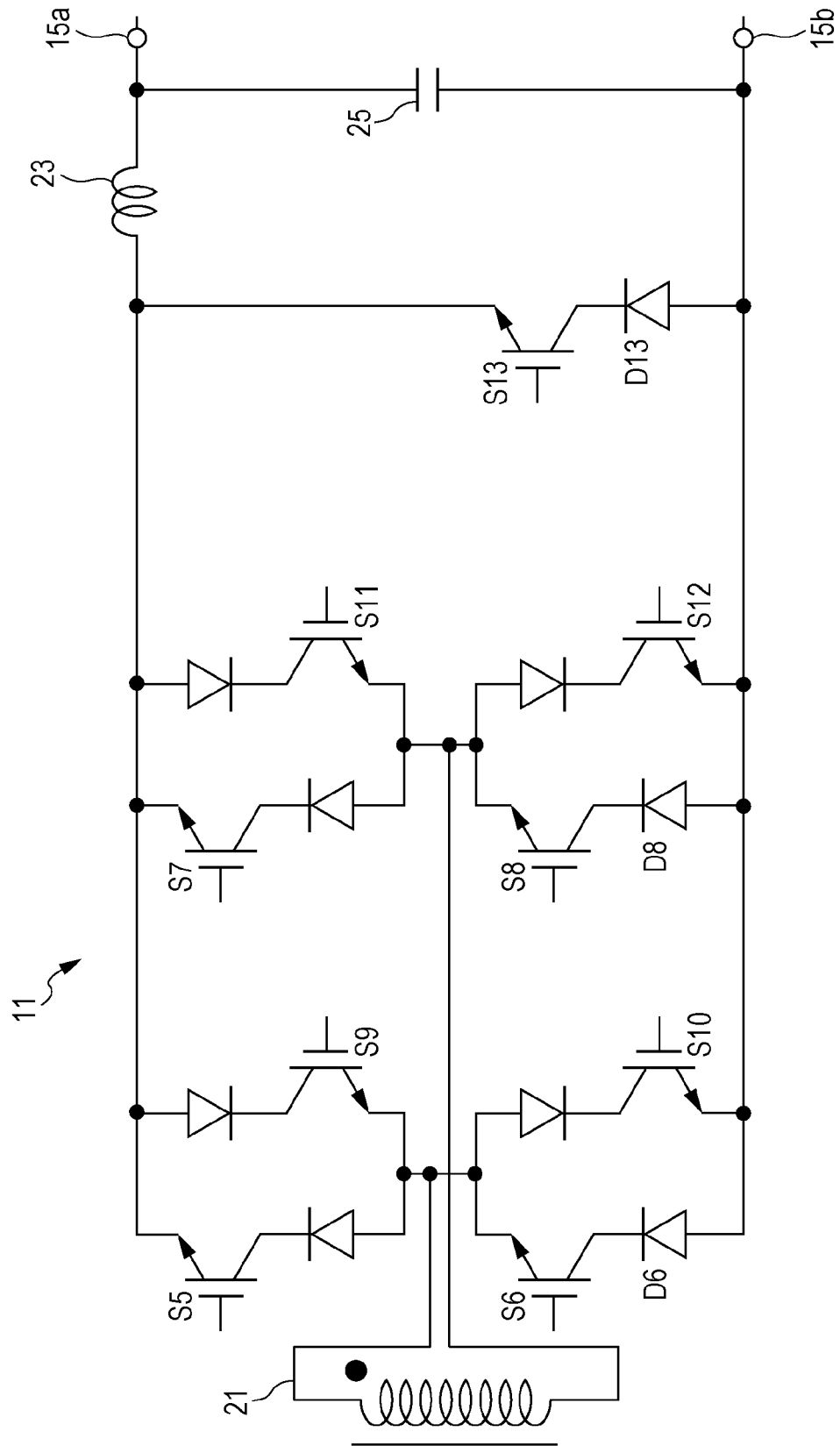
FIG. 49 is a diagram illustrating an example of a schematic configuration of a power conversion apparatus according to a third embodiment.

FIG. 49 is a diagram illustrating an example of a schematic configuration of the power conversion apparatus 2000 according to the third embodiment.

The power conversion apparatus 2000 according to the third embodiment includes a transformer, an inverter circuit, a connection unit, a first switching device, a second switching device, a third switching device, a fourth switching device, and a control unit.

The transformer includes a primary winding and a secondary winding, which is magnetically coupled with the primary winding.

The inverter circuit converts a DC voltage supplied from a DC power supply into an AC voltage and supplies the AC voltage obtained as a result of the conversion to the primary winding.

The connection unit includes a first end (15a) and a second end (15b) electrically connectable to at least either a commercial power system or a load.

The first switching device is inserted between the first end of the connection unit and a first end of the secondary winding.

The second switching device is inserted between the second end of the connection unit and the first end of the secondary winding.

The third switching device is inserted between the first end of the connection unit and a second end of the secondary winding.

The fourth switching device is inserted between the second end of the connection unit and the second end of the secondary winding.

The control unit controls the amplitude of at least either an output voltage or an output current of the connection unit.

The specific configurations described in the first embodiment as examples may be adopted in the above-described configuration as necessary.

The power conversion apparatus 2000 according to the third embodiment further includes a switching device Sa.

The switching device Sa is inserted between the first end and the second end of the connection unit.

In the configuration illustrated in FIG. 49, a switching device S13 corresponds to the switching device Sa.

In the configuration illustrated in FIG. 49, the power conversion apparatus 2000 includes a diode D13 connected in series with the switching device S13.

In the configuration illustrated in FIG. 49, the power conversion apparatus 2000 includes a reactor (coil 23) inserted between the first end (15a) of the connection unit and a first end of the switching device Sa (S13).

The control unit of the power conversion apparatus 2000 according to the third embodiment turns on at least either the first switching device or the fourth switching device at the on time TonA in the first period, in which the voltage of the secondary winding is positive.

The control unit of the power conversion apparatus 2000 according to the third embodiment turns on at least either the second switching device or the third switching device at the on time TonB in the second period, in which the voltage of the secondary winding is negative, after the first period.

The control unit of the power conversion apparatus 2000 according to the third embodiment controls the amplitude of at least either the output voltage or the output current by shifting at least either the on time TonA or the on time TonB.

The control unit of the power conversion apparatus 2000 according to the third embodiment turns on the first switching device or the fourth switching device that is turned on at the on time TonA at an on time TonC in a third period, in which the voltage of the secondary winding is positive, after the secondary period.

At this time, the control unit of the power conversion apparatus 2000 according to the third embodiment generates a circulating period Tx, in which the switching device Sa is on, at least either between the on time TonA and the on time TonB or between the on time TonB and the on time TonC.

According to above-described configuration, conduction losses during charging and discharging of the reactor (circulating period) can be reduced. As a result, losses in the power conversion apparatus can be reduced, thereby increasing the efficiency of power conversion.

Alternatively, the control unit of the power conversion apparatus 2000 according to the third embodiment may generate circulating periods Tx both between the on time TonA and the on time TonB and between the on time TonB and the on time TonC.

According to the above-described configuration, more circulating periods Tx are generated using the switching device Sa. As a result, the conduction losses during the charging and discharging of the reactor (circulating periods) can be further reduced.

Alternatively, the control unit of the power conversion apparatus 2000 according to the third embodiment may turn off the first to fourth switching devices in a part of each circulating period Tx in which the switching device Sa is on.

According to the above-described configuration, current does not flow through the first to fourth switching devices in the circulating periods Tx realized by the switching device Sa. As a result, the conduction losses during the charging and discharging of the reactor (circulating periods) can be further reduced.

Alternatively, the power conversion apparatus 2000 according to the third embodiment may include the fifth switching device S9, the sixth switching device S10, the seventh switching device S11, and the eighth switching device S12.

The fifth switching device S9 is inserted between the first end of the connection unit and the first end of the secondary winding parallel to the first switching device S5. Current flows through the fifth switching device S9 in a direction opposite to a direction in which current flows through the first switching device S5.

The sixth switching device S10 is inserted between the second end of the connection unit and the first end of the secondary winding parallel to the second switching device S6. Current flows through the sixth switching device S10 in a direction opposite to a direction in which current flows through the second switching device S6.

The seventh switching device S11 is inserted between the first end of the connection unit and the second end of the secondary winding parallel to the third switching device S7. Current flows through the seventh switching device S11 in a direction opposite to a direction in which current flows through the third switching device S7.

The eighth switching device S12 is inserted between the second end of the connection unit and the second end of the secondary winding parallel to the fourth switching device S8. Current flows through the eighth switching device S12 in a direction opposite to a direction in which current flows through the fourth switching device S8.

At this time, in a period in which the output current of the connection unit is negative, the control unit of the power conversion apparatus 2000 according to the third embodiment may control the amplitude of at least either the output voltage or the output current by controlling the sixth switching device S10, the fifth switching device S9, the eighth switching device S12, and the seventh switching device S11 instead of the first switching device S5, the second switching device S6, the third switching device S7, and the fourth switching device S8, respectively.

Figure 50:
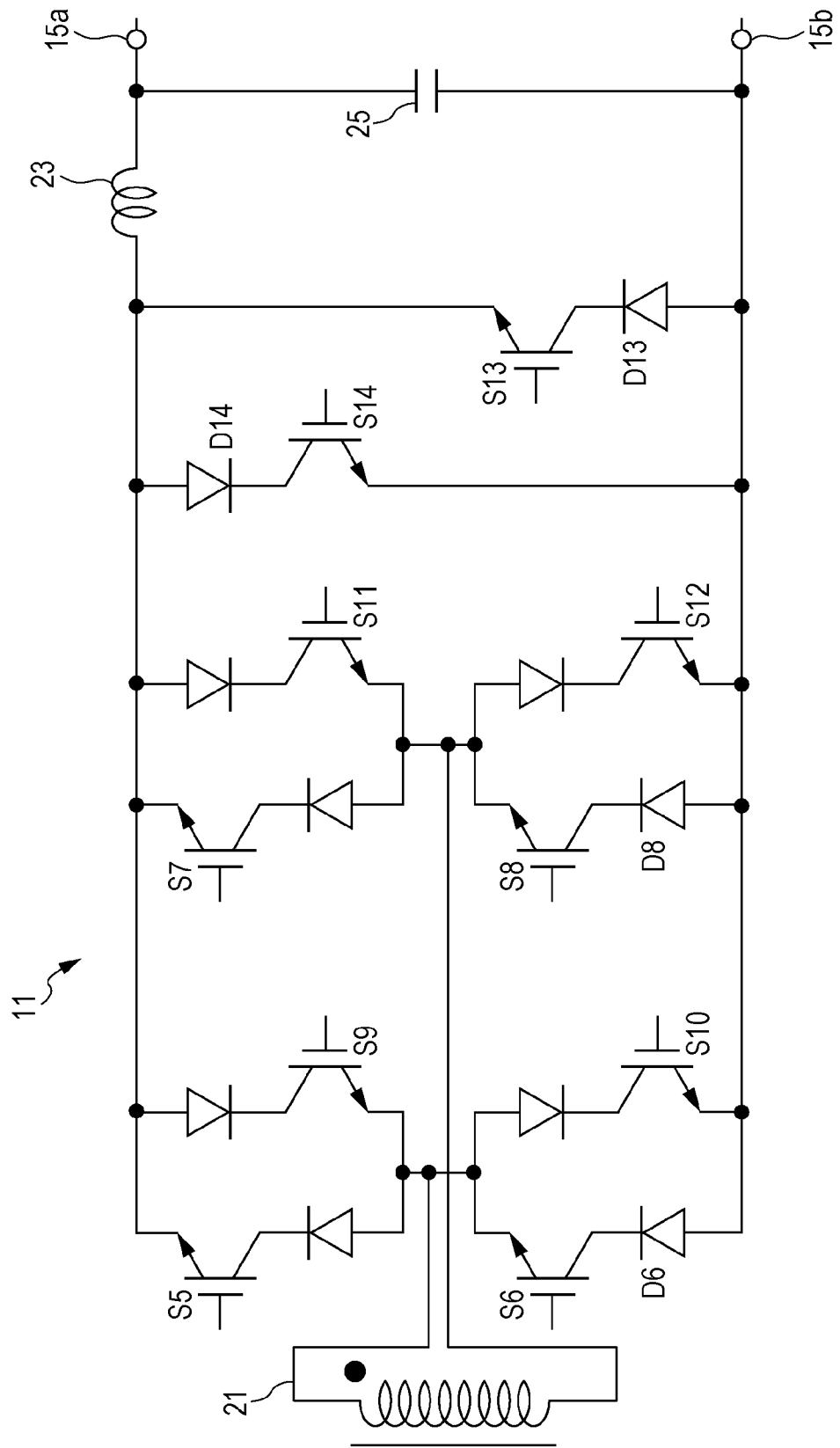
FIG. 50 is a diagram illustrating an example of a schematic configuration of another power conversion apparatus according to the third embodiment.

FIG. 50 is a diagram illustrating an example of a schematic configuration of a power conversion apparatus 3000 according to the third embodiment.

The power conversion apparatus 3000 according to the third embodiment further includes a switching device Sb in addition to the configuration of the power conversion apparatus 2000.

The switching device Sb is inserted between the first end and the second end of the connection unit.

Current flows through the switching device Sb in a direction opposite to a direction in which current flows through the switching device Sa.

In the configuration illustrated in FIG. 50, a switching device S14 corresponds to the switching device Sb.

In the configuration illustrated in FIG. 50, the power conversion apparatus 3000 includes a diode D14 connected in series with the switching device S14.

In the configuration illustrated in FIG. 50, the power conversion apparatus 3000 includes a reactor (coil 23) inserted between the first end (15*a*) of the connection unit and a first end of the switching device Sa and between the first end (15*a*) of the connection unit and a first end of the switching device Sb.

The control unit of the power conversion apparatus 3000 according to the third embodiment turns on the switching device Sb instead of the switching device Sa in a part of each circulating period Tx in which the output current of the connection unit is negative.

According to the above-described configuration, even in the period in which the output current of the connection unit is negative, conduction losses during charging and discharging of the reactor (circulating periods) can be reduced. As a result, losses in the power conversion apparatus can be further reduced, thereby further increasing the efficiency of power conversion.

The control unit of the power conversion apparatus 3000 according to the third embodiment may turn off the fifth to eighth switching devices in a part of each circulating period Tx in which the switching device Sb is on.

According to the above-described configuration, current does not flow through the fifth to eighth switching devices in the circulating periods Tx realized by the switching device Sc. As a result, the conduction losses during the charging and discharging of the reactor (circulating periods) can be further reduced.

Figure 51:
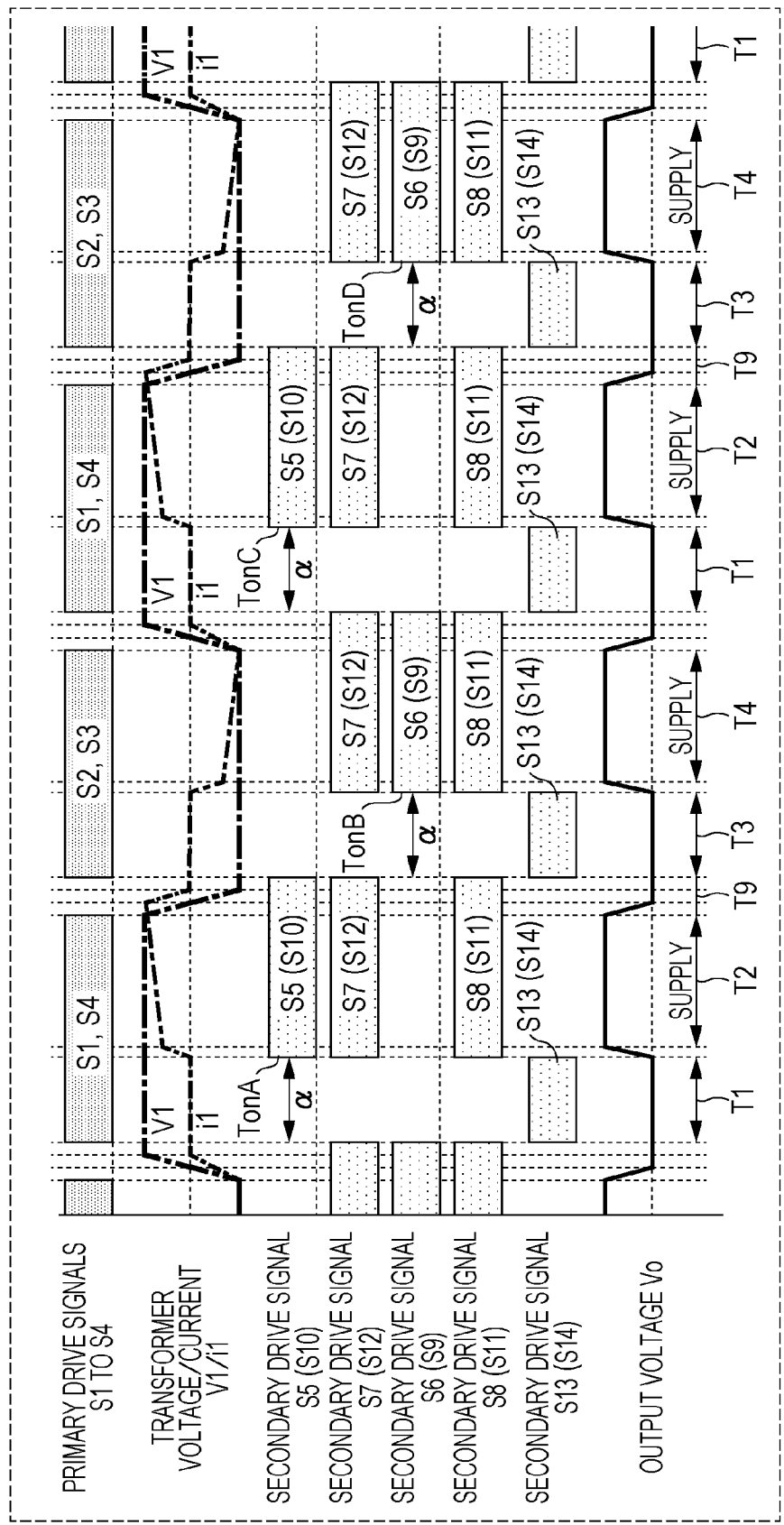
FIG. 51 is a timing chart illustrating an example of a power supply mode in which polarities of an output voltage and an output current are the same.

FIG. 51 is a timing chart illustrating an example of a power supply mode in which polarities of the output voltage and the output current are the same.

In the example illustrated in FIG. 51, the control unit generates circulating periods Tx between the on time TonA and the on time TonB and between the on time TonB and the on time TonC.

In the example illustrated in FIG. 51, periods T1 and T3 correspond to circulating periods Tx.

In the example illustrated in FIG. 51, the control unit turns off the first to fourth switching devices (S5 to S8) in a part of each circulating period Tx in which the switching device Sa (S13) is on.

In the example illustrated in FIG. 51, the control unit turns on the switching device Sb (S14) instead of the switching device Sc (S13) in a part of each circulating period Tx in which the output current of the connection unit is negative.

In the example illustrated in FIG. 51, the control unit turns off the fifth to eighth switching devices (S9 to S12) in a part of each circulating period Tx in which the switching device Sb (S14) is on.

Figure 52:
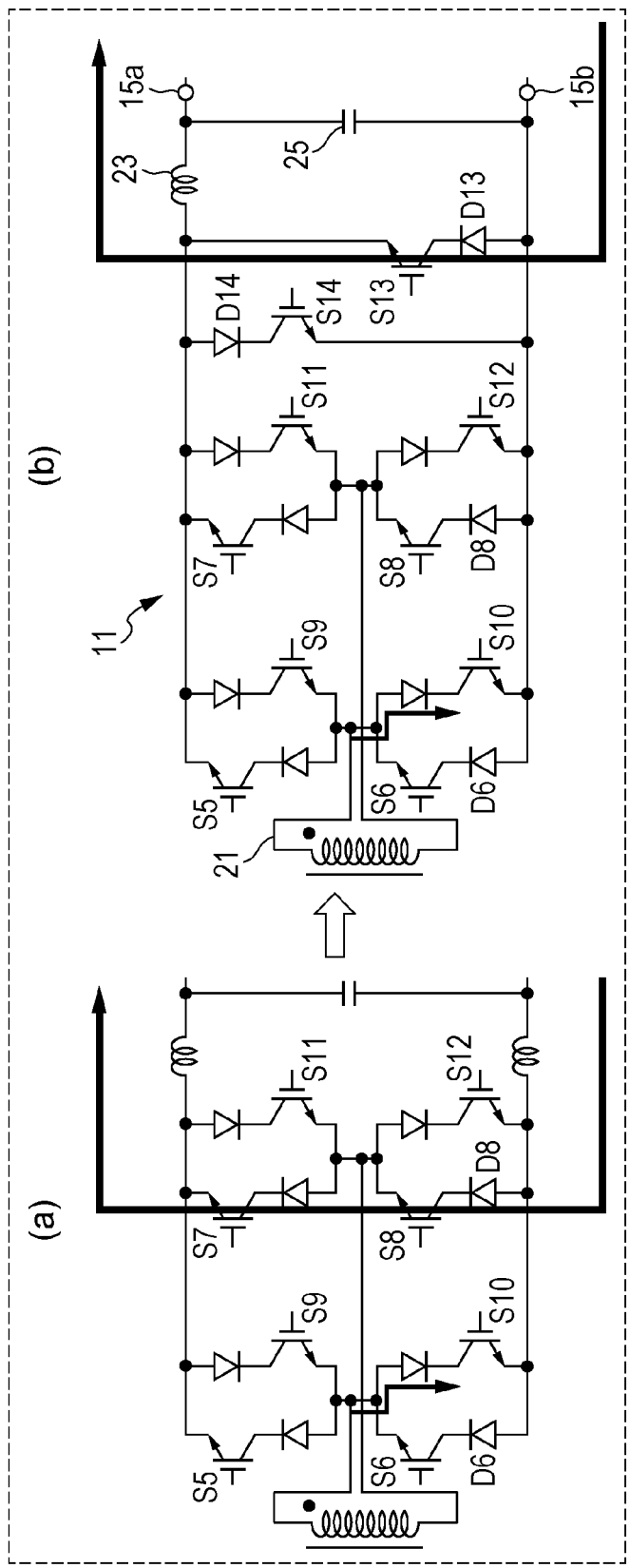
FIG. 52 includes circuit diagrams illustrating currents flowing in circulating periods.

FIG. 52 includes circuit diagrams illustrating currents flowing in circulating periods.

FIG. 52(*a*) illustrates an example of a current flowing in the period T1 illustrated in FIG. 5 in the first embodiment.

In the first embodiment, the filter circuit 13 is inserted between the output of the cycloconverter 11 and the connection unit 15. The filter circuit 13 includes the coil 23 and the capacitor 25 and smooths the AC signal output from the cycloconverter 11. As a result, the rectangular AC signal output from the cycloconverter 11 is converted into a sinusoidal AC signal having amplitude according to a pulse width.

In the operation in the first embodiment, a circuit operation for discharging energy accumulated in the coil 23 (the path 31 illustrated in FIG. 7 and the path 33 illustrated in FIG. 8) and a circuit operation for accumulating energy in the coil 23 (the path 36 illustrated in FIG. 9 and the path 38 illustrated in FIG. 10) are performed. Two switching devices and two diodes are provided along each of these paths. Conduction losses are therefore undesirably large.

That is, two active switches that are generally insulated-gate bipolar transistors (IGBTs) or metal-oxide-semiconductor (MOS) transistors and two diodes are provided along current paths used for charging and discharging the smoothing coil 23 to control the amplitude of the output voltage. Current therefore flows through a total of four devices. For example, a total of four devices, namely the fourth diode D8, the fourth switching device S8, the third diode D7, and the third switching device S7, are provided along the path 31 illustrated in FIG. 7, which is used for discharging the coil 23 in the first embodiment. These devices increase conduction losses of the switching devices. As a result, the efficiency of the power conversion apparatus decreases.

On the other hand, for example, FIG. 52(*b*) illustrates a current flowing in a period T1 illustrated in FIG. 51 in the third embodiment.

In the configuration according to the third embodiment, a total of two devices, namely either the switching device S13 or the switching device S14 and either the diode D13 or the diode D14, are provided along a path used for charging or discharging the coil 23. Providing only two devices along the path means that conduction losses of the switching devices can be reduced.

Figure 53:
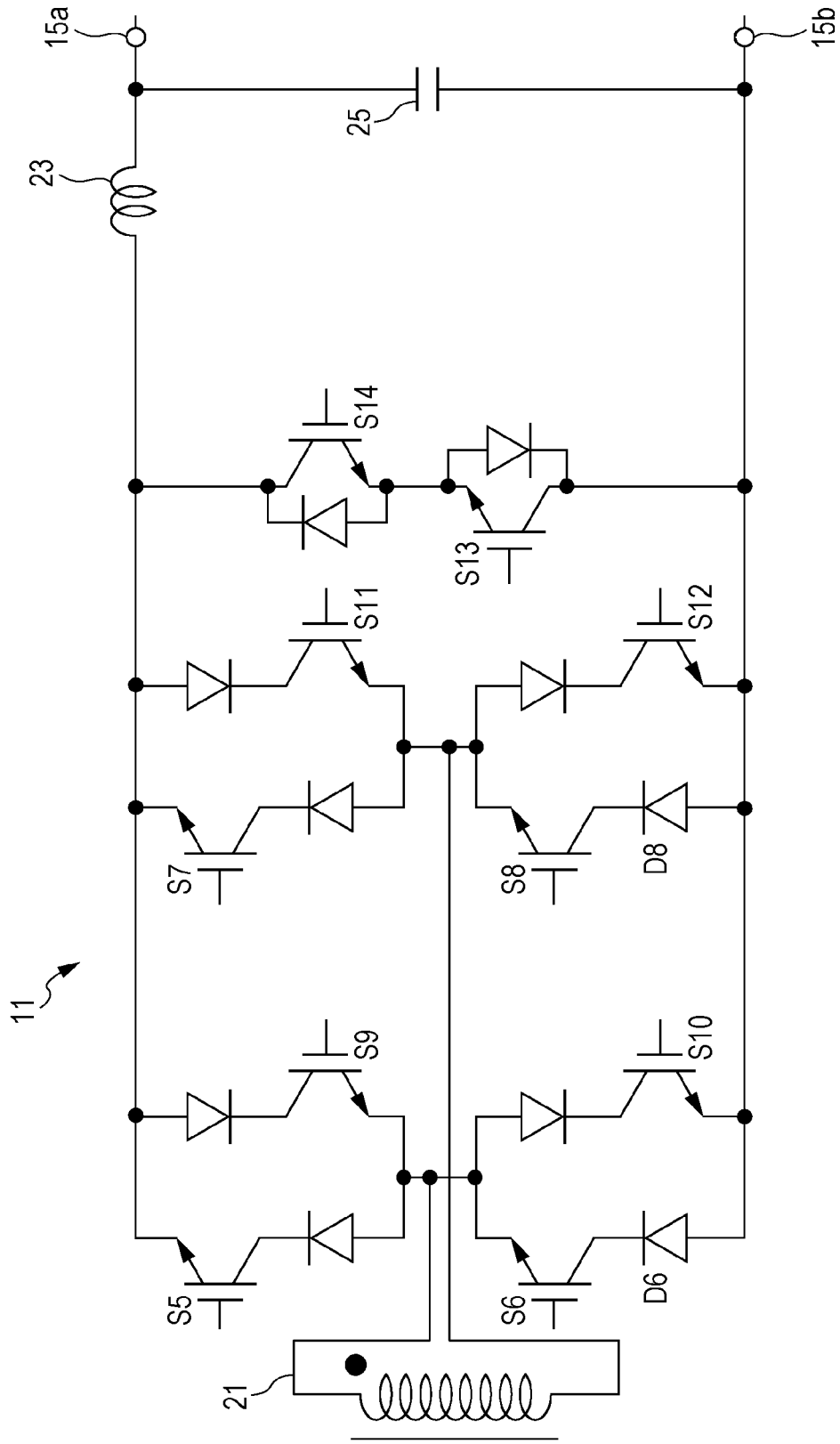
FIG. 53 is a diagram illustrating another example of the configuration of the other power conversion apparatus according to the third embodiment.

FIG. 53 is a diagram illustrating another example of the configuration of the power conversion apparatus 3000 according to the third embodiment.

Metal-oxide-semiconductor field-effect transistors (MOSFETs) or IGBTs including diodes may be used as the switching devices S13 and S14. In this case, as illustrated in FIG. 53, the switching devices S13 and S14 may be connected in series with each other. As a result, the size of an additional path becomes small.

Alternatively, the switching devices S13 and S14 may be bidirectional switching devices or the like.

When the switching devices S13 and S14 are controlled, control signals may be generated through logic syntheses of known control signals.

That is, a control signal for the switching device S13 may be a product set of control signals for the switching devices S7 and S8.

A control signal for the switching device S14 may be a product set of control signals for the switching devices S11 and S12.

There is thus no need to newly provide a mechanism for generating dedicated control signals for the switching devices S13 and S14.

That is, the control unit of the power conversion apparatus 3000 according to the third embodiment may give a control signal as a product set of the control signals for the third and fourth switching devices to the switching device Sa in a circulating period Tx.

According to the above-described configuration, the switching device Sa can be controlled with a simple configuration.

In addition, the control unit of the power conversion apparatus 3000 according to the third embodiment may give a control signal as a product set of the control signals for the seventh and eighth switching devices to the switching device Sb in a circulating period Tx.

According to the above-described configuration, the switching device Sb can be controlled with a simple configuration.

Fourth Embodiment

The configuration of a power conversion apparatus according to a fourth embodiment will be described hereinafter. Description of elements that have already been described in the first to third embodiments is omitted as necessary.

Figure 54:
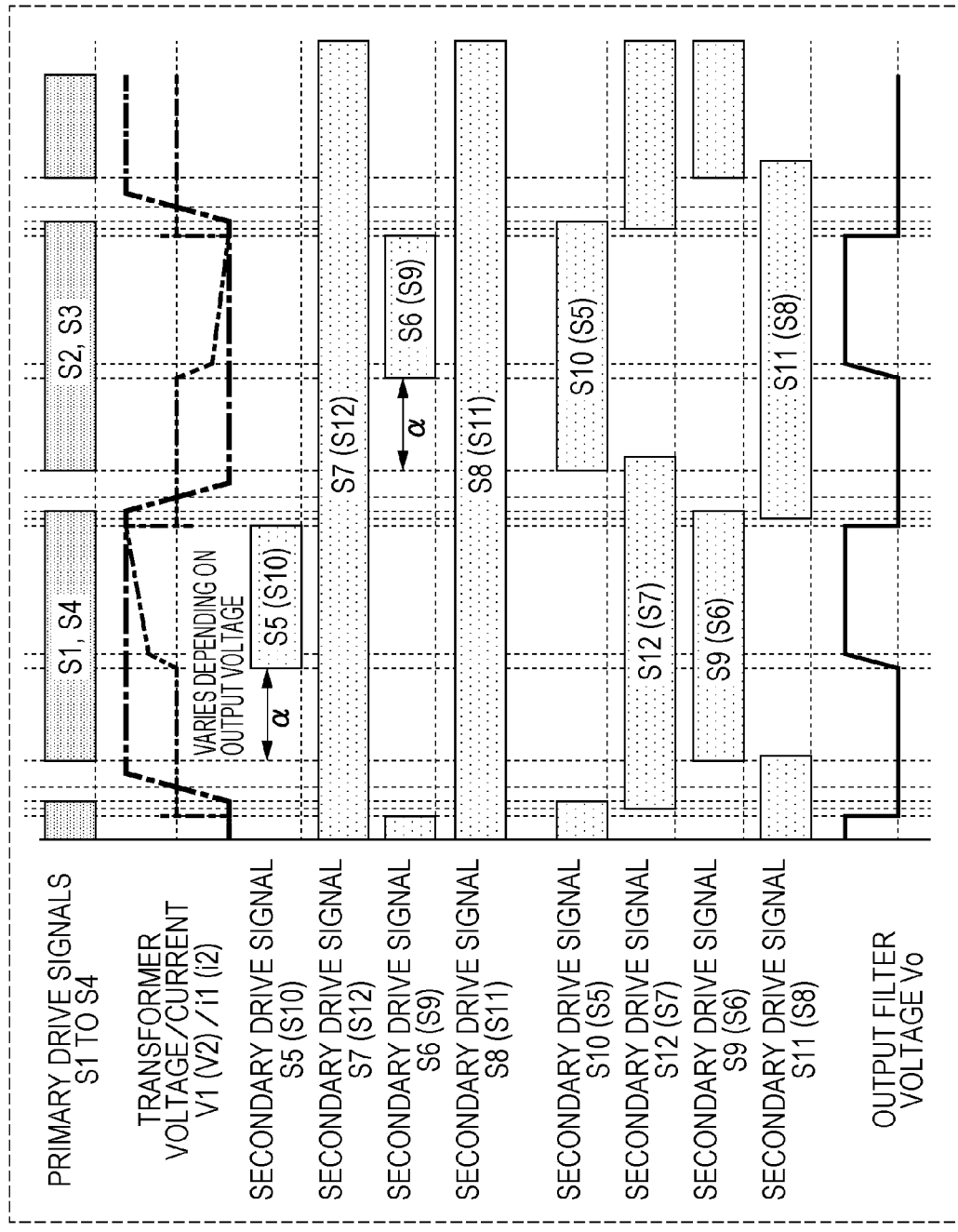
FIG. 54 is a timing chart illustrating a power supply mode in the period illustrated in FIG. 3 according to a fourth embodiment.

FIG. 54 is a timing chart illustrating a power supply mode in the period T10 illustrated in FIG. 3 according to the fourth embodiment.

Figure 55:
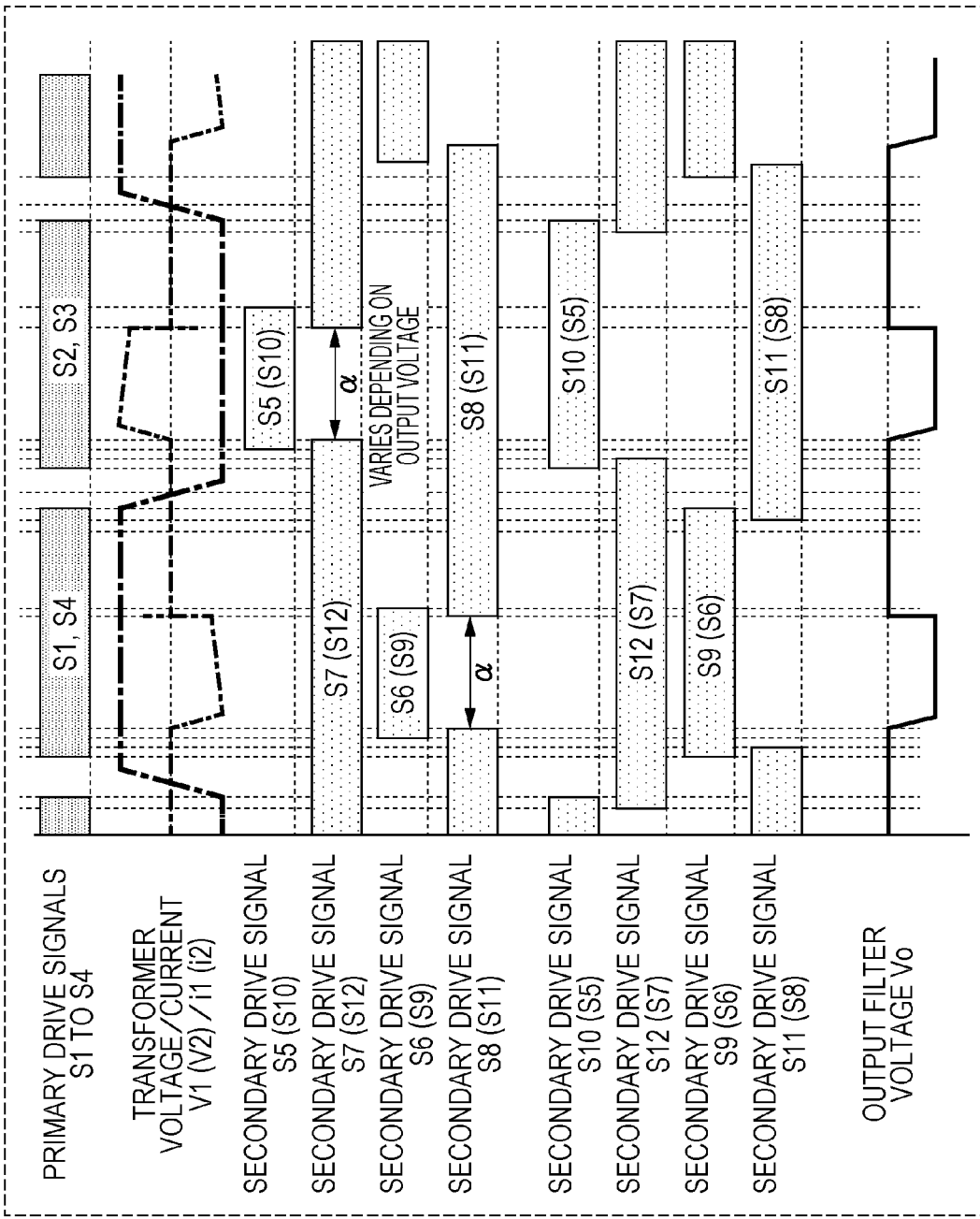
FIG. 55 is a timing chart illustrating a power regeneration mode in the period illustrated in FIG. 4 according to the fourth embodiment.

FIG. 55 is a timing chart illustrating a power regeneration mode in the period T12 illustrated in FIG. 4 according to the fourth embodiment.

As illustrated in FIG. 1, the power conversion apparatus according to the fourth embodiment includes the first to eighth switching devices S5 to S12.

In the power conversion apparatus according to the fourth embodiment, the control unit generates, in the first period, in which the voltage of the secondary winding is positive, a period in which both the fifth switching device S9 and the eighth switching device S12 are on.

In the power conversion apparatus according to the fourth embodiment, the control unit generates, in the second period, in which the voltage of the secondary winding is negative, a period in which both the sixth switching device S10 and the seventh switching device S11 are on.

In operation sequences of the switching devices according to the first to third embodiments, it is difficult to cope with a return current caused by an unexpected failure in a grid or the like. In an operation sequence of the switching devices according to the fourth embodiment, on the other hand, a path for a return current caused by an unexpected failure in a grid or the like can always be secured.

In figures such as FIGS. 54 and 55, a term "S5 (S10)", for example, means that the first switching device S5 is turned on when the positive group converter operates and the sixth switching device S10 is turned on when the negative group converter operates. The same holds for the other switching devices.

Fifth Embodiment

The configuration of a power conversion apparatus according to a fifth embodiment will be described hereinafter. Description of elements that have already been described in the first to fourth embodiments is omitted as necessary.

Figure 56:
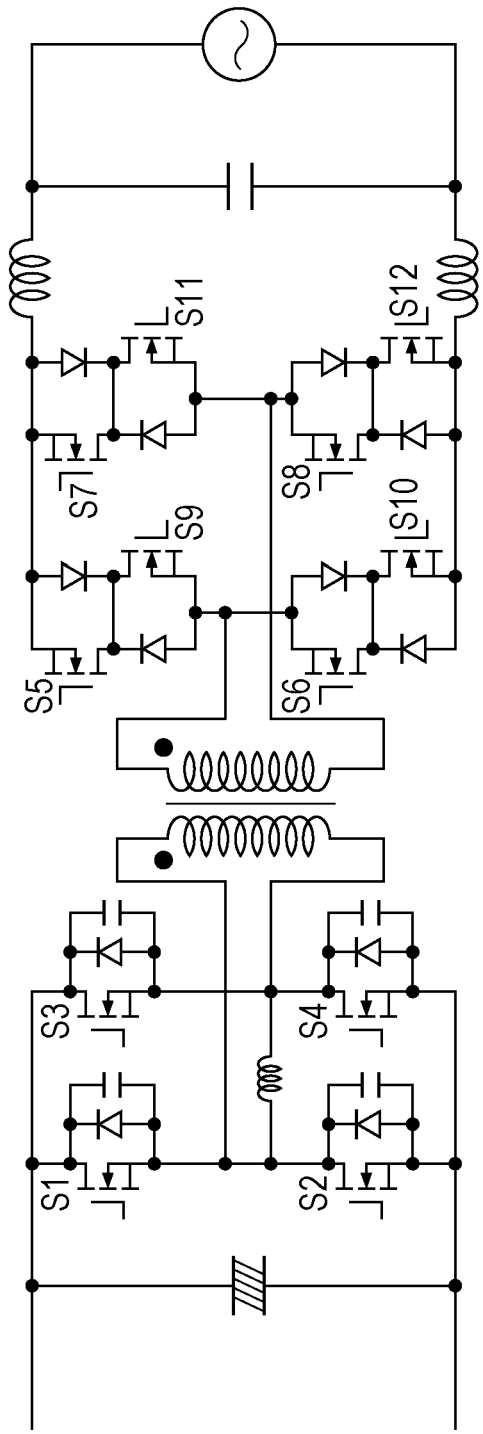
FIG. 56 is a diagram illustrating the circuitry of a power conversion apparatus according to a fifth embodiment.

FIG. 56 is a diagram illustrating the circuitry of the power conversion apparatus according to the fifth embodiment.

Figure 57:
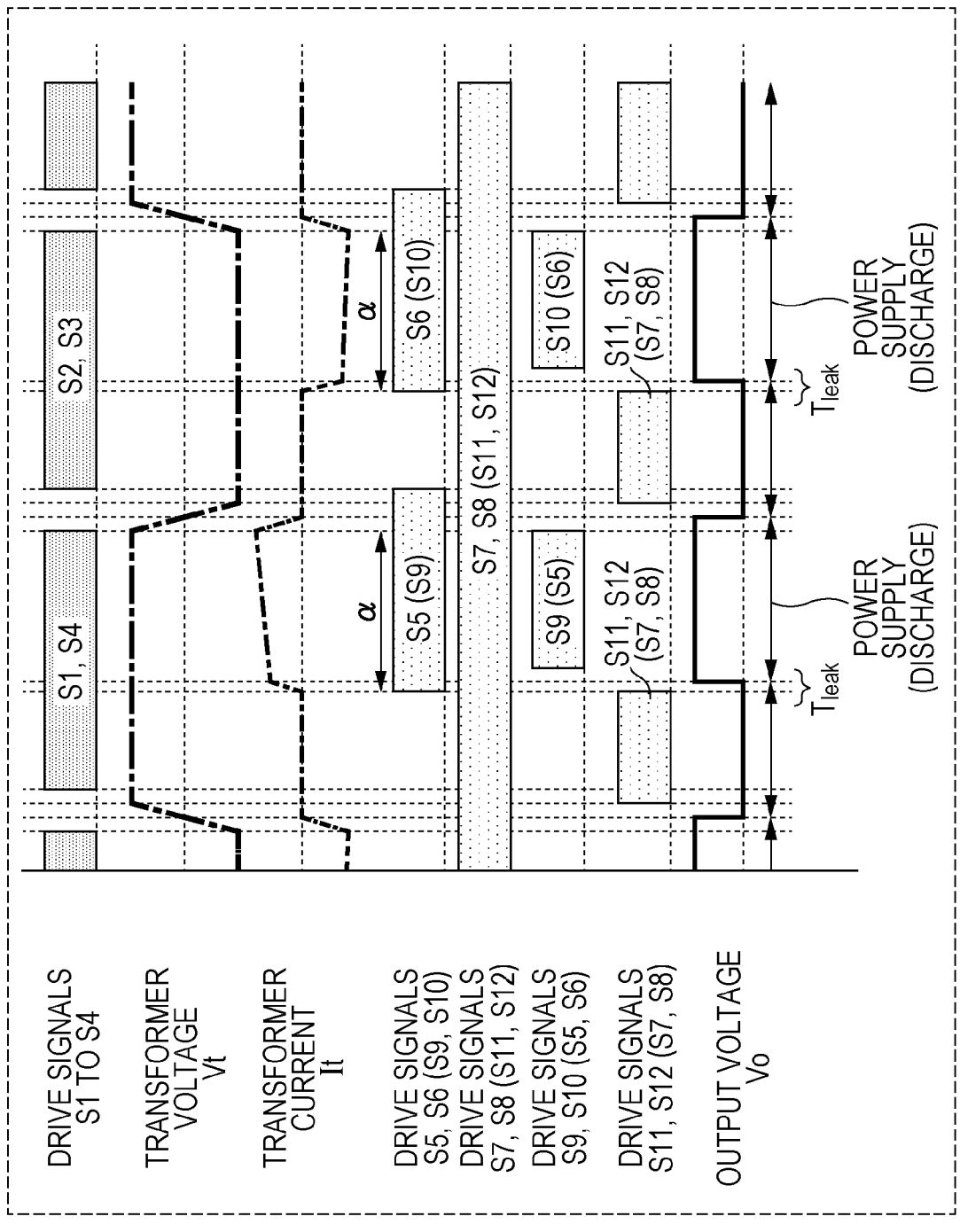
FIG. 57 is a timing chart illustrating a power supply mode in the period illustrated in FIG. 3 according to the fifth embodiment.

FIG. 57 is a timing chart illustrating a power supply mode in the period T10 illustrated in FIG. 3 according to the fifth embodiment.

Figure 58:
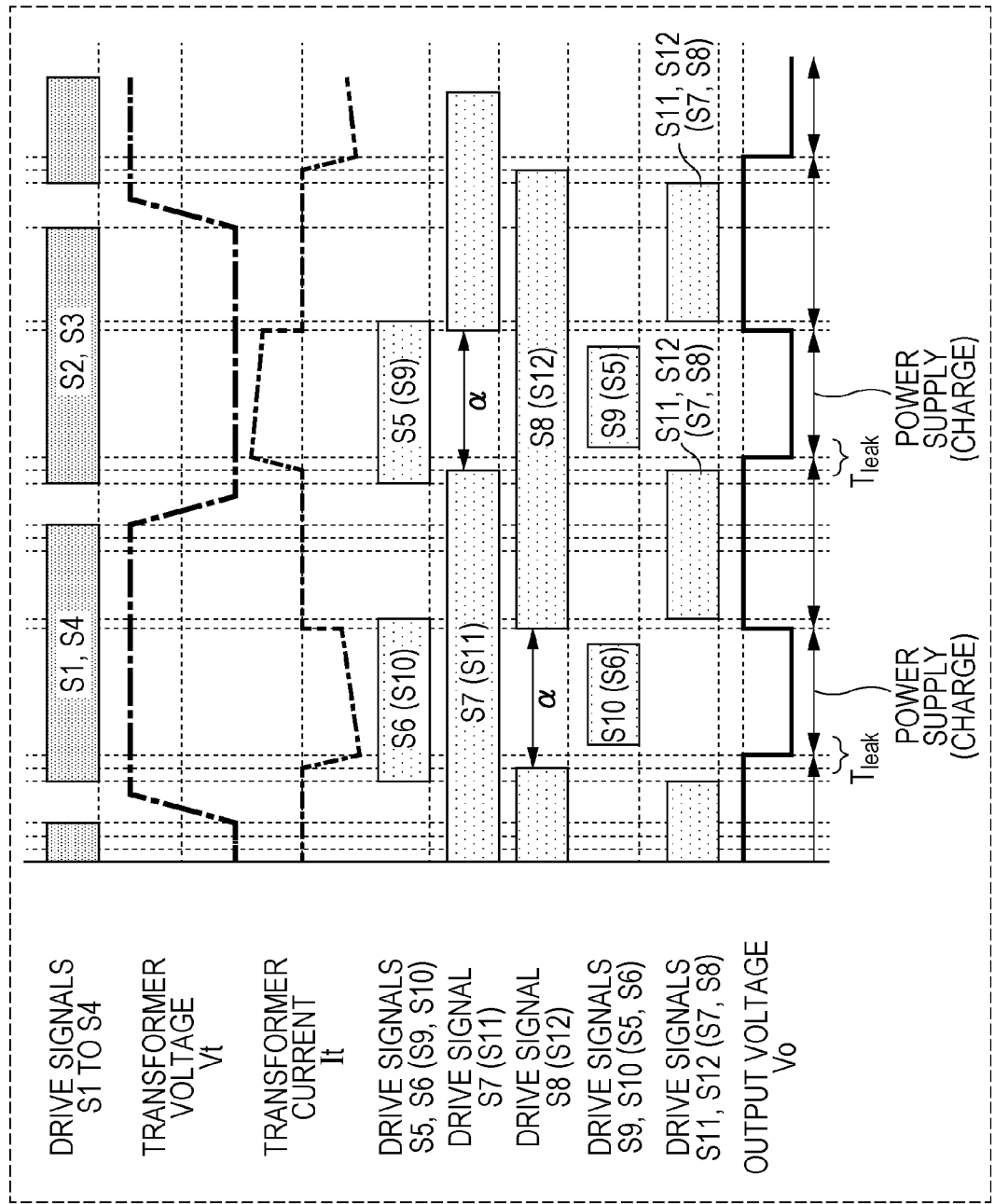
FIG. 58 is a timing chart illustrating a power regeneration mode in the period illustrated in FIG. 4 according to the fifth embodiment.

FIG. 58 is a timing chart illustrating a power regeneration mode in the period T12 illustrated in FIG. 4 according to the fifth embodiment.

In the power conversion apparatus according to the fifth embodiment, the switching devices are field-effect transistors.

In the power conversion apparatus according to the fifth embodiment, a drain of the first switching device S5 and a drain of the fifth switching device S9 are connected to each other. A drain of the second switching device S6 and a drain of the sixth switching device S10 are connected to each other. A drain of the third switching device S7 and a drain of the seventh switching device S11 are connected to each other. A drain of the fourth switching device S8 and a drain of the eighth switching device S12 are connected to each other.

The configurations described in the first to fifth embodiments may be combined with one another as necessary.

The present disclosure can be applied to a power conditioner for a fixed storage battery or a vehicle-to-home (V2H) power conditioner for EVs and plug-in hybrid vehicles (PHVs).

While the present disclosure has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. A power conversion apparatus comprising:
   a transformer that includes a primary winding and a secondary winding, which is magnetically coupled with the primary winding;
   an inverter circuit that converts a direct current voltage supplied from a direct current power supply into an alternating current voltage and that supplies the alternating current voltage to the primary winding;
   a connector that includes a first end and a second end electrically connectable to at least either a commercial power system or a load;
   a first switching device inserted between the first end of the connector and a first end of the secondary winding;
   a second switching device inserted between the second end of the connector and the first end of the secondary winding;
   a third switching device inserted between the first end of the connector and a second end of the secondary winding;
   a fourth switching device inserted between the second end of the connector and the second end of the secondary winding; and
   a control unit that controls an amplitude of at least either an output voltage or an output current of the connector,
   wherein the control unit turns on at least either the first switching device or the fourth switching device at a first on time in a first period, in which a voltage of the secondary winding is positive,
   wherein the control unit turns on at least either the second switching device or the third switching device at a second on time in a second period, in which the voltage of the secondary winding is negative, after the first period, and
   wherein the control unit controls the amplitude of at least either the output voltage or the output current by shifting at least either the first on time or the second on time.

2. The power conversion apparatus according to claim 1,
   wherein the control unit keeps the first switching device or the fourth switching device that is not turned on at the first on time turned on over the first period and the second period, and wherein the control unit keeps the second switching device or the third switching device that is not turned on at the second on time turned on over the first period and the second period.

3. The power conversion apparatus according to claim 1, wherein the control unit turns off the first switching device or the fourth switching device that is turned on at the first on time at a first off time in the second period, and
wherein the control unit turns off the second switching device or the third switching device that is turned on at the second on time at a second off time in a third period, in which the voltage of the secondary winding is positive, after the second period.

4. The power conversion apparatus according to claim 1, wherein the control unit turns on either the first switching device or the fourth switching device at a predetermined third on time, which is different from the first on time,
wherein the control unit turns on the other of the first switching device and the fourth switching device at a fourth on time in the first period before the third on time,
wherein the control unit turns on either the second switching device or the third switching device at a predetermined fifth on time, which is different from the second on time,
wherein the control unit turns on the other of the second switching device and the third switching device at a sixth on time in the second period before the fifth on time, and
wherein the control unit controls the amplitude of at least either the output voltage or the output current by shifting at least either the fourth on time or the sixth on time.

5. The power conversion apparatus according to claim 4, wherein the control unit sets the third on time in the first period and the fifth on time in the second period.

6. The power conversion apparatus according to claim 4, wherein the control unit controls turns off the first switching device or the fourth switching device that is turned on at the third on time at a third off time in the second period after the fifth on time,
wherein the control unit turns off the first switching device or the fourth switching device that is turned on at the fourth on time at a fourth off time after the third off time,
wherein the control unit turns off the second switching device or the third switching device that is turned on at the fifth on time at a fifth off time in a third period, in which the voltage of the secondary winding is positive, after the second period, and
wherein the control unit turns off the second switching device or the third switching device that is turned on at the sixth on time at a sixth off time in the third period.

7. The power conversion apparatus according to claim 1, wherein the control unit turns on either the first switching device or the fourth switching device at a predetermined third on time, which is different from the first on time, and turns off the same switching device at a third off time in the second period after the third on time,
wherein the control unit turns on at least either the second switching device or the third switching device at a predetermined fifth on time, which is different from the second on time, and turns off the same switching device at a fifth off time in the first period before the fifth on time,
wherein the control unit turns on the other of the second switching device and the third switching device at a sixth on time in the second period before the third off time,
wherein the control unit turns on the other of the first switching device and the fourth switching device at a fourth on time in the first period before the fifth off time, and
wherein the control unit controls the amplitude of at least either the output voltage or the output current by shifting at least either the fourth on time or the sixth on time.

8. The power conversion apparatus according to claim 7, wherein the control unit controls turns off the first switching device or the fourth switching device that is turned on at the fourth on time at a fourth off time after the fifth on time, and
wherein the control unit turns off the second switching device or the third switching device that is turned on at the sixth on time at a sixth off time before the sixth on time but after the third on time.

9. The power conversion apparatus according to claim 1, further comprising:
a fifth switching device inserted between the first end of the connector and the first end of the secondary winding parallel to the first switching device, through which current flows in a direction opposite to a direction in which current flows through the first switching device;
a sixth switching device inserted between the second end of the connector and the first end of the secondary winding parallel to the second switching device, through which current flows in a direction opposite to a direction in which current flows through the second switching device;
a seventh switching device inserted between the first end of the connector and the second end of the secondary winding parallel to the third switching device, through which current flows in a direction opposite to a direction in which current flows through the third switching device; and
an eighth switching device inserted between the second end of the connector and the second end of the secondary winding parallel to the fourth switching device, through which current flows in a direction opposite to a direction in which current flows through the fourth switching device,
wherein the control unit controls the amplitude of at least either the output voltage or the output current by controlling the first switching device, the second switching device, the third switching device, and the fourth switching device in a period in which the output current of the connector is positive, and
wherein the control unit controls the amplitude of at least either the output voltage or the output current by controlling the sixth switching device, the fifth switching device, the eighth switching device, and the seventh switching device in a period in which the output current of the connector is negative, instead of the first switching device, the second switching device, the third switching device, and the fourth switching device, respectively.

10. The power conversion apparatus according to claim 9, further comprising:
a positive group converter that includes the first switching device, the second switching device, the third switching device, and the fourth switching device; and a negative group converter that includes the fifth switching device, the sixth switching device, the seventh switching device, and the eighth switching device, wherein the control unit sets a timing at which polarity of the output current reverses in a period in which the direct current power supply does not supply power to the commercial power system or the load and performs a predetermined type of control on the positive group converter and the negative group converter, in which a short circuit does not occur in a secondary side of the power conversion apparatus.

11. The power conversion apparatus according to claim 10, wherein the control unit turns off the first switching device, the second switching device, the fifth switching device, and the sixth switching device as the predetermined type of control.

12. The power conversion apparatus according to claim 10, wherein the control unit turns on at least one of the first to eighth switching devices in a period in which the output current is positive, a period in which the output current is negative, and a period in which the polarity of the output current reverses.

13. The power conversion apparatus according to claim 10, further comprising:

an alternating current reactor inserted between the connector and the positive and negative group converters, wherein, as the predetermined type of control, the control unit keeps the first switching device, the fourth switching device, the sixth switching device, and the seventh switching device turned on and keeps the second switching device, the third switching device, the fifth switching device, and the eighth switching device turned off in a fourth period, in which the voltage of the secondary winding is negative, turns on the third switching device and the eighth switching device at a seventh on time in the fourth period to begin to charge the alternating current reactor, turns off the first switching device and the sixth switching device at a seventh off time after the seventh on time but before a fifth period, which comes after the fourth period and in which the voltage of the secondary winding is positive, turns on the second switching device and the fifth switching device at an eighth on time in the fifth period, and turns off the fourth switching device and the seventh switching device at an eighth off time in the fifth period after the eighth on time to discharge energy accumulated in the alternating current reactor.

14. The power conversion apparatus according to claim 9, wherein, if polarities of the output voltage and the output current are the same, the control unit establishes a power supply mode, in which the direct current power supply supplies power to the commercial power system or the load, and, if the polarities of the output voltage and the output current are different from each other, the control unit establishes a power regeneration mode, in which the commercial power system or the load regenerates power to the direct current power supply.

15. The power conversion apparatus according to claim 14, further comprising:

a chopper circuit that is connected to the inverter circuit, that performs a step-up operation in the power supply mode, and that performs a step-down operation in the power regeneration mode, wherein the control unit controls the amplitude of at least either the output voltage or the output current by controlling the chopper circuit and the first to eighth switching devices.

16. The power conversion apparatus according to claim 1, further comprising:

a first diode;

a second diode;

a third diode; and a fourth diode, wherein the first diode and the first switching device are connected in series with each other and the third diode and the third switching device are connected in series with each other, resulting in that either the first diode or the third diode is in a reverse bias state and the other is in a forward bias state when the control unit commutates a path that runs through either the first switching device or the third switching device to establish a path that runs through the other, and wherein the second diode and the second switching device are connected in series with each other and the fourth diode and the fourth switching device are connected in series with each other, resulting in that either the second diode or the fourth diode is in a reverse bias state and the other is in a forward bias state when the control unit commutates a path that runs through either the second switching device or the fourth switching device to establish a path that runs through the other.

17. The power conversion apparatus according to claim 1, wherein the control unit turns on at least either the first switching device or the fourth switching device at a first timing in the first period, in which the voltage of the secondary winding is positive, wherein the control unit turns on at least either the second switching device or the third switching device at a second timing in the second period, in which the voltage of the secondary winding is negative, after the first period, wherein the control unit controls the amplitude of at least either the output voltage or the output current by shifting at least either the first timing or the second timing, wherein the control unit turns on the first switching device or the fourth switching device that is turned on at the first timing at a third timing in a third period, in which the voltage of the secondary winding is positive, after the second period, and wherein the control unit generates a first circulating period, in which both the first switching device and the second switching device are on, at least either between the first timing and the second timing or between the second timing and the third timing.

18. The power conversion apparatus according to claim 17, wherein the control unit generates both the first circulating period and a second circulating period, in which both the third switching device and the fourth switching device are on, between the first timing and the third timing.

19. The power conversion apparatus according to claim 18, wherein the control unit turns on the second switching device or the third switching device that is turned on at the second timing at a fourth timing in a fourth period, in which the voltage of the secondary winding is negative, after the third period, wherein the control unit generates either the first circulating period or the second circulating period between the first timing and the second timing and between the third timing and the fourth timing, and wherein the control unit generates the other of the first circulating period and the second circulating period between the second timing and the third timing.

20. The power conversion apparatus according to claim 19, further comprising:

a capacitor connected in series with at least either the second switching device or the fourth switching device.

21. The power conversion apparatus according to claim 17, further comprising:

a fifth switching device inserted between the first end of the connector and the first end of the secondary winding parallel to the first switching device, through which current flows in a direction opposite to a direction in which current flows through the first switching device;

a sixth switching device inserted between the second end of the connector and the first end of the secondary winding parallel to the second switching device, through which current flows in a direction opposite to a direction in which current flows through the second switching device;

a seventh switching device inserted between the first end of the connector and the second end of the secondary winding parallel to the third switching device, through which current flows in a direction opposite to a direction in which current flows through the third switching device; and an eighth switching device inserted between the second end of the connector and the second end of the secondary winding parallel to the fourth switching device, through which current flows in a direction opposite to a direction in which current flows through the fourth switching device, wherein the control unit controls the amplitude of at least either the output voltage or the output current by controlling the first switching device, the second switching device, the third switching device, and the fourth switching device in a period in which the output current of the connector is positive, and wherein the control unit controls the amplitude of at least either the output voltage or the output current by controlling the sixth switching device, the fifth switching device, the eighth switching device, and the seventh switching device in a period in which the output current of the connector is negative, instead of the first switching device, the second switching device, the third switching device, and the fourth switching device, respectively.

22. The power conversion apparatus according to claim 21, further comprising:

a capacitor connected in series with at least either the fifth switching device or the seventh switching device.

23. The power conversion apparatus according to claim 17, further comprising:

a capacitor connected to the first end and the second end of the secondary winding.

24. The power conversion apparatus according to claim 1, further comprising:

a first additional switching device inserted between the first end of the connector and the second end of the connector, wherein the control unit turns on at least either the first switching device or the fourth switching device at a first timing in the first period, in which the voltage of the secondary winding is positive, wherein the control unit turns on at least either the second switching device or the third switching device at a second timing in the second period, in which the voltage of the secondary winding is negative, after the first period, wherein the control unit controls the amplitude of at least either the output voltage or the output current by shifting at least either the first timing or the second timing, wherein the control unit turns on the first switching device or the fourth switching device that is turned on at the first timing at third timing in a third period, in which the voltage of the secondary winding is positive, after the second period, and wherein the control unit generates a circulating period, in which the first additional switching device is on, at least either between the first timing and the second timing or between the second timing and the third timing.

25. The power conversion apparatus according to claim 24, wherein the control unit generates the circulating period both between the on time TonA and the second timing and between the second timing and the third timing.

26. The power conversion apparatus according to claim 24, wherein the control unit keeps the first switching device, the second switching device, the third switching device, and the fourth switching device turned off in a part of the circulating period in which the first additional switching device is on.

27. The power conversion apparatus according to claim 26, wherein the control unit gives a control signal as a product set of a control signal given to the third switching device and a control signal given to the fourth switching device to the first additional switching device in the circulating period.

28. The power conversion apparatus according to claim 24, further comprising:

a reactor inserted between the first end of the connector and a first end of the first additional switching device.

29. The power conversion apparatus according to claim 24, further comprising:

a fifth switching device inserted between the first end of the connector and the first end of the secondary winding parallel to the first switching device, through which current flows in a direction opposite to a direction in which current flows through the first switching device;

a sixth switching device inserted between the second end of the connector and the first end of the secondary winding parallel to the second switching device, through which current flows in a direction opposite to a direction in which current flows through the second switching device;

a seventh switching device inserted between the first end of the connector and the second end of the secondary winding parallel to the third switching device, through which current flows in a direction opposite to a direction in which current flows through the third switching device;

an eighth switching device inserted between the second end of the connector and the second end of the secondary winding parallel to the fourth switching device, through which current flows in a direction opposite to a direction in which current flows through the fourth switching device; and a second additional switching device inserted between the first end of the connector and the second end of the connector, through which current flows in a direction opposite to a direction in which current flows through the first additional switching device, wherein the control unit controls the amplitude of at least either the output voltage or the output current by controlling the first switching device, the second switching device, the third switching device, and the fourth switching device in a period in which the output current of the connector is positive, wherein the control unit controls the amplitude of at least either the output voltage or the output current by controlling the sixth switching device, the fifth switching device, the eighth switching device, and the seventh switching device in a period in which the output current of the connector is negative, instead of the first switching device, the second switching device, the third switching device, and the fourth switching device, respectively, and wherein the control unit turns on the second additional switching device instead of the first additional switching device in a part of the circulating period in which the output current of the connector is negative.

30. The power conversion apparatus according to claim 29, wherein the control unit keeps the fifth switching device, the sixth switching device, the seventh switching device, and the eighth switching device turned off in a part of the circulating period in which the second additional switching device is on.

31. The power conversion apparatus according to claim 30, wherein the control unit gives a control signal as a product set of a control signal given to the seventh switching device and a control signal given to the eighth switching device to the second additional switching device in the circulating period.

32. The power conversion apparatus according to claim 29, further comprising:

a reactor inserted between the first end of the connector and a first end of the first additional switching device and between the first end of the connector and a first end of the second additional switching device.

33. The power conversion apparatus according to claim 1, further comprising:

a fifth switching device inserted between the first end of the connector and the first end of the secondary winding parallel to the first switching device, through which current flows in a direction opposite to a direction in which current flows through the first switching device;

a sixth switching device inserted between the second end of the connector and the first end of the secondary winding parallel to the second switching device, through which current flows in a direction opposite to a direction in which current flows through the second switching device;

a seventh switching device inserted between the first end of the connector and the second end of the secondary winding parallel to the third switching device, through which current flows in a direction opposite to a direction in which current flows through the third switching device; and an eighth switching device inserted between the second end of the connector and the second end of the secondary winding parallel to the fourth switching device, through which current flows in a direction opposite to a direction in which current flows through the fourth switching device, wherein the control unit generates, in the first period, in which the voltage of the secondary winding is positive, a period in which both the fifth switching device and the eighth switching device are on, and wherein the control unit generates, in the second period, in which the voltage of the secondary winding is negative, a period in which both the sixth switching device and the seventh switching device are on.

* * * * *